US006992455B2

(12) United States Patent
Kato et al.

(10) Patent No.: US 6,992,455 B2
(45) Date of Patent: Jan. 31, 2006

(54) LEG DEVICE FOR LEG TYPE MOVABLE ROBOT, AND METHOD OF CONTROLLING LEG TYPE MOVABLE ROBOT

(75) Inventors: Keisuke Kato, Tokyo (JP); Goushi Koike, Tokyo (JP); Susumu Tosaka, Tokyo (JP); Hiroaki Morikawa, Kanagawa (JP); Jinichi Yamaguchi, 5-14-38, Tamadaira, Hino-shi, Tokyo 191-0062 (JP); Kenichiro Nagasaka, Tokyo (JP); Masakuni Nagano, Chiba (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 0 days.

(21) Appl. No.: 10/474,636

(22) PCT Filed: Feb. 14, 2003

(86) PCT No.: PCT/JP03/01582

§ 371 (c)(1),
(2), (4) Date: Oct. 18, 2004

(87) PCT Pub. No.: WO03/068455

PCT Pub. Date: Aug. 21, 2003

(65) Prior Publication Data

US 2005/0067993 A1 Mar. 31, 2005

(30) Foreign Application Priority Data

| Feb. 15, 2002 | (JP) | ............................ P2002-037982 |
| Feb. 15, 2002 | (JP) | ............................ P2002-037988 |
| Feb. 15, 2002 | (JP) | ............................ P2002-037992 |
| Feb. 15, 2002 | (JP) | ............................ P2002-037992 |
| Feb. 15, 2002 | (JP) | ............................ P2002-038013 |
| Mar. 15, 2002 | (JP) | ............................ P2002-073215 |
| Mar. 15, 2002 | (JP) | ............................ P2002-073223 |
| Mar. 15, 2002 | (JP) | ............................ P2002-073230 |
| Mar. 15, 2002 | (JP) | ............................ P2002-073233 |
| Mar. 15, 2002 | (JP) | ............................ P2002-073321 |

(51) Int. Cl.
*B25J 5/00* (2006.01)

(52) U.S. Cl. ............................ 318/568.12; 318/568.1; 318/568.11; 700/23; 901/1

(58) Field of Classification Search ................................ 318/568.1–568.12, 1–245; 700/1–245
See application file for complete search history.

(56) References Cited

U.S. PATENT DOCUMENTS

| 5,416,393 A | 5/1995 | Gomi et al. |
| 5,455,497 A | 10/1995 | Hirose et al. |
| 5,808,433 A | 9/1998 | Tagami et al. |

FOREIGN PATENT DOCUMENTS

| EP | 0 765 797 | 4/1997 |
| EP | 0 923 011 | 6/1999 |
| JP | 9-94785 | 4/1997 |
| JP | 11-156765 | 6/1999 |
| JP | 3026275 | 1/2000 |
| JP | 2000-254888 | 9/2000 |
| JP | 3118777 | 10/2000 |
| JP | 2001-191275 | 7/2001 |
| JP | 2001-347476 | 12/2001 |
| WO | WO 01/32366 | 5/2001 |

OTHER PUBLICATIONS

Yamaguchi, J., "Development of a biped walking robot adapting to a horizontally uneven surface"., 1994, Waseda University, IEEE, pp. 1156-1163.*

Schempf, H. "Roboleg: Arobotic soccer-ball kicking leg", 1993, IEEE, pp. 1314-1318.*

* cited by examiner

*Primary Examiner*—Marlon T. Fletcher
*Assistant Examiner*—Tyrone Smith
(74) *Attorney, Agent, or Firm*—Frommer Lawrence & Haug LLP; William S. Frommer; Thomas F. Presson

(57) ABSTRACT

In a foot of a legged mobile robot, deformation of the foot is absorbed by a first concavity and the position and shape of a ground-contact portion hardly change. Accordingly, variation in a resistive force against the moment about the yaw axis can be reduced and a spinning motion can be prevented. In addition, when the foot is placed on a bump or a step, a flexible portion deforms and receives it, and a frictional retaining force is generated between the flexible portion and the bump. Thus, the foot is flexibly adapted to the road surface, and sliding caused by the bump and excessively fast motion are prevented. Accordingly, the foot can be adapted to various kinds of road surfaces such as surfaces having bumps and depressions, and the attitude stability can be increased.

12 Claims, 54 Drawing Sheets

FIG. 15
(A)
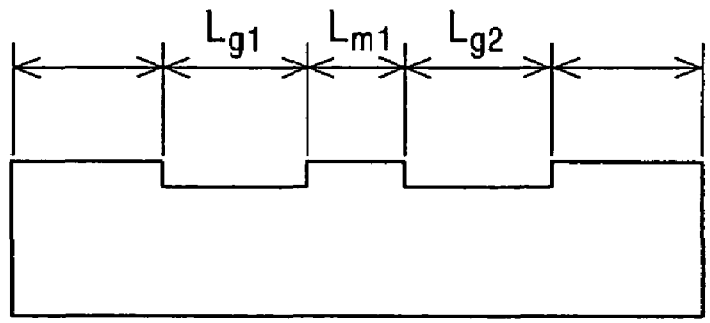
(B)
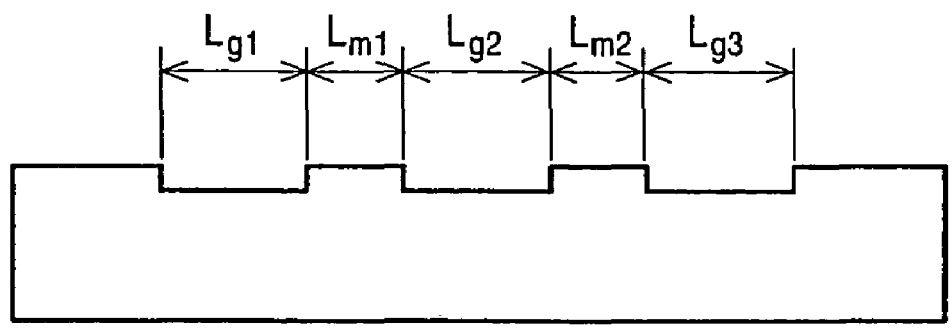

245  247  270

245  247  270

FIG. 23
(A)
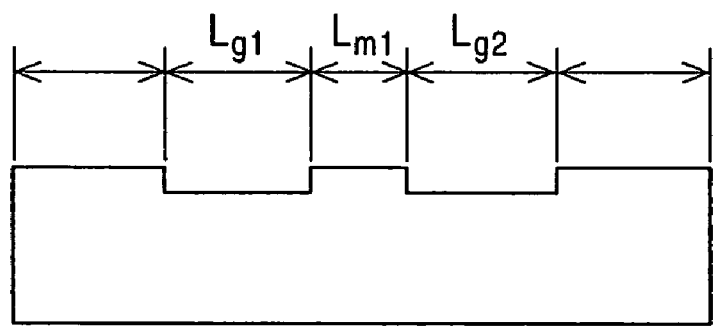
(B)
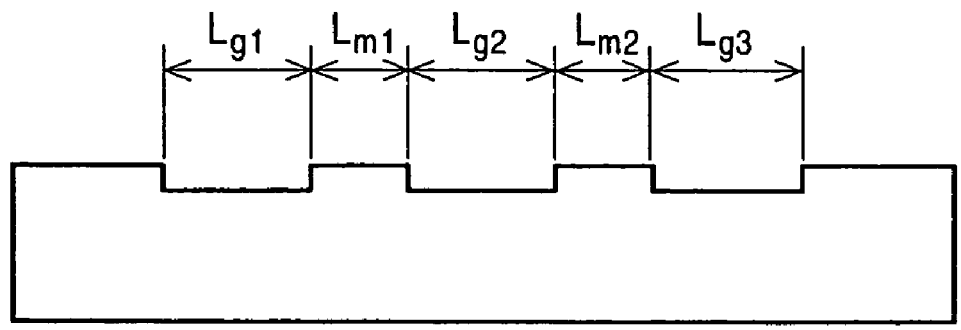

R        R

R        R

FIG. 34
(A) 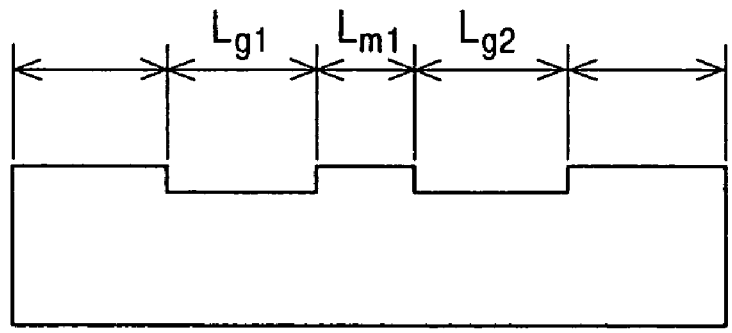
(B) 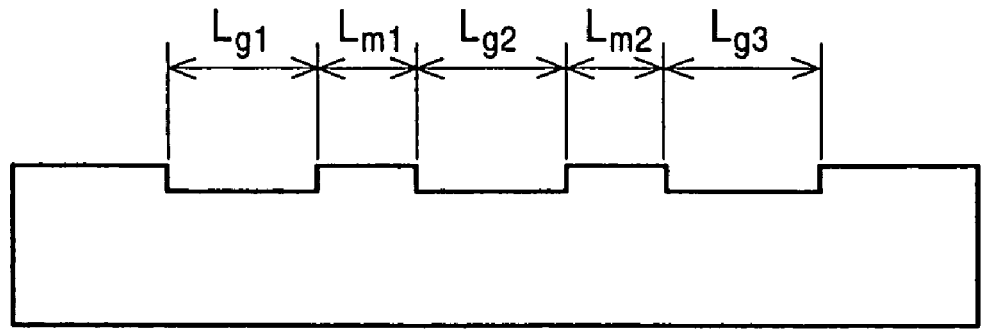

FIG. 69
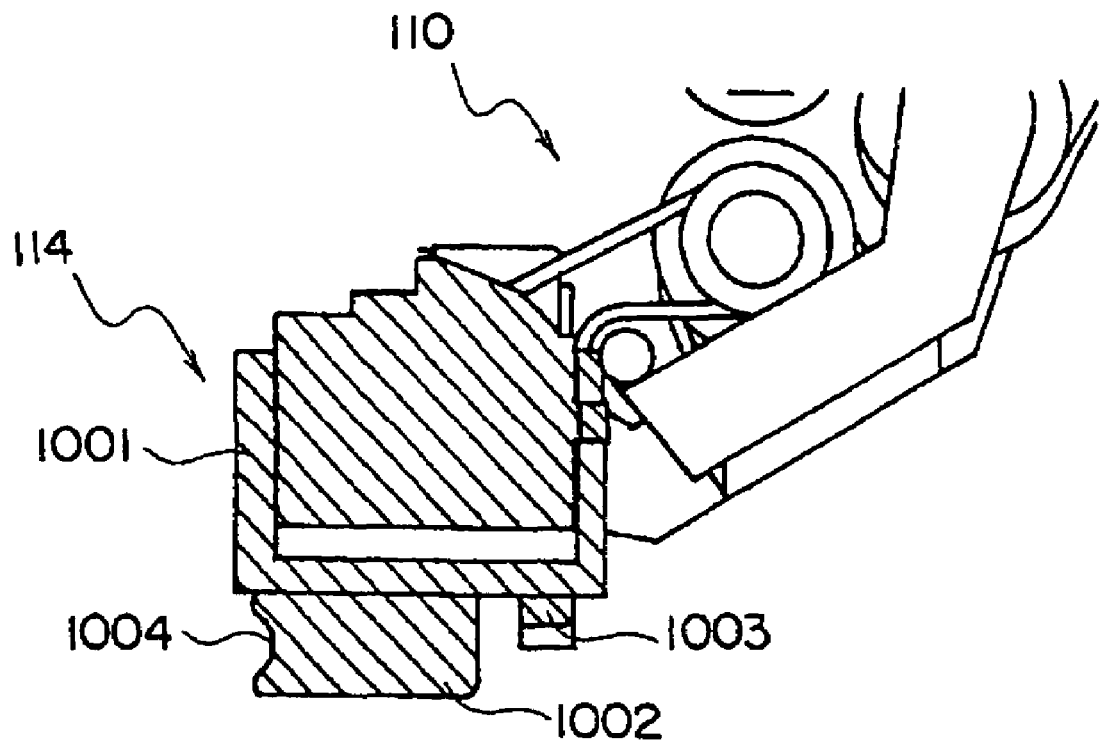
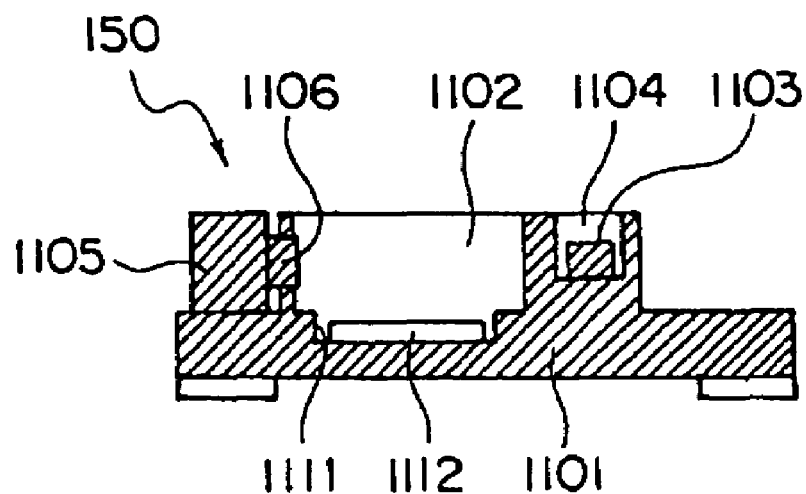

FIG. 79
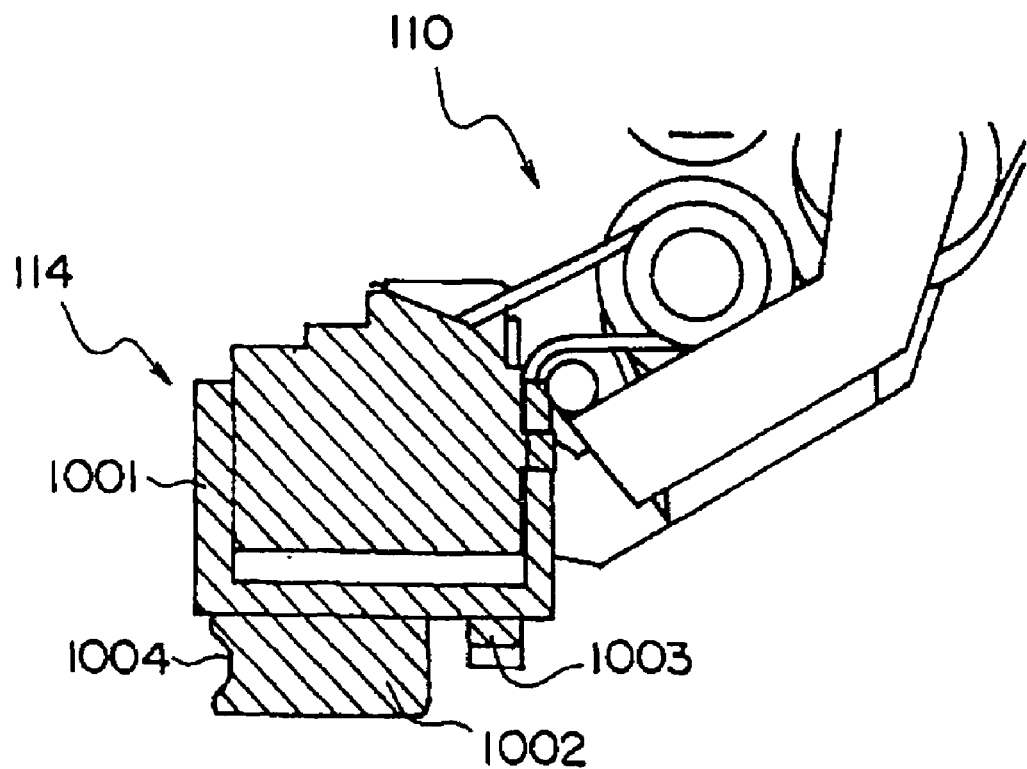
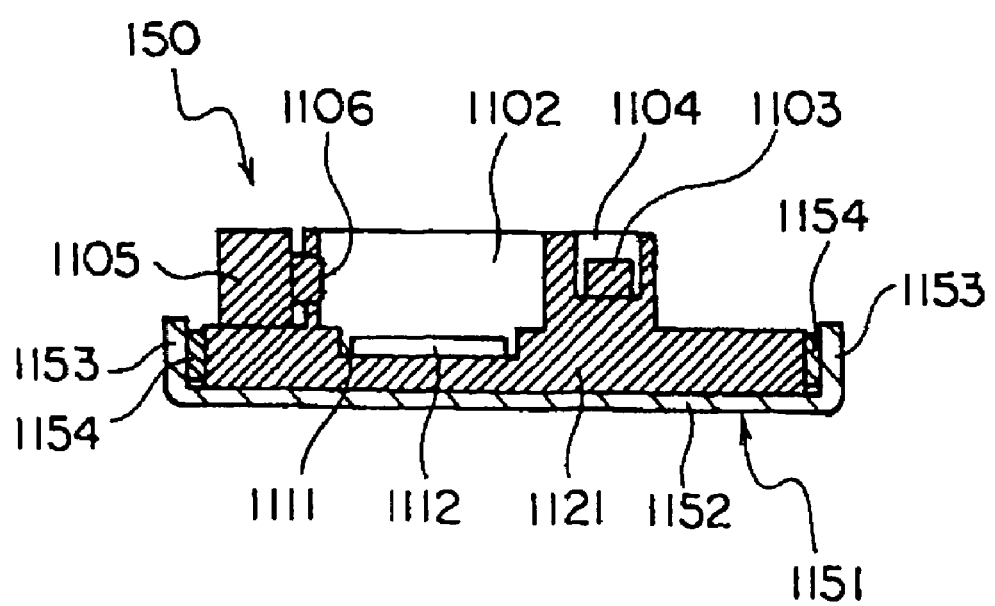

GROUND-CONTACT FRAME

RESISTIVE-FORCE-GENERATION EFFECTIVE SURFACE

GROUND-CONTACT FRAME

LEG DEVICE FOR LEG TYPE MOVABLE ROBOT, AND METHOD OF CONTROLLING LEG TYPE MOVABLE ROBOT

TECHNICAL FIELD

The present invention relates to a legged mobile robot having a plurality of movable legs, and more specifically relates to a structure of a foot which is provided on an end portion of each movable leg and which comes into contact with a floor surface (walking surface) during a walking motion. In addition, the present invention also relates to a method for controlling a legged mobile robot which corresponds to the structure of the foot.

BACKGROUND ART

In recent years, progress has been made in the research and development of legged mobile robots modeled after animals which walk upright on two feet, such as human beings and apes, and they are increasingly expected to be used for practical purposes. The legged mobile robots which walk upright on two feet are unstable compared to crawler-type, four-legged, and six-legged robots, and have a disadvantage in that attitude control and walking control thereof are complex. However, they are advantageous in that they can flexibly adapt themselves to places with severe conditions, for example, places where an operational area includes bumps and depressions as in rough terrains and places with obstacles, discontinuous walking surfaces such as stairs and ladders, etc., and perform locomotion.

Most workspaces and living spaces of human beings are designed in accordance with their body mechanisms and behavioral patterns that they walk upright on two feet. As a result, there are so many barriers for present mechanical systems using wheels or other driving devices as moving means to move in living spaces of human beings. In order for mechanical systems, that is, robots, to help people with various human tasks or carry out the tasks in place of people and to come into widespread use in people's living spaces, moving areas of the robots are preferably the same as those of people. This is the reason why there are great expectations of putting the legged mobile robots to practical use. In order to enhance the adaptability of robots to people's living environments, it is necessary that they have a construction similar to that of human beings.

Various techniques have been proposed with respect to attitude control and stable walking of the legged mobile robots which walk on two feet, and many of them use a zero moment point (ZMP) as a criterion for stability evaluation of walking motion. The stability evaluation using the ZMP is based on d'Alembert's principle that a gravity force, an inertial force, and a moment thereof are applied by a walking system to a road surface and this moment is balanced with a ground reaction force and a ground reaction moment which are applied to the walking system as a reaction from the road surface. As a result of mechanical inference, a point where moments about a pitch axis and a roll axis are zero exists in a support polygon formed by contact points between the bottom surface of a foot and the road surface or on the sides of the support polygon, and this point is called the ZMP.

Biped walking control using the ZMP as a criterion has an advantage in that positions at which each foot hits the road surface can be determined in advance and kinematic constraints on a toe portion of each foot corresponding to the shape of the road surface can be easily taken into account. In addition, when the ZMP is used as a criterion for the stability evaluation, a trajectory, instead of a force, is used as a target of motion control, and therefore, there is higher technical feasibility. The concept of the ZMP and the application thereof as a criterion for the stability evaluation of a walking robot are described in "Legged Locomotion Robots" written by Miomir kobratovic ("Walking Robots and Artificial Legs" written by Ichiro Kato et al., published by The Nikkan Kogyo Shinbun, Ltd.).

The stability and controllability of the legged mobile robots during legged motion are affected not only by moving patterns of four limbs but also by the state of a road surface (ground surface or floor surface) on which they perform the legged motion, such as walking. This is because as long as a foot is placed on the road surface, it constantly receives the reaction force from the road surface. Accordingly, the structure of the foot which directly receives the reaction force from the road surface is extremely important in view of the stability and controllability of the legged mobile robots during the legged motion, and various proposals have been made.

For example, a structure is known in which an elastic sheet composed of rubber or the like is adhered to the foot bottom surface in order to reduce an impact which occurs when an idling leg (one of the legs which is separated from the road surface) is placed on the road surface, that is, an impact in a Z-axis direction (direction perpendicular to the foot bottom surface or direction which extends along a yaw axis). In addition, a structure in which a metal plate is adhered to the bottom surface of the elastic sheet in order to prevent the breakage and deformation of the elastic sheet is also known in the art. In addition, a structure in which a metal plate is provided on the foot bottom surface with a leaf spring therebetween in order to absorb the impact in the Z-axis direction and a structure in which a rubber material is applied to the foot bottom surface in order to prevent slipping on the road surface are also known in the art.

However, most of the above-described known foot structures are obtained by making improvements for reducing the impact from the road surface when the foot hits the road surface or preventing slipping on the road surface, and the basic shape thereof is not changed from a plate-like shape, as shown in FIG. 82(A). When a foot 920 shown in FIG. 82 is placed on a road surface 911, the entire region of the foot bottom surface is in contact with the road surface 911. In this known foot, when the ZMP is at the central position of the foot 910, as shown in FIG. 82(B), load of the robot may concentrate at this point and the foot 910 may deflect away from the road surface 911 and change the shape thereof. In such a case, there is a problem in that the contact area between the foot 910 and the road surface 911 decreases and the resistive force against the moment around the yaw axis also decreases. In addition, the shape of a contact surface between the foot sole and the road surface changes along with the change in the shape of the foot, and this leads to the change in dynamic characteristics of the legged mobile robot. As a result, the attitude of the robot becomes unstable.

The reduction in the attitude stability is not only caused by the deflection of the foot sole. Also in the case in which a bump is positioned under the central area of the foot bottom surface when the foot sole is placed on the road surface, the foot falls into a so-called seesaw state and a similar problem occurs.

In addition, since no consideration is made on the corners and side edges of the foot bottom surface, that is, a ground-contact surface of the foot sole, if the road surface has bumps and depressions, the corners and side edges may interfere with the road surface with bumps and depressions when the idling leg is placed thereon, and this may cause the robot to stumble. In addition, the robot may fall into a so-called stick-slip state where the robot repeatedly stumbles and recovers. As a result, the upper body of the robot may loose balance and the attitude of the robot may become unstable.

As an index of stability of the robot's attitude, a concept referred to herein as "resistive-force-generation effective surface" is used.

When there is only one ground-contact surface between the foot and the road surface, this surface is defined as the resistive-force-generation effective surface. In addition, when the foot is in point contact with the road surface, as shown in FIG. 83, a plane which is surrounded by lines which connect every two adjacent points is defined as the resistive-force-generation effective surface. In addition, when a ground-contact portion of the foot is frame-shaped, as shown in FIG. 84, a surface surrounded by the sides of the frame is defined as the resistive-force-generation effective surface. More specifically, the "resistive-force-generation effective surface" corresponds to a surface obtained by connecting the points where the resistive force against the moment about the yaw axis generated in the legged mobile robot is applied by the road surface.

When the ZMP moves as the legged mobile robot walks, the foot deforms and the area of the resistive-force-generation effective surface decreases. Accordingly, the resistance against the moment about the yaw axis generated due to the motion of the legged mobile robot decreases and the attitude of the legged mobile robot becomes unstable. As a result, spinning motion may occur. In addition, the change in the shape of the resistive-force-generation effective surface may cause an unexpected change in the behavior of the legged mobile robot, which leads to the reduction in the attitude stability of the legged mobile robot.

Accordingly, in the foot bottom surface of the legged mobile robot, both the static and dynamic adjustments of the surface pressure applied to the ground-contact surface are necessary. In other words, not only a pressure value but also the variation and distribution thereof must be adjusted. In addition, similarly, both the static and dynamic adjustments of friction are necessary.

These problems can be solved if the walking surface is limited to mainly flat surfaces or smooth, continuous surfaces. However, it is to be noted that the actual walking surfaces include continuous, swelling surfaces and discontinuous surfaces such as surfaces with bumps and depressions or steps, and these surfaces are also the cause of the reduction in the attitude stability of the legged mobile robots.

More specifically, when a foot is placed on a step, as shown in FIG. 85, the foot totters and support moment cannot be generated at a ground-contact portion. As a result, the behavior of the foot becomes nonlinear and its control becomes extremely difficult. In addition, the motion trajectory becomes unstable, and correction control and a movement plan must be reset.

In addition, when the foot is placed on a delicate, slippery surface, such as a carpet, as shown in FIG. 86, there is a high possibility that the ground-contact surface of the foot will slip and the motion stability of the legged mobile robot will decrease considerably.

In addition, when the foot is placed on a surface with high friction or a soft surface which easily catches the foot, as shown in FIG. 87, falling moment is generated due to the inertial force, etc., when the surface pressure, which depends on the shape of the ground-contact surface of the foot, or friction in the planar direction excessively increases. Therefore, it is necessary to adjust the frictional characteristics of the ground-contact portion.

In addition, when the foot is placed on a step, as shown in FIG. 88, in addition to the problem of the support moment described above with reference to FIG. 85, there is also a problem in that the foot may slide down when conditions of the shape of the step, or a bump, are not good or when the friction is extremely low. In addition, since such a motion is extremely fast compared to control cycles, there is a risk that suitable countermeasures cannot be implemented.

In such a case, as shown in FIG. 89, a structure like a plantar arch, for example, may be formed in the foot so as to avoid the edge of the step. However, in this structure, the plantar arch comes into contact with the edge of the step or the bump such that a resistive-force-generation effective surface 921 has a triangular shape, as shown by the hatched area in the figure, and conditions for ensuring the stability become severe. The motion performance and the stability must also be ensured on the steps.

In addition, with respect to biped walking robots, there is always a possibility of falling over, which must be avoided as much as possible. In order to avoid falling over, the development of control methods is carried out in view of how to avoid the disturbance of the balance and achieve stable motion and how to recover after losing the balance. In addition to the development of control methods, foot structures shown in FIGS. 90 to 92 are used.

FIGS. 90 to 92 are plan views showing schematic constructions of known feet. In the figures, each of reference numerals 12, 22, and 32 denotes a side surface (outer side surface) which is remote from the other foot (foot which is attached to a leg which forms a pair with a leg on which the foot shown in each figure is attached). In addition, each of reference numerals 13, 23, and 33 denotes a side surface (inner side surface) which is adjacent to the other foot; each of reference numerals 14, 24, and 34 denotes a side surface at the front of the robot; and each of reference numerals 15, 25, and 35 denotes a side surface at the rear of the robot. In addition, each of reference numerals 11, 21, and 31 denotes an attachment for attaching the foot on an ankle of the corresponding leg of the robot.

In the foot shown in FIG. 90, the outer side surface 12 is curved outward. In addition, in the foot shown in FIG. 91, the outer side surface 22 includes two planar surfaces such that the outer side surface 22 projects outward, and a vertex 26 is formed on a line where the two planar surfaces intersect. In addition, in the foot shown in FIG. 92, projections 36 and 37 are formed on the outer side surface 32 and the inner side surface 33, respectively, at the central positions thereof. The purpose of forming the outer side surfaces 12, 22, and 32 such that they project outward, as shown in the figures, is to improve the stability of the robot with respect to the outward (direction away from the other foot) rotation.

In FIGS. 90 and 91, in addition to the outer side surfaces 12 and 22, the inner side surfaces 13 and 23 may also project outward in a manner similar to the outer side surfaces 12 and 22, respectively.

In the above-described known foot structures, since the outer side surface of each foot projects outward, it can be assumed that the stability with respect to the leftward and rightward rotational moment of the robot is increased in a state before falling motion starts.

However, if the foot is constructed as shown in FIG. 90, once the falling motion starts and the robot is somewhat tilted outward (to the left or right), the contact area between the outer edge (edge between the outer side surface and the bottom surface) and the road surface is gradually shifted. More specifically, the foot starts to roll along the curve of the outer edge. In addition, if the foot is constructed as shown in FIGS. 91 or 92, the outer edge of the foot comes into point contact with the road surface at a single projecting point (the vertex 26 or a corner of the projection 36). Therefore, rotating motion around the yaw axis (axis which is perpendicular to the foot bottom surface) centered on the contact point occurs depending on the position of the gravity center of the robot in the falling motion. Generally, it is extremely difficult to predict how this rotating motion occurs.

As described above, in the known foot structures, the attitude of the robot in the falling motion is not constant, and is difficult to predict. Therefore, once the falling motion starts, it is difficult to implement controls related to the falling motion, for example, control to avoid falling over, control to reduce the impact of falling over, control to recover from falling over, etc. Accordingly, the robot cannot help but fall over, and it is difficult to cause the robot to recover by itself.

In addition, since the falling motion is not constant, in order to prevent the breakage of each part of the robot due to collision with the road surface when the robot falls over, it is necessary to increase the rigidity and the impact resistance of all of the parts which may collide with the road surface. Accordingly, there is a problem in that the cost of the robot increases.

In addition, the legged mobile robots are currently moving from the research stage to practical application, and there are still many technical problems which must be solved. For example, although the state of the road surface (whether or not it is rough, the coefficient of friction thereof, etc.) has a large influence on the attitude stability control in legged walking motion and stable walking, this is not fully understood. In addition, in biped walking robots such as humanoids, the gravity center is at a higher position and the stability region of ZMP during walking is smaller compared to four-legged walking robots. Therefore, the problem of attitude variation depending on the state of the road surface is particularly important for the biped walking robots.

When the walking motion on a road surface is considered, a walking method suitable for the state of the road surface is preferably used. Japanese Patent Application No. 2000-100708, which has been assigned to the present applicant, discloses a legged mobile robot which can perform suitable legged locomotion in accordance with the state of the road surface. In the legged mobile robot according to this publication, a surface contact sensor for determining the state of contact between a foot and a road surface and a relative-movement measurement sensor for measuring the relative movement (that is, slipping) between the road surface and the leg placed on the road surface are provided on the foot (plantar or sole) of each movable leg. Even when, for example, slipping occurs and the actual trajectory is shifted from a planned or scheduled trajectory, correction of a movement plan and motion control can be performed adaptively.

In addition, when walking motion of human beings is considered, walking motion on a normal road surface and that on a slippery road surface, such as a snowy road surface, are generally different from each other. In addition, walking motion on a wooden floor and that on a thick carpet are also different from each other. Human beings walk in accordance with the state of the road surface while observing the situation with five senses, selecting how to walk from among experimentally-learned walking methods, and performing attitude control in accordance with on the situation. In addition, human beings select shoes or the like which are suitable for the road surface on which they walk, and thereby easily adapt themselves to extreme road conditions such as snowy roads and dirt roads.

With respect to the walking stability of the robots, although the robots are required to walk on various kinds of road surfaces similarly to human beings, it is difficult for the robots to perform various walking motions similarly to human beings.

On the other hand, with respect to the relationship between the robots and the road surface, when the size and the weight of the robots are similar to those of human beings, it can be assumed that the influence of the road surface on the walking state of the robots is similar to that on the walking state of human beings.

In comparison, when the size and the weight of the robots are less than those of human beings, the influence of the state of the road surface may increase. As an example, a road surface which deforms when load is applied, such as a carpet, will be described below. When a human being walks on a carpet, even when the carpet is thick, the surface of the carpet is pressed at a region where a foot is placed and the road surface becomes stable since his or her weight is sufficiently large. In addition, the reaction force from fibers of the carpet has only a small influence on the walking motion. In comparison, when a small, light robot walks on the same carpet, a pressure applied to the surface of the carpet by a foot sole of the robot is small, and the surface of the carpet cannot be sufficiently pressed at a region where the foot is placed. As a result, a situation similar to that when a human being walks on a thick mattress occurs and the walking motion is largely influenced.

It is difficult for the robots to perform various walking patterns like human beings, and the robots cannot easily adapt themselves to the road surface on which they are walking. In addition, the robots and human beings receive different kinds of influences from the road surface.

Although the foot and the foot sole of the robots are widely researched and developed, it is currently difficult to obtain a perfect foot which can be adapted to any type of road surface from a both technical and financial point of view.

In addition, the legged mobile robots are still in the research and development stage, and their development mainly aims to increase the adaptability of the robot's foot in work environments where the road surface is limited.

Accordingly, as the legged mobile robots are transferred to practical application and product development to be used in people's living spaces, it is necessary to adapt them to various states of road surfaces.

In view of the above-described situation, the present applicant has proposed a legged mobile robot having a foot which can be replaced according to the state of the road surface in Japanese Patent Application No. 2000-167681.

In addition, the present applicant has also proposed a legged mobile robot having a foot which has a two-part structure including an instep which is connected to an ankle and a foot sole which is detachably attached to the instep such that it comes into contact with the road surface (Japanese Patent Application No. 2002-037997). In this structure, the foot sole can be replaced according to the state of the road surface. Since only the foot sole, which contributes most to the adaptation to the state of the road surface and which is worn most by coming into contact with the road surface, is replaced, many kinds of foot soles suitable for various states of road surfaces can be prepared at a low cost compared to the case in which the entire foot is replaced.

In addition, when a foot or a foot sole of a legged mobile robot is replaced, settings for suitable foot motion, ZMP trajectory, trunk motion, upper limb motion, and height of hips change. Accordingly, it is necessary to change these settings. In order to suitably change these settings, information such as the shape of the foot or the foot sole, the coefficient of friction, and the weight of the foot or the foot sole must be provided to a main controller of the robot's main body. In this case, a method may be used in which the information related to the foot or the foot sole is stored in a ROM mounted in the robot's main body and a user inputs information for identifying the new foot or foot sole.

However, in this method, information corresponding to all of the feet or the foot soles to be replaced must be stored in the ROM. Thus, if an extremely large number of feet or foot soles are prepared, the number of ROMs or the capacity of the ROM must be increased accordingly. This leads to a difficult problem if a sufficiently large space cannot be provided for accommodating the ROMs as in small legged mobile robots, and high costs are incurred if a large-capacity ROM is used. In addition, it is cumbersome for the user to input the above-described identification information each time the foot or the foot sole is replaced.

In addition, in the above-described known foot structures, although the impact in the Z-axis direction applied to the foot sole by the road surface when the foot sole is place on the road surface can be somewhat absorbed with the elastic sheet or the leaf spring, a force applied in a specific or unspecific direction along a plane perpendicular to the Z-axis direction (X-Y plane) is not taken into account. More specifically, when the road surface has bumps and depressions, a part of the foot may interfere with the surface with bumps and depressions (be caught by the surface or stumble thereon) when an idling leg is placed on the road surface, and there is a risk that the upper body of the robot will lose balance and the attitude thereof will become unstable. This problem becomes more severe when a high-speed motion is performed since the reaction force from the road surface increases. In such a case, the robot takes an emergency avoidance motion based on a software process performed by control means of the robot. However, it is advantageous in view of stability control and walking control if this problem can be avoided or eased with a hardware structure of the foot.

In addition, the foot is provided with various sensors for detecting basic information used by the main controller of the robot's main body to control the motion of each part, such as movable legs. For example, when the motion control of the robot is performed by using the ZMP as the criterion for stability evaluation, a plurality of force sensors for ZMP detection are disposed on the foot bottom surface (surface which comes into contact with the road surface) in order to measure the actual ZMP. In addition, the foot may also be provided with, for example, sensors for determining whether or not the foot is placed on the road surface, sensors for determining whether or not the foot placed on the road surface is slipping on the road surface, etc.

The detection values obtained by the sensors are A/D converted and are input to a main controller of the robot's main body. Then, the main controller calculates the actual ZMP on the basis of the detection values and performs other calculation processes, and controls the motion of each part, such as the walking motion, on the basis of the calculation results.

However, since the main controller of the robot's main body directly receives the outputs from the sensors mounted on the foot and performs necessary calculation processes including the ZMP calculation, there is a problem in that a large processing load is placed on the main controller. More specifically, a computing unit of the main controller which is mounted in the robot's main body performs complex and enormous calculations for, for example, setting the motion of the robot. Accordingly, if the computing unit of the main controller must calculate the actual ZMP on the basis of the outputs from the above-described ZMP detection sensors and process outputs from other sensors, a large calculation load is placed on the computing unit of the main controller.

In addition, in order to supply the outputs from the sensors provided on each foot to the main controller of the robot's main body, complex wiring is necessary to connect the sensors and the main controller. Furthermore, when the foot is replaced, it may be necessary to change the wiring in the robot's main body if the kind, the characteristics, the number, etc., of the sensors provided on the foot are changed. In such a case, there is a problem in that a large workload is required for replacing the foot.

DISCLOSURE OF INVENTION

In view of the above-described problems, a main object of the present invention is to provide a foot of a legged mobile robot in which the variation in a resistive-force-generation effective surface caused by the variation in the shape of the foot due to the movement of the ZMP is reduced, which is adaptable to various walking surfaces such as continuous and discontinuous surfaces, rigid surfaces, viscoelastic surfaces, etc., and which ensures sufficient attitude stability of the robot.

In addition, another object of the present invention is to provide a legged mobile robot in which the variation in the resistive-force-generation effective surface caused by the variation in the shape of the foot due to the movement of the ZMP is reduced, which has a foot adaptable to various walking surfaces such as continuous and discontinuous surfaces, rigid surfaces, viscoelastic surfaces, etc., and which thereby ensures sufficient attitude stability.

In addition, another object of the present invention is to provide a structure of a foot with which the behavior of a robot when it falls over can be predicted, controls related to the falling motion, for example, control to avoid falling over, control to reduce the impact of falling over, control to recover from falling over, etc., can be easily implemented, and the breakage of each part due to falling can be prevented.

In addition, another object of the present invention is to facilitate the process in which a control system of the robot's main body acquires information related to a new foot or sole when an old one is replaced therewith, so that a workload required when the foot or the foot sole is replaced can be reduced.

In addition, another object of the present invention is to provide a legged mobile robot which can perform high-speed motion with high stability and a foot of the legged mobile robot.

In addition, another object of the present invention is to reduce a processing load placed on control means of the robot's main body, to prevent the complication of wiring for connecting the sensors provided on the foot and the control means of the robot's main body, and to facilitate the process of replacing the foot.

According to one aspect of the present invention, a foot of a legged mobile robot having a plurality of movable legs includes a first concavity formed in a ground-contact surface of the foot at a central area of the ground-contact surface and a flexible portion with a predetermined elasticity which is disposed in the first concavity.

Preferably, the flexible portion is composed of an elastic material having a predetermined elasticity or a viscous material having a predetermined viscosity. In addition, preferably, the flexible portion is composed of a material having hysteresis characteristics with respect to deformation.

In addition, preferably, the flexible portion does not come into contact with a road surface when the foot is placed thereon if the road surface is flat. In addition, preferably, the flexible portion covers the inner surface of the first concavity.

In the foot of the legged mobile robot having the above-described construction, even when the ZMP is at the central position of the foot and deflection of the foot around this position occurs, the deformation can be absorbed by a concavity including the first concavity and the position and the shape of a ground-contact portion hardly change. Accordingly, variation in the resistive force against the moment about the yaw axis can be reduced and so-called spinning motion can be prevented. In addition, motion of the legged mobile robot can be predicted and be suitably controlled by a control system, and the attitude of the legged mobile robot can be maintained stable.

In addition, when the foot is placed on a bump or a step, the bump, etc., comes into contact with the flexible portion disposed in the first concavity. Accordingly, the shape of the flexible portion changes so as to match the shape of the bump, and friction is generated between the bump and the flexible portion in that state. Thus, the foot is flexibly adapted to the road surface. As a result, the bump functions as if it is a part of the foot, and dangerous motions in view of control such as sliding and excessively fast motion can be prevented.

Preferably, a ground-contact portion which actually comes into contact with the road surface if the road surface is flat is provided at a predetermined position in a peripheral area of the foot, and the first concavity is formed in, for example, a dome shape at an area surrounded by the -ground-contact portion.

In addition, preferably, the first concavity is formed such that it extends through the foot in a direction perpendicular to the walking direction at a central position of the foot in the walking direction.

In addition, preferably, the ground-contact portion and side surfaces of the foot are connected to each other with smooth curved surfaces. More specifically, peripheral portions around the ground-contact area, that is, connecting parts between the ground-contact portion and the side surfaces of the foot, are preferably formed as smooth curved surfaces.

According to the above-described construction, even when there are bumps and depressions on the road surface, the peripheral portions can be prevented from interfering with the road surface and the foot can be prevented from being caught by the road surface or stumbling. Accordingly, the robot can be prevented from falling into a so-called stick-slip state, and stable attitude control of the robot can be performed continuously.

In addition, preferably, the foot further includes a second concavity in the first concavity, the second concavity being deeper than the first concavity, and the flexible portion is disposed in the second concavity.

Preferably, the first concavity has slopes which extend from the ground-contact portion such that the slopes are separated from the road surface, and the second concavity is deeper than the slopes of the first concavity.

In addition, preferably, the flexible portion covers at least the ceiling surface of the second concavity.

In the foot of the legged mobile robot having the above-described construction, when the foot is placed on a bump such as a step, the bump is received not only by the first concavity but also by the second concavity. Accordingly, the risk of falling into an unstable state called a seesaw state can be reduced.

In addition, if the bump comes into contact with the flexible portion disposed in the second concavity when the foot is placed on the bump, the flexible portion deforms and enwraps the bump. Accordingly, the flexible portion retains the bump by friction, and the foot is flexibly adapted to the road surface. As a result, sliding or excessively fast motion can be prevented.

In addition, preferably, the second concavity is formed such that it extends through the foot in a direction perpendicular to the walking direction at a central position of the foot in the walking direction. More specifically, the second concavity is preferably formed like a plantar arch of a human foot.

In such a case, side surfaces of the second concavity which extends through the foot preferably have shapes with smooth curved lines or linear lines on a plane parallel to the ground-contact surface. More specifically, boundary regions in front of and behind the plantar-arch portion preferably have continuous shapes with curved lines or linear lines such that discontinuous portions which have a risk of being caught by the road surface are not provided.

In addition, preferably, the side surfaces of the second concavity and the slopes of the first concavity are connected to each other discontinuously. More specifically, the side surfaces of the second concavity are not connected to the slopes of the first concavity with smooth curved surfaces but are connected with substantially discontinuous bent portions at positions separated from the road surface.

In addition, preferably, the side surfaces of the second concavity are approximately parallel to a direction perpendicular to the ground-contact surface, that is, the vertical direction, and the inclination thereof is closer to vertical than the slopes of the first concavity. Preferably, the second concavity has a columnar shape.

In the above-described construction, when, for example, the legged mobile robot walks on a carpet, fibers of the carpet enter the second concavity and come into contact with the flexible portion disposed in the second edge and receive a relatively large frictional force. In addition, the fibers encounter a side surface of the second concavity which is approximately perpendicular to the moving direction of the fibers, and are caught by the edge of the side surface of the second concavity. Accordingly, resistive force and reaction force are applied to the fibers of the carpet. These forces applied to the fibers of the carpet, which is the walking surface, serve to prevent slipping in both the walking direction and the direction opposite thereto. As a result, even when the legged mobile robot walks on a slippery carpet, a suitable frictional force can be applied to the foot and a suitable impelling force can be obtained during walking.

In addition, a legged mobile robot according to the present invention includes a plurality of movable legs and a foot which is provided on an end portion of each of the movable legs. The foot includes a first concavity formed in a ground-contact surface of the foot at a central area of the ground-contact surface and a flexible portion with a predetermined elasticity which is disposed in the first concavity.

In addition, according to another aspect of the present invention, a foot of a legged mobile robot having a plurality of movable legs includes a first concavity formed in a ground-contact surface of the foot at a central area of the ground-contact surface, the first concavity being, for example, dome-shaped, and one or more grooves which are formed, each groove being formed in the ground-contact surface of the foot such that the groove extends from the first concavity across a peripheral portion of the foot and communicates with the outside through one of side surfaces of the foot.

In the foot of the legged mobile robot having the above-described construction, even when the ZMP is at the central position of the foot and deflection of the foot around this position occurs, the deformation can be absorbed by a concavity including the first concavity and the position and the shape of a ground-contact portion hardly change. Accordingly, variation in the resistive force against the moment about the yaw axis can be reduced and spinning motion can be prevented. In addition, motion of the legged mobile robot can be predicted and be suitably controlled by a control system, and the attitude of the legged mobile robot can be maintained stable.

Preferably, the foot of the legged mobile robot according to the present invention includes a plurality of ground-contact portions disposed on a ground-contact surface of the foot at predetermined positions in the peripheral area of the ground-contact surface, and one of more grooves are formed such that they extend between the adjacent ground-contact portions.

In addition, preferably, four grooves are formed such that they extend from the first concavity to four sides of the foot, that is, the front side of the foot in the walking direction, the rear side of the foot in the walking direction, and the left and right sides of the foot with respect to the walking direction.

Preferably, side surfaces of the grooves have shapes with nonlinear curves on a plane parallel to the ground-contact surface, and a suitable frictional force is generated when, for example, fibers of a carpet come into contact with the side surfaces of the grooves. For example, the widths of the grooves preferably decrease toward the sides of the foot, so that the fibers are forcibly moved such that the contact resistance increases.

In addition, parts of the side surfaces of the grooves are preferably formed of smooth curved surfaces so that they can be prevented from being caught by the road surface, etc.

In addition, preferably, the ground-contact portions and the side surfaces of the foot are connected to each other with smooth curved surfaces. More specifically, peripheral portions around the ground-contact surfaces, that is, connecting parts between the ground-contact portions and the side surfaces of the foot, are preferably formed as smooth curved surfaces.

According to the above-described construction, when there are bumps and depressions on the road surface, the peripheral portions can be prevented from interfering with the road surface and the foot can be prevented from being caught by the road surface or stumbling. Accordingly, the robot can be prevented from falling into a so-called stick-slip state, and stable attitude control of the robot can be performed continuously.

In addition, preferably, the foot further includes a second concavity in the first concavity, the second concavity being deeper than the first concavity. For example, the first concavity has a slope which extends from the ground-contact portion such that the slope is separated from the road surface, and the second concavity is deeper than the slope of the first concavity.

In the foot of the legged mobile robot having the above-described construction, when the foot is placed on a bump such as a step, the bump is received not only by the first concavity but also by the second concavity. Accordingly, the risk of falling into an unstable state called a seesaw state can be reduced.

In addition, preferably, a side surface of the second concavity and the slope of the first concavity are connected to each other discontinuously. More specifically, the side surface of the second concavity is not connected to the slope of the first concavity with a smooth curved surface but is connected with a substantially discontinuous bent portion at a position separated from the road surface.

In addition, preferably, the side surface of the second concavity is approximately parallel to a direction perpendicular to the ground-contact surface, that is, the vertical direction, and the inclination thereof is closer to vertical than the slope of the first concavity. The second concavity has, for example, a columnar shape.

In the above-described construction, when, for example, the legged mobile robot walks on a carpet, fibers of the carpet enter the second concavity and come into contact with a flexible portion disposed in the second edge and receive a relatively large frictional force. In addition, the fibers encounter the side surface of the second concavity which is approximately perpendicular to the moving direction of the fibers, and are caught by the edge of the side surface of the second concavity. Accordingly, resistive force and reaction force are applied to the fibers of the carpet. These forces applied to the fibers of the carpet, which is the walking surface, serve to prevent slipping in both the walking direction and the direction opposite thereto. As a result, even when the legged mobile robot walks on a slippery carpet, a suitable frictional force can be applied to the foot and a suitable impelling force can be obtained during walking.

In addition, preferably, a flexible portion having a predetermined elasticity is disposed in the first concavity or in the second concavity. The flexible portion is preferably composed of an elastic material having a predetermined elasticity or a viscous material having a predetermined viscosity. In addition, preferably, the flexible portion is composed of a material having hysteresis characteristics with respect to deformation.

In addition, preferably, the flexible portion does not come into contact with the road surface when the foot is placed thereon if the road surface is flat. For example, the flexible portion covers the inner surface of the first concavity, or at least the ceiling surface of the second concavity.

In the foot of the legged mobile robot having the above-described construction, when the foot is placed on a bump or a step, the bump, etc., comes into contact with the flexible portion disposed in the first concavity or the second concavity. Accordingly, the shape of the flexible portion changes so as to match the shape of the bump, and friction is generated between the bump and the flexible portion in that state. Thus, the foot is flexibly adapted to the road surface. As a result, the bump functions as if it is a part of the foot, and dangerous motions in view of control such as sliding and excessively fast motion can be prevented.

In addition, a legged mobile robot according to the present invention includes a plurality of movable legs and a foot which is provided on an end portion of each of the movable legs. The foot includes a first concavity formed in a ground-contact surface of the foot at a central area of the ground-contact surface and one or more grooves, each groove being formed in the ground-contact surface of the foot such that the groove extends from the first concavity across a peripheral portion of the foot and communicates with the outside through one of side surfaces of the foot.

In addition, according to another aspect of the present invention, a foot of a legged mobile robot includes a ground-contact portion disposed on a ground-contact surface of the foot at a predetermined position in a peripheral area of the ground-contact surface, a first concavity formed in the ground-contact surface of the foot at an area surrounded by the ground-contact portion, the first concavity having a slope which extends from the ground-contact portion such that the slope is separated from the road surface, and a second concavity in the first concavity, the second concavity being deeper than the slope of the first concavity. Preferably, the first concavity is dome-shaped and the second concavity is column-shaped. More specifically, the second concavity is formed as, for example, a recess of a circular column shape.

In the foot of the legged mobile robot having the above-described construction, even when the ZMP is at the central position of the foot and deflection of the foot around this position occurs, the deformation can be absorbed by a concavity including the first concavity and the second concavity and the position and the shape of the ground-contact portion hardly change. Accordingly, variation in the resistive force against the moment about the yaw axis can be reduced and spinning motion can be prevented. In addition, motion of the legged mobile robot can be predicted and be suitably controlled by a control system, and the attitude of the legged mobile robot can be maintained stable.

In addition, when the foot is placed on a bump such as a step, the bump is received by the concavity including the first concavity and the second concavity. Accordingly, the risk of falling into an unstable state called a seesaw state can be reduced.

In addition, preferably, a side surface of the second concavity is approximately parallel to a direction perpendicular to the ground-contact surface, that is, the vertical direction, and the inclination thereof is closer to vertical than the slope of the first concavity.

In addition, the side surface of the second concavity and the slope of the first concavity are preferably connected to each other discontinuously. More specifically, the side surface of the second concavity may also be formed such that it is not connected to the slope of the first concavity with a smooth curved surface but is connected with a substantially discontinuous bent portion at a position separated from the road surface due to the inclination of the slope of the first concavity.

According to the above-described construction, when, for example, the legged mobile robot walks on a carpet, fibers of the carpet enter the second concavity and encounter the side surface of the second concavity or are caught by the side surface of the second concavity. The surface encountered by the fibers are approximately perpendicular to the direction in which the fibers encounters this surface, and force cannot be dispersed as in the case in which this surface is a continuous surface such as a slope and a curved surface. Accordingly, resistive force and reaction force are applied to the fibers of the carpet by the side surface and the edge of the second concavity encountered by the fibers of the carpet. These forces applied to the fibers of the carpet, which is the walking surface, serve to prevent slipping in both the walking direction and the direction opposite thereto. As a result, even when the legged mobile robot walks on a slippery carpet, a suitable frictional force can be applied to the foot and a suitable impelling force can be obtained during walking. In addition, the second concavity is formed such that it extends through the foot in a direction perpendicular to the walking direction at a central position of the foot in the walking direction. More specifically, the second concavity is preferably formed like a plantar arch of a human foot. In such a case, side surfaces of the second concavity which extends through the foot preferably have shapes with smooth curved lines or linear lines on a plane parallel to the ground-contact surface. More specifically, boundary regions in front of and behind the plantar-arch portion preferably have continuous shapes with curved lines or linear lines such that discontinuous portions which have a risk of being caught by the road surface are not provided.

In addition, preferably, the ground-contact portion and side surfaces of the foot are connected to each other with smooth curved surfaces. More specifically, peripheral portions around the ground-contact area, that is, connecting parts between the ground-contact portion and the side surfaces of the foot, are preferably formed as smooth curved surfaces. According to this construction, even when there are bumps and depressions on the road surface, the peripheral portions can be prevented from interfering with the road surface and the foot can be prevented from being caught by the road surface or stumbling. Accordingly, the robot can be prevented from falling into a so-called stick-slip state, and stable attitude control of the robot can be performed continuously.

In addition, a legged mobile robot according to the present invention includes a plurality of movable legs and a foot which is provided on an end portion of each of the movable legs. The foot includes a ground-contact portion disposed on a ground-contact surface of the foot at a predetermined position in a peripheral area of the ground-contact surface, a first concavity formed in the ground-contact surface of the foot at an area surrounded by the ground-contact portion, the first concavity having a slope which extends from the ground-contact portion such that the slope is separated from the road surface, and a second concavity in the first concavity, the second concavity being deeper than the slope of the first concavity.

In addition, according to another aspect of the present invention, a legged mobile robot includes a plurality of movable legs and a foot provided on each of the movable legs. The foot includes a foot sole having a foot bottom surface and side surfaces which extend continuously from the periphery of the foot bottom, the foot sole including a plantar-arch portion having a slope which slopes toward the inside of the foot bottom surface.

According to the present invention, the plantar-arch portion having a slope which slopes toward the inside of the foot bottom surface is provided, and a ground-contact portion which comes into contact with the road surface is disposed around the plantar-arch portion. Accordingly, even when the ZMP is at the central position of the foot sole and deflection of the foot sole around this position occurs, the deformation can be absorbed by the plantar-arch portion and the position and the shape of the ground-contact portion hardly change. Accordingly, variation in the resistive force against the moment about the yaw axis can be reduced and so-called spinning motion can be prevented. In addition, motion of the legged mobile robot controlled by a control system can be predicted, and the attitude stability can be improved.

In addition, since the plantar-arch portion is provided, even if the central area of the foot bottom surface is positioned above a bump on the road surface when the foot sole is placed on the road surface, the possibility that the foot will step on the bump can be reduced. Accordingly, the possibility that the foot will fall into a so-called seesaw state can be reduced.

Preferably, the foot bottom surface and the side surfaces of the foot sole are connected to each other with smooth curved surfaces. In such a case, since the corners and the side edges of the foot sole are formed of smooth curved surfaces, even when there are bumps and depressions on the road surface, the corners and the side edges can be prevented from interfering with the road surface and the foot can be prevented from being caught by the road surface or stumbling. Accordingly, the robot can be prevented from falling into a stick-slip state, and the stability of the robot's attitude can be improved. The plantar-arch portion has a tapered surface which extends continuously from the ground-contact portion, and may be domed-shaped or cone-shaped.

In addition, although the shape of the foot sole is not particularly limited, it may be rectangular shaped or rectangular-plate shaped. Although a foot structure is known in which the periphery of a foot sole is curved, for example, a side edge of the foot sole is curved to project outward, when this structure is used, there is a risk in that the foot will roll along the curved side and the attitude stability of the robot will be reduced when the robot is tilted toward this side. In comparison, when the bottom shape of the foot sole is rectangular, that is, when the side edges of the foot sole are linear, the rolling motion can be prevented.

In addition, the ground-contact portion is preferably disposed at each of four corners of the foot bottom surface. By increasing the distances between the ground-contact portions, the resistive force against the moment about the yaw axis can be increased and the attitude stability of the robot can be improved.

In addition, according to another aspect of the present invention, a legged mobile robot includes a pair of movable legs and a foot which is attached to an end portion of each of the movable legs. The foot includes a foot sole having a rectangular foot bottom surface which comes into contact with a road surface and a plurality of side surfaces which extend continuously from side edges of the foot bottom surface. The shape of one of the side surfaces corresponding to an outer side edge of the foot bottom surface which is remote from the other foot is set such that the shape of the outer side edge is a substantially linear line when the outer side edge is projected onto a plane including the foot bottom surface. In the description above, "substantially linear line" is not necessarily an exactly linear line from a geometric point of view, and includes any line which can be considered as linear with respect to the road surface.

According to the present invention, when, for example, the robot loses its balance to the left or right and the foot placed on the road surface rotates around the outer side edge, the entire region of the outer edge is in line contact with the road surface. Accordingly, the robot rotates outward around the outer side edge without causing the rotation around the yaw axis of the foot sole (axis perpendicular to the foot bottom surface).

Alternatively, the foot attached to the end portion of each of the movable legs includes a foot sole having a polygonal bottom surface which comes into contact with a road surface and a plurality of side surfaces which extend continuously from side edges of the foot bottom surface. The shape of at least one of the side surfaces is set such that the shape of the corresponding side edge is an inwardly curved line when the side edge is projected onto a plane including the foot bottom surface.

For example, the shape of one of the side surfaces corresponding to an outer side edge of the foot bottom surface (side edge which is remote from the other foot) is set such that the shape of the outer side edge is an inwardly curved line when the outer side edge is projected onto a plane including the bottom surface. In such a case, when, for example, the robot loses its balance to the left or right and the foot placed on the road surface rotates around the outer side edge, only two points at the front and rear of the outer side edge which project most are in contact with the road surface. Accordingly, the robot rotates outward around an imaginary line which connects the two points without causing the rotation around the yaw axis of the foot sole (axis perpendicular to the foot bottom surface). This also applies to other side edges.

When the above-described foot structure is used, the attitude and behavior of the robot when it falls over can be predicted to some extent. Accordingly, controls related to the falling motion such as control to avoid falling over (for example, control to recover the balance by suitably moving the gravity center), control to reduce the impact of falling over (for example, control to place a hand of the robot on the road surface to prevent the robot's body from directly colliding with the road surface), and control to recover after falling over (for example, control to stand up from the fallen state), can be easily implemented. In addition, since the robot falls over around a predetermined line without causing the rotation around the yaw axis, it is only necessary that parts on the sides of the robot which are expected to collide with the road surface first be provided with anti-impact measures (for example, the corresponding parts may be constructed such that they have high-rigidity or impact-resistant structure or buffers such as cushions may be provided on the corresponding parts). Accordingly, the costs can be reduced.

In addition, notches may be formed in the side surfaces at the central positions of the side surfaces. If there is a small bump or an obstacle on the road surface when the robot falls over, there is a risk in that the foot will step on the obstacle, etc., and the above-described state in which the outer side edge is in line contact or two-point contact with the road surface cannot be obtained. However, when the notches are formed in the side surfaces, the foot can be prevented from stepping on a small bump or an obstacle and unexpected change in the attitude and behavior of the robot in the falling motion can be reduced.

In addition, according to another aspect of the present invention, a legged mobile robot includes a movable leg and a foot which is provided on an end portion the movable leg. The foot includes a main foot body which is detachably attached to an end portion the movable leg and memory means which is provided on the main foot body and which stores information related to the main foot body.

Alternatively, the foot includes a main foot body which is detachably attached to an end portion of the movable leg, memory means which is provided on the main foot body and which stores information related to the main foot body, and control means which controls the motion of the movable leg on the basis of the information stored in the memory means. In this case, the control means may read out the information stored in the memory means at the time of initialization. The time of initialization is the time when the power of the robot is turned on, when the robot is reset, or when the main foot body is attached to the movable leg.

In addition, a method for controlling a legged mobile robot having the above-described construction includes the steps of storing information related to the foot in memory means provided on the foot; reading out the information from the memory means at the time of initialization; and controlling motion of the movable leg on the basis of the information read out.

In addition, a foot of a legged mobile robot may include an instep which is attached to an end portion of the movable leg, a foot sole detachably attached to the instep, memory means which is provided on the foot sole and which stores information related to the foot sole, and read-out means which is provided on the instep and which reads out the information stored in the memory means.

In addition, in order to reduce the interference of the foot with the road surface and improve the attitude stability, the foot sole is preferably attached to the instep in a movable manner. In such a case, buffer means or urging means for reducing the impact transmitted to the instep due to the movement of the foot sole is preferably provided between the foot sole and the instep.

In addition, the foot sole may be attached to the instep by fastening means with variable fastening conditions.

According to the present invention, since the memory means which stores the information related to the foot is provided on the foot (main foot body or foot sole), a main control system of the robot's main body which controls the motion of the movable leg can read out the information stored in the memory means and control the motion of the movable leg on the basis of information including the information read out. Accordingly, it is not necessary to input the information related to the foot into a memory included in the main control system of the robot, and the task of replacing the foot can be facilitated. In addition, it is not necessary that the memory included in the main control system store information related to a plurality of feet which are planned to be replaced. Accordingly, the number of memories or the capacity of the memory can be reduced. Alternatively, the memory can be used for storing other information.

In addition, only the foot sole, instead of the entire body of the foot, is replaced in the above-described construction, and the instep can be efficiently used in common for all kinds of foot soles. Since the shape and material of a portion which comes into contact with the road surface (foot bottom) generally have large influence on the adaptation of the foot to various states of road surfaces, it is sufficient if this portion is replaced.

The information related to the main foot body or the foot sole includes information necessary for the control system of the robot's main body which controls the overall motion of the robot to perform trajectory calculation of the foot or the foot sole and other processes necessary for motion control. The information related to the main foot body or the foot sole is not particularly limited, and it may include, for example, identification information, shape (shape of the ground-contact surface which comes into contact with the road surface, etc.), material, weight, and coefficient of friction of the foot bottom surface of the main foot body or the foot sole, and the number, arrangement, and characteristics (both static and dynamic) of sensors (force sensors for detecting the ZMP, an acceleration sensor for detecting collision or inclination of the road surface, a ground-contact detection sensor, etc.) mounted on the main foot body or the foot sole. It is not necessary that all of the above-mentioned information elements be included in the information related to the main foot body or the foot sole as long as one of them is included.

The memory means may be an electronic memory device such as a ROM, an EPROM, and a SRAM. In addition, the memory means may also be a memory device using an arrangement such as a barcode and pins, a memory device using symbols and characters, a memory device in which information is recorded magnetically or optically, a mechanical switch, and other various memory devices. In such cases, read-out means suitable for the memory means (for example, a processing device such as a CPU, an imaging device such as a CCD, etc.) is used, and the read-out means may either be of a contact-type or a non-contact type.

In addition to the main control system of the robot's main body, a foot-mounted control system which communicates with the main control system may be provided on the main foot body or the instep. In this case, the information is read out from the memory means by the foot-mounted control system, and is transmitted directly, or after being subjected to a certain process, to the main control system of the robot's main body.

In addition, according to another aspect of the present invention, a legged mobile robot includes a movable leg, an instep attached to an end portion of the movable leg, and a foot sole attached to the instep such that the foot sole can move along a plane approximately parallel to a foot bottom surface. The "foot bottom surface" refers to a surface including a portion of the foot sole which comes into contact with a floor surface when the legged mobile robot is in an upright position on a flat floor surface (if there are a plurality of such portions, a surface including all of them).

Since the foot sole can move along a plane approximately parallel to the foot bottom surface, even when there are bumps and depressions on the road surface and a part of the foot sole interferes with them when the idling leg is placed on the road surface, the foot sole can move along the above-described surface so as to eliminate such interference or absorb the force applied by the road surface. Accordingly, the stable motion of the robot can be continued.

The foot sole may include a bottom portion which faces the bottom surface of the instep and side portions which face side surfaces of the instep with gaps therebetween, so that the foot sole can move within a range corresponding to the gaps between the side surfaces of the instep and the side portions. When the legged mobile robot walks, there is a risk that not only the bottom surface of the foot but also the side surfaces thereof will strike or interfere with an object. However, when the above-described construction is used, the side portions of the movable foot sole strike or interfere with the object and the entire body of the foot sole moves along the bottom surface of the instep. Accordingly, the motion can be continued without degrading the stability.

In addition, buffer means may be disposed between the foot sole and the instep. The buffer means may be constructed of elastic means, viscous means, or the combination of the elastic means and the viscous means. When the buffer means is provided, the impact transmitted from the foot sole to the instep can be reduced, and vibration of the foot sole can be suppressed. Accordingly, noise can be reduced. In addition, in the case in which the foot sole can simply move along the bottom surface of the instep, sufficient effect thereof may not be obtained when the foot sole is at the end of the movable range. However, when the buffer means is provided, the foot sole can be placed at a suitable position relative to the instep when no external force is applied to the foot sole.

In addition, when the buffer means including both the elastic means and the viscous means is provided, the elasticity coefficient of the elastic member and the viscosity coefficient of the viscous member are preferably set such that the vibration of the foot sole which occurs when the foot sole leaves the road surface in the walking motion of the movable leg is reduced to a predetermined amount before the foot sole is placed on the road surface again. When vibration greater than the predetermined extent remains when the idling leg is placed on the road surface, there is a risk that the trajectory calculation and other calculations necessary for control which are performed by the control system of the robot must be corrected. The predetermined extent refers to a minimum necessary vibration which can be tolerated while the control system of the robot achieves stable walking motion.

In addition, according to another aspect of the present invention, a legged mobile robot includes a movable leg, control means for controlling the motion of the movable leg, and a foot provided on an end portion of the movable leg. The foot includes a main foot body attached to the movable leg, at least one sensor provided on the main foot body for detecting information used for controlling the motion of the movable leg, and foot-mounted processing means provided on the main foot body for performing a predetermined calculation process on the basis of an output from the sensor in accordance with the kind of the sensor.

Alternatively, a legged mobile robot includes a main foot body attached to the movable leg, at least one sensor provided on the main foot body for detecting information used for controlling the motion of the movable leg, foot-mounted processing means provided on the main foot body for performing a predetermined calculation process on the basis of an output from the sensor in accordance with the kind of the sensor, and communication means for supplying an output from the foot-mounted processing means to the control means.

Alternatively, a foot of a legged mobile robot which is provided on an end portion of a movable leg includes an instep attached to the movable leg, a foot sole which is movably attached to the instep, at least one sensor provided on the instep for detecting information used for controlling the motion of the movable leg, and foot-mounted processing means provided on the instep for performing a predetermined calculation process on the basis of an output from the sensor in accordance with the kind of the sensor.

Alternatively, a legged mobile robot includes an instep attached to the movable leg, a foot sole which is movably attached to the instep, at least one sensor provided on the instep for detecting information used for controlling the motion of the movable leg, foot-mounted processing means provided on the instep for performing a predetermined calculation process on the basis of an output from the sensor in accordance with the kind of the sensor, and communication means for supplying an output from the foot-mounted processing means to the control means.

The sensor may be, for example, a force sensor or an acceleration sensor. However, the kind and the purpose of installation of the sensor are not particularly limited. The foot-mounted processing means performs a calculation process corresponding to the kind, the purpose of installation, etc., of the sensor. For example, the foot-mounted processing means may calculate the ZMP of the foot on the basis of outputs from force sensors provided at a plurality of (at least three) positions for detecting pressures applied vertically to a surface (foot bottom surface) including a ground-contact portion on the bottom surface of the main foot body or the foot sole which comes into contact with the ground. In addition, the foot-mounted processing means may also perform calculations for detecting collision of the foot with an obstacle or stumbling motion based on an outputs from an acceleration sensor or calculations for determining the inclination angle of the road surface on which the foot is placed based on an output from an acceleration sensor.

According to the present invention, since the foot-mounted processing means which calculates the ZMP is provided on the main foot body or the instep and the foot-mounted processing means calculates the ZMP on the basis of the outputs from the sensors, the control means of the robot's main body can simply receive the calculation results and control the motion of the movable leg on the basis of information including the calculation results. Accordingly, it is not necessary for the control means of the robot's main body to perform the ZMP calculation, and the control means of the robot's main body can be dedicated to other calculation processes for, for example, motion control of the movable leg. Thus, the processing load on the control means can be reduced. As a result, processes with high urgency can be performed without delay, and complex motions which require a large amount of calculation can be achieved.

In addition, when the sensors are optimized in accordance with the relationship with the foot-mounted processing means, the foot-mounted processing means can be adapted to various sensors of different kinds, characteristics, numbers, etc. In other words, the foot can be modularized. Accordingly, changes required in the mechanism of the robot's main body and information stored therein due to the replacement of the foot can be reduced, and the task of replacing the foot can be facilitated.

In addition, since the sensors are provided on the instep along with the foot-mounted processing means for calculating the ZMP on the basis of the outputs from the sensors, different from the case in which the sensors are provided on the foot sole, wires for connecting the sensors to the foot-mounted processing means do not include moving portions. Therefore, the movement of the foot sole can be prevented from being impeded by the wires and the wires can be prevented from being damaged by the movement of the foot sole. In particular, when the ZMP-detection sensors are provided on the bottom surface of the instep, the ZMP-detection sensors receive pressures from the top surface of the foot sole, which is equivalent to the road surface in view of ZMP detection, and errors in detection values due to the variation in the state of the road surface can be reduced. Accordingly, the ZMP can be detected more accurately.

The main foot body may be detachably attached to the movable leg with attaching/detaching means.

Alternatively, the foot sole may be detachably attached to the instep with attaching/detaching means. In addition, attaching/detaching means for detachably attaching the instep to the movable leg may also be used in addition to or instead of the attaching/detaching means for detachably attaching the foot sole to the instep.

According to the present invention, since the foot-mounted processing means for processing the outputs from the sensors provided on the main foot body or the instep is provided on the main foot body or the instep, the control means of the robot's main body can simply receive the processing results and control the motion of the movable leg on the basis of information including the processing results. Accordingly, it is not necessary for the control means of the robot's main body to perform the processes based on the outputs from the sensors provided on the main foot body or the instep (for example, ZMP calculation is performed if the ZMP-detection sensors are provided and processes for calculating the inclination of the road surface or detecting the stumbling motion are performed if the acceleration sensor is provided), and the control means of the robot's main body can be dedicated to other calculation processes for, for example, motion control of the movable leg. Thus, the processing load on the control means can be reduced. As a result, processes with high urgency can be performed without delay, and complex motions which require a large amount of calculation can be achieved.

In addition, in the known structure, an exclusive wire must be provided for each sensor in order to supply the detection values of the sensors provided on the main foot body or the instep to the control means. However, since the detection values are first processed by the foot-mounted processing means and the processing results are transmitted to the control means, wiring can be made simpler.

In addition, when the sensors provided on the main foot body or the instep are optimized in accordance with the relationship with the foot-mounted processing means, the foot-mounted processing means can be adapted to various sensors of different kinds, characteristics, numbers, etc. In other words, the foot can be modularized. Accordingly, changes required in the mechanism of the robot's main body and information stored therein due to the replacement of the foot can be reduced, and the task of replacing the foot can be facilitated.

In addition, since the sensors are provided on the instep along with the foot-mounted processing means for processing the outputs from the sensors, wires for connecting the sensors to the foot-mounted processing means do not include movable portions. Therefore, the movement of the foot sole can be prevented from being impeded by the wires and the wires can be prevented from being damaged by the movement of the foot sole.

In addition, in the case in which the foot sole is attached to the instep such that the foot sole can move along a plane approximately parallel to the foot bottom surface, even when there are bumps and depressions on the road surface and a part of the foot sole interferes with them, the foot sole can move along the above-described surface so as to eliminate such interference or absorb the force applied by the road surface. Accordingly, the stable motion of the robot can be continued.

Further objects, features and advantages of the present invention will become apparent from the following description of the preferred embodiments with reference to the attached drawings.

BRIEF DESCRIPTION OF THE DRAWINGS

FIG. 15 is a diagram for explaining the shape of a doorsill which is assumed to be stepped on by the foot of the legged mobile robot shown in FIG. 11.

FIG. 23 is a diagram for explaining the shape of a doorsill which is assumed to be stepped on by the foot of the legged mobile robot shown in FIG. 16.

FIG. 34 is a diagram for explaining the shape of a doorsill which is assumed to be stepped on by the foot of the legged mobile robot shown in FIG. 30.

FIG. 69 is a sectional view showing a connection/replacement structure of a leg and a foot at an ankle according to a first example.

FIG. 79 is a diagram showing a connection/replacement structure of a leg and a foot according to a fifth example, and is a sectional view showing the construction of the foot and a connecting part in the state in which the foot is removed from an ankle.

BEST MODE FOR CARRYING OUT THE INVENTION

Embodiments of the present invention will be described below with reference to the accompanying drawings.

Overall Construction

First, the overall construction of a legged mobile robot will be described below with reference to FIGS. 1 to 3.

Figure 1:
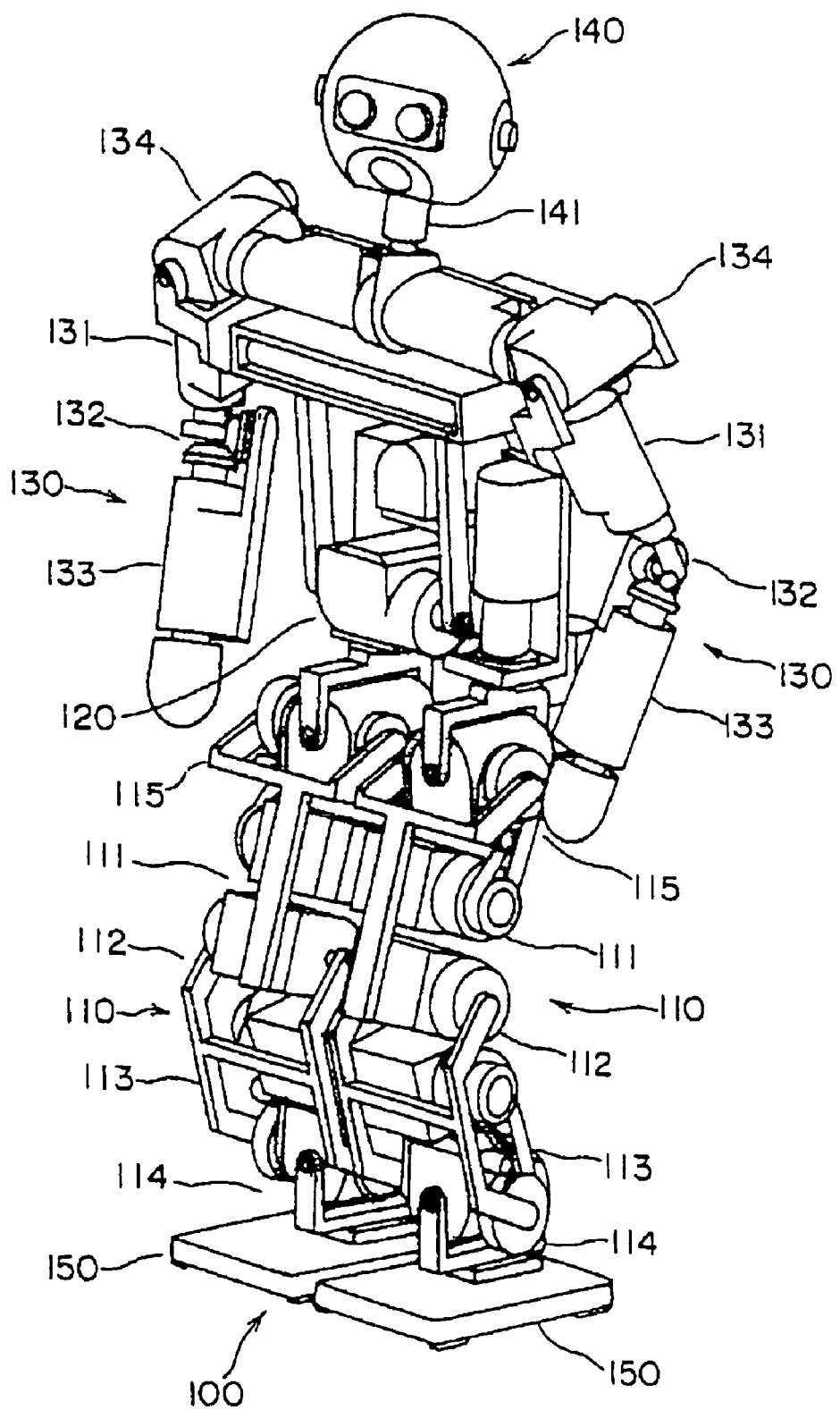
FIG. 1 is a front view of a "human-shaped" legged mobile robot 100 according to a first embodiment of the present invention which is in an upright position.

FIG. 1 is a front view of a "human-shaped" legged mobile robot 100 according to a first embodiment of the present invention which is in an upright position. In addition, FIG. 2 is a rear view of the legged mobile robot 100 in an upright position.

As shown in the figures, the legged mobile robot 100 includes left and right lower limbs 110 used as movable legs for performing legged locomotion, a trunk 120, left and right upper limbs 130, and a head 140.

Each of the left and right lower limbs 110 includes a thigh 111, a knee joint 112, a shank 113, an ankle 114, and a foot 150, and is connected to the trunk 120 at the bottom end of the trunk 120 by a hip joint 115.

In addition, each of the left and right upper limbs 130 includes an upper arm 131, an elbow joint 132, and a forearm 133. The left and right upper limbs 130 are connected to the trunk 120 at the upper left end and the upper right end, respectively, of the trunk 120 by shoulder joints 134.

In addition, the head 140 is connected to the trunk 120 at the center of the top end of the trunk 120 by a neck joint 141.

For convenience, in the following descriptions regarding the foot 150, a plane including a portion of the bottom surface of the foot 150 which comes into contact with a road surface (floor surface) is defined as an X-Y plane. In addition, an axis which extends in the front-rear direction of the robot is defined as an X axis, an axis which extends in the right-left direction of the robot is defined as a Y axis, and an axis which is perpendicular to the X and Y axes is defined as a Z axis.

In addition, in the drawings, reference character R denotes smoothly curved portions.

Each of the joints is provided with actuators, and motions of the robot are achieved by driving the actuators. In order to satisfy various requirements such as a requirement for reducing excessive swellings to make the robot's appearance similar to the natural form of human beings and a requirement for performing attitude control of the unstable structure to achieve biped walking motion thereof, small, light actuators are preferably used. Accordingly, the legged mobile robot 100 of the present embodiment includes small AC servo actuators which can be directly connected to gears and in which a single-chip servo controller is installed in a motor unit. An example of a small AC servo actuator is disclosed in Japanese Patent Application No. 11-3386 which is applied by the present applicant.

Figure 2:
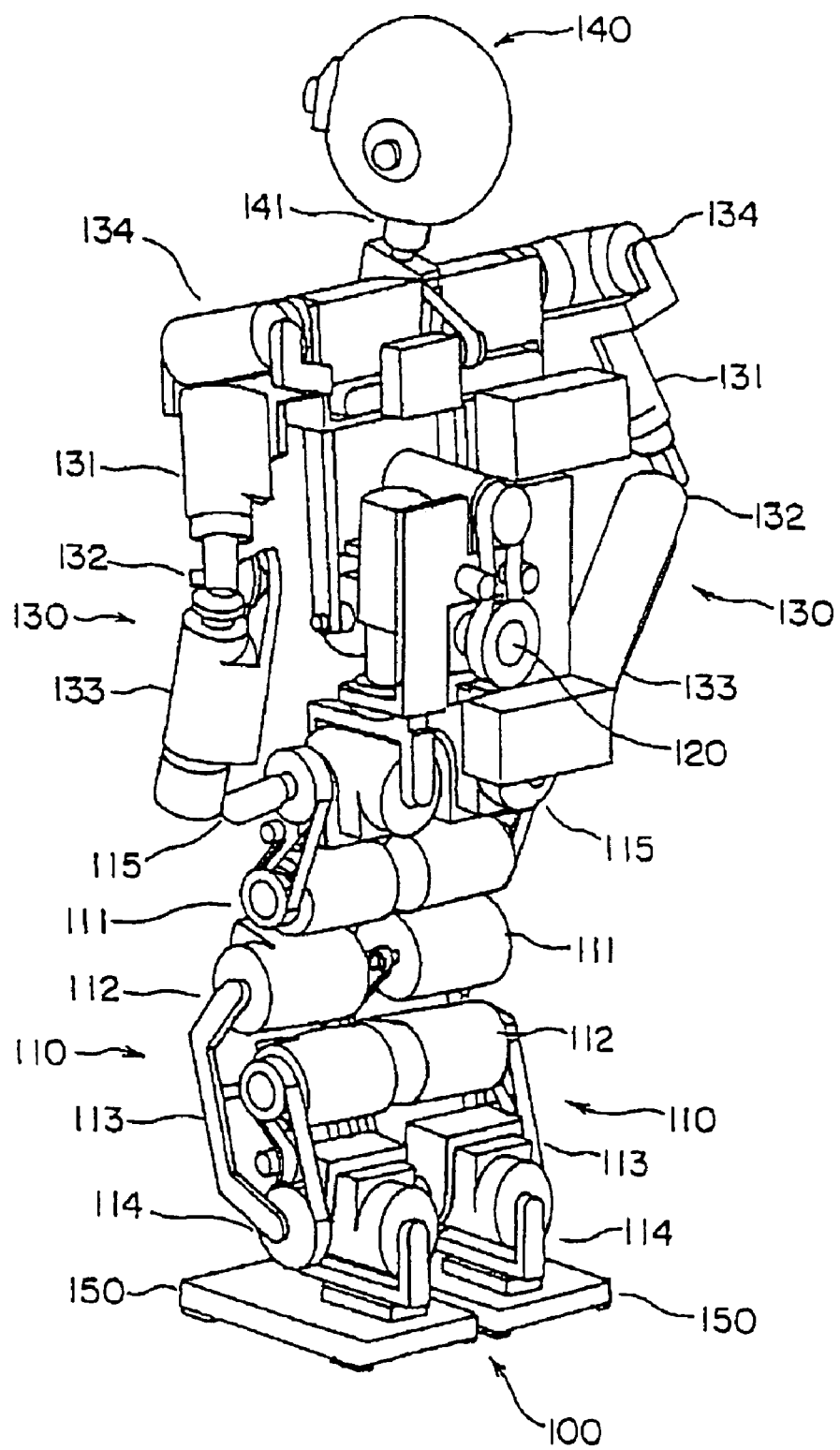
FIG. 2 is a rear view of the legged mobile robot 100 in an upright position.

Although not shown in FIGS. 1 and 2, a main control unit and peripheral devices such as a power supply circuit are contained in the trunk 120.

Control System

Next, a control system of the above-described legged mobile robot 100 will be described below with reference to FIG. 3.

Figure 3:
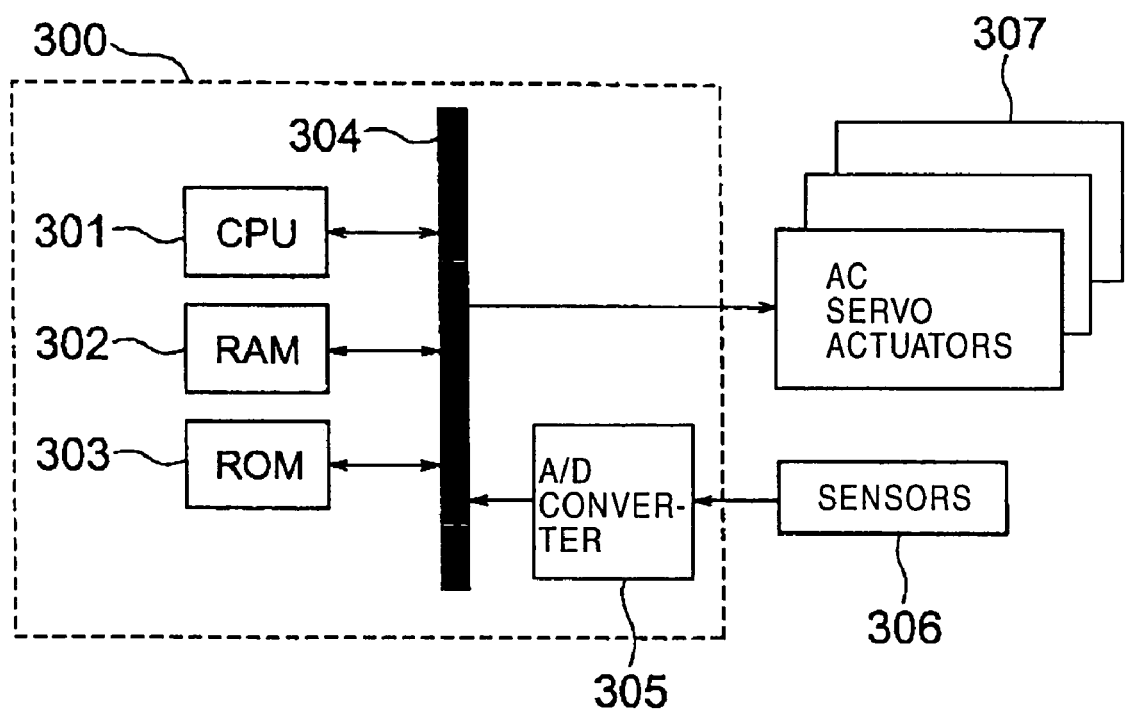
FIG. 3 is a diagram showing a schematic construction of a control system of the legged mobile robot 100.

FIG. 3 shows the construction of a control system of the legged mobile robot 100. A main control unit (control means) 300 includes a central processing unit (CPU) 301, a random access memory (RAM) 302, a read only memory (ROM) 303 which stores motion patterns, etc., an A/D converter 305 which converts analog signals output from various sensors 306 mounted in the legged mobile robot 100 to digital signals, and a bus 304 which provides connection between them.

A ROM 305 provided on the foot 150 is also connected by the bus 304. This will be described in more detail below.

The CPU 301 determines the motion of the legged mobile robot 100 on the basis of information stored in the ROM 303 and outputs from the sensors 306, and generates control signals including motion commands which are to be transmitted to AC servo actuators 307 provided on each joint. Then, the CPU 301 supplies the control signals for each joint to the AC servo actuators 307 connected to the main control unit 300 via the bus 304. Accordingly, the AC servo actuators 307 are activated on the basis of the motion commands included in the control signals, and the legged mobile robot 100 performs various motions such as walking motion.

The main control unit and peripheral devices such as the power supply circuit of the legged mobile robot 100 are disposed in an inner space of the trunk 120 of the legged mobile robot 100, which is not shown in FIGS. 1 and 2.

Foot

A first example 150a of the foot 150 will be described below with reference to FIGS. 4 to 8.

Figure 4:
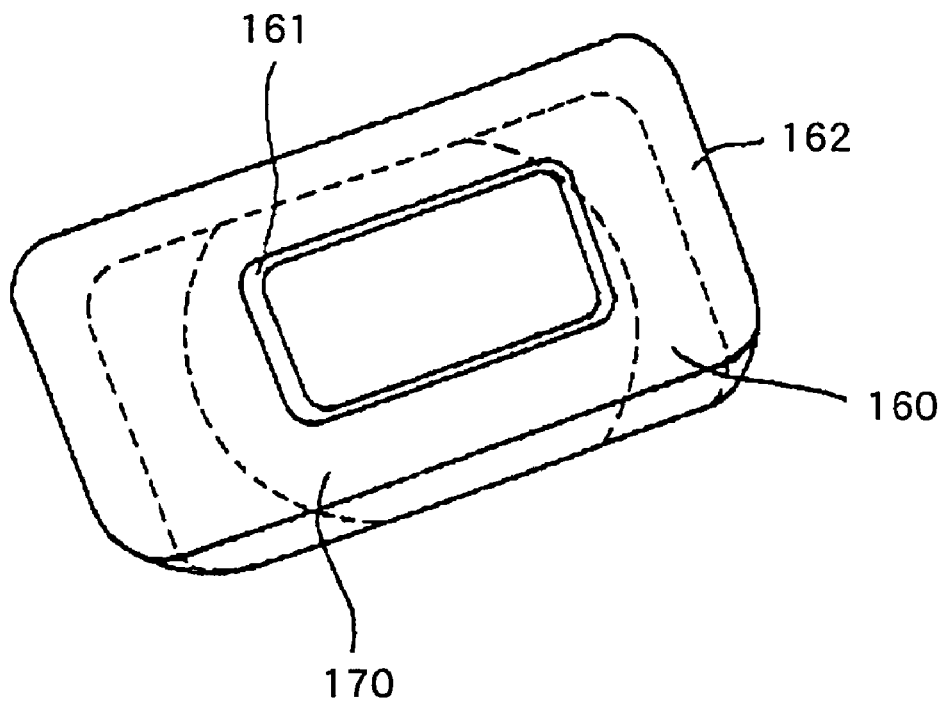
FIG. 4 is a perspective view of a foot of the legged mobile robot shown in FIG. 1 according to a first example.
Figure 5:
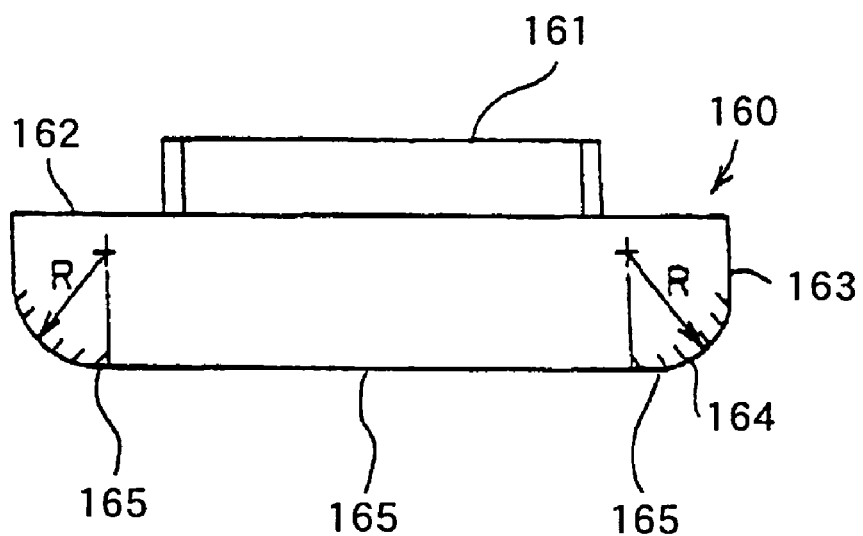
FIG. 5 is a side view of the foot of the legged mobile robot shown in FIG. 1 according to the first example.
Figure 6:
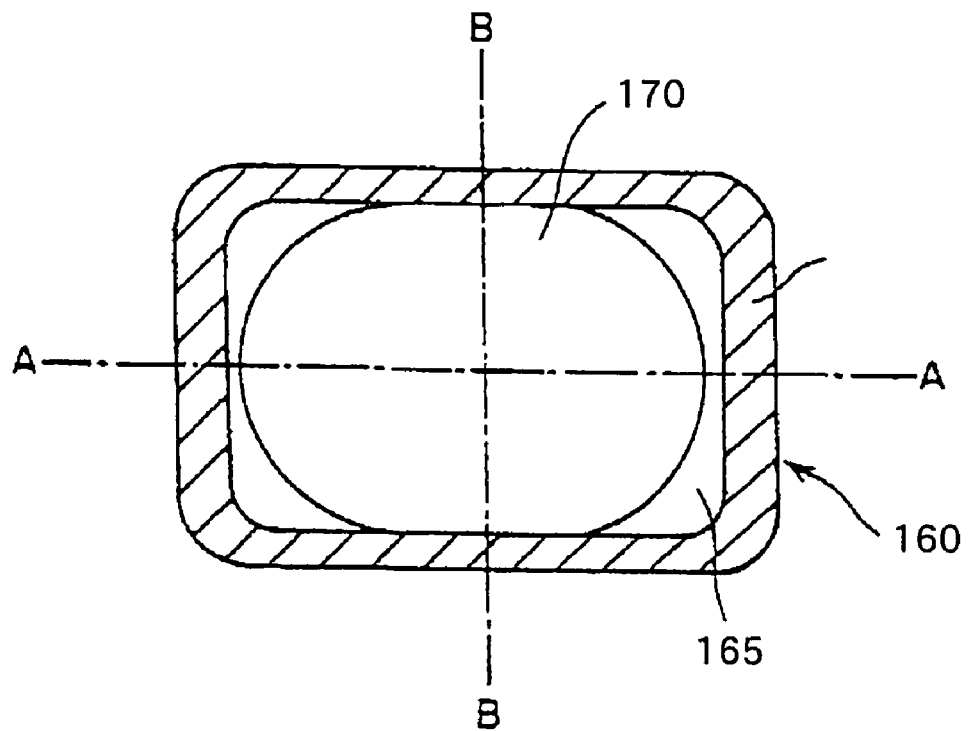
FIG. 6 is a bottom view of the foot of the legged mobile robot shown in FIG. 1 according to the first example.
Figure 7:
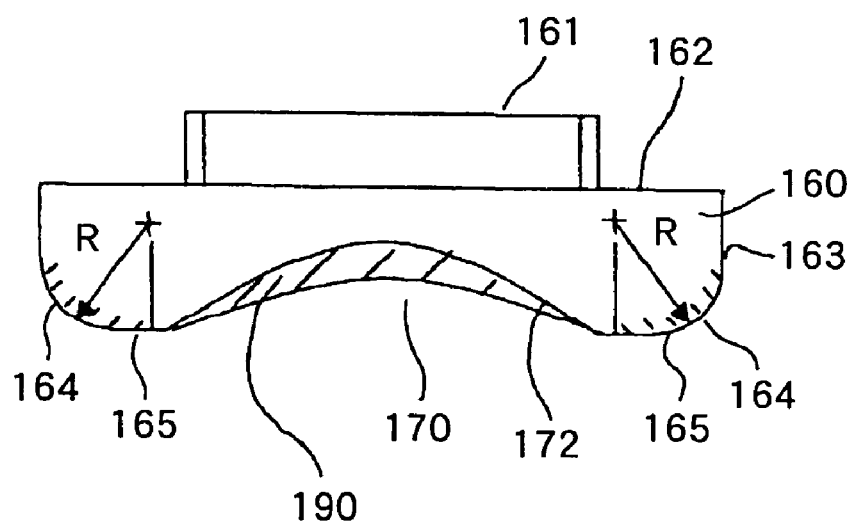
FIG. 7 is a sectional view of FIG. 6 cut along line A—A.
Figure 8:
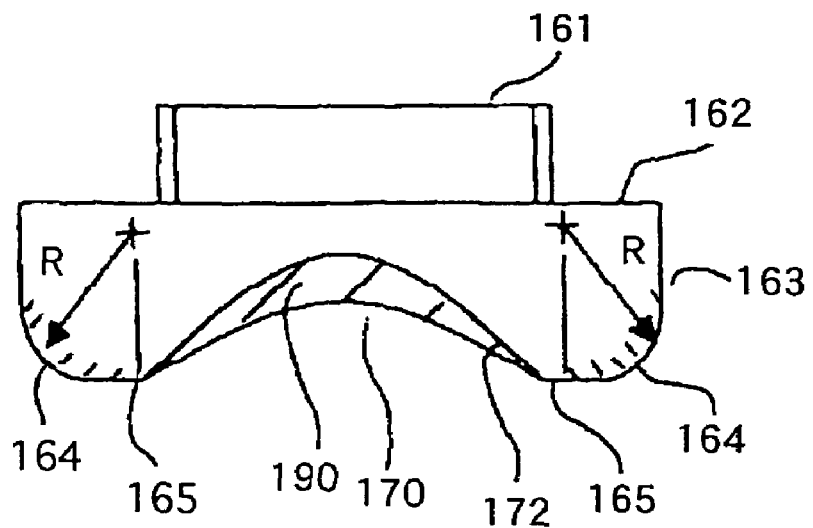
FIG. 8 is a sectional view of FIG. 6 cut along line B—B.

FIG. 4 is a perspective view of the first example 150a of the foot; FIG. 5 is a side view thereof; FIG. 6 is a bottom view thereof; FIG. 7 is a sectional view of FIG. 6 cut along line A—A; and FIG. 8 is a sectional view of FIG. 6 cut along line B—B.

The foot 150a according to a first structure includes a main foot body 160 constructed of a rectangular plate-shaped member and a connector 161 which is formed integrally with the main foot body 160 on a top surface 162 of the main foot body and which is connected to the ankle 114 of the corresponding lower limb 110.

The bottom surface (foot bottom surface) of the main foot body 160 includes a slope 172 which extends from a peripheral portion of the bottom surface and gently slopes toward the center of the main foot body so as to form a dome-shaped first concavity (recess) 170.

In addition, a flexible portion 190 is formed on the surface of the first concavity 170. When an external force is applied to the flexible portion 190, the flexible portion 190 deforms while exerting a predetermined elastic force as a reaction force, and when the external force is removed, the flexible portion 190 returns to its original shape.

The flexible portion 190 is formed by supplying a predetermined flexible material into the first concavity 170 such that the flexible material covers the surface of the first concavity 170 and the inner space of the first concavity 170 is partially filled with the flexible material and such that the surface of the flexible portion 190 does not come into contact with the road surface when the foot 150a is placed thereon if the road surface is flat.

The flexible material may be any material that has elasticity, viscosity, or flexibility, such as rubber, clay, and urethane. More specifically, a material having hysteresis characteristics, for example, a material which requires a relatively long time to return to its original shape or a material having shape-memory property, such as α-gel, memory foam, a component obtained by enclosing powders in a bag, etc., is preferably used as the flexible material.

In the foot 150a having the above-described construction, the peripheral portion which surrounds the first concavity 170 and which projects most in the bottom surface of the main foot body 160 serves as a ground-contact portion 165 which actually comes into contact with the ground-contact surface (walking surface). Accordingly, when the foot bottom surface (ground-contact surface) of the main foot body 160 is placed on the road surface, the ground-contact portion 165 comes into even contact with the road surface and supports the weight of the legged mobile robot 100, while the surfaces of the first concavity 170 and the flexible portion 190 disposed in the first concavity 170 are separated from the road surface.

In addition, the edges at the periphery of the bottom surface of the main foot body 160, that is, portions between side surfaces 163 of the main foot body 160 and the ground-contact portion 165 or between the side surfaces 163 and the slope 172 of the first concavity are formed as smooth curved surfaces (R surfaces) 164. Accordingly, stumbling of the legged mobile robot 100 caused when, for example, one of the edges at the periphery of the foot 150a strikes a bump on the road surface or is pushed into the road surface can be prevented. In addition, even when the legged mobile robot 100 is in a danger of falling over, the motion of the legged mobile robot 100 can be smoothly changed to safe falling motion.

The foot 150a according to the first example has the above-described construction. Since the foot 150a includes the first concavity 170 in the bottom surface of the main foot body 160 at an area inside the ground-contact portion 165, even when the position of the ZMP varies and deformation of the foot 150a occurs as the legged mobile robot walks, variation in the position and the shape of the ground-contact portion 165 is extremely small. Accordingly, variation in the shape of the above-described resistive-force-generation effective surface and reduction in the area thereof can be reduced. As a result, variation in the resistive force against the moment about the yaw axis can be reduced, and unexpected change in the behavior of the robot does not easily occur. In addition, the possibility that spinning motion in which the robot rotates around the ground-contact portion will occur can be reduced. Accordingly, the attitude stability of the robot can be increased and the stable motion of the robot can be continued.

In addition, since the first concavity is separated from the road surface, a contact pressure applied to the road surface can be increased and the robustness against the moment about the yaw axis generated in the legged mobile robot can be increased accordingly. In addition, the excessive increase in the frictional force between the foot and the road surface can be prevented, which also helps to prevent the stumbling of the robot.

In addition, in the foot 150a, the flexible portion 190 is disposed in the concavity 170 formed in the bottom surface of the foot 150a. Accordingly, even in a situation which cannot be dealt with by other portions of the foot 150a, for example, even when there is a risk of dangerous behavior, such as sliding, suitable countermeasures can be implemented. The state and the movement of the foot 150a in such a special situation will be described in detail below.

The main foot body 160 is preferably composed of a light, strong material such as an aluminum alloy and a magnesium alloy.

Figure 9:
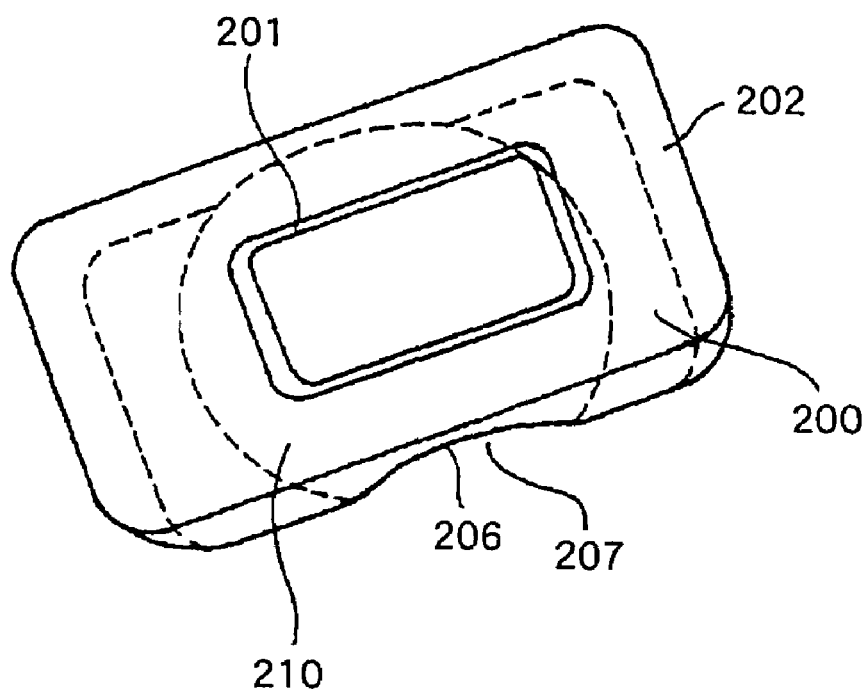
FIG. 9 is a perspective view of a foot of the legged mobile robot according to a second example.
Figure 10:
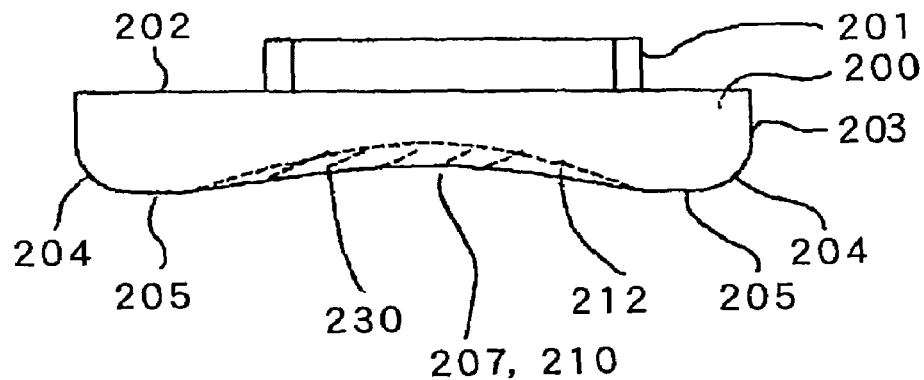
FIG. 10 is a sectional side view of the foot of the legged mobile robot according to the second example.

A second example 150b of the foot 150 will be described below with reference to FIGS. 9 and 10. FIG. 9 is a perspective view of the second example 150b of the foot, and FIG. 10 is a sectional view thereof.

The foot 150b includes a main foot body 200 constructed of a rectangular plate-shaped member and a connector 201 which is formed integrally with the main foot body 200 on a top surface 202 of the main foot body and which is connected to the ankle 114 of the corresponding lower limb 110. The bottom surface (foot bottom surface) of the main foot body 200 includes a slope 212 which extends from a peripheral portion of the bottom surface and gently slopes inward so as to form a dome-shaped first concavity (recess) 210.

In addition, notches are formed in the peripheral portion of the bottom surface of the foot 150b at the central positions of the inner and outer sides of the peripheral portion, the notches being cut along the surface (ceiling surface) of the first concavity 210 so that the main foot body 200 does not come into contact with the floor surface (walking surface) at those positions. More specifically, notches are formed in the peripheral portion of the main foot body 200, which serves as sidewalls of the first concavity 210, such that a tunnel-shaped opening which extends in the lateral direction (direction perpendicular to the walking direction) is provided at the central position of the main foot body 200. The overall concavity formed in the bottom surface of the main foot body 200 including the first concavity 210 and the notches 206 at the left and right sides serves as a plantar-arch portion 207 of the foot 150b.

Similar to the foot 150a according to the first example, a flexible portion 230 is formed on the surface of the first concavity 210. When an external force is applied to the flexible portion 230, the flexible portion 230 deforms while exerting a predetermined elastic force as a reaction force, and when the external force is removed, the flexible portion 230 returns to its original shape.

The flexible portion 230 is formed by supplying a predetermined flexible material into the first concavity 210 such that the flexible material covers the surface of the first concavity 210 and the inner space of the first concavity 210 is partially filled with the flexible material and such that the surface of the flexible portion 230 does not come into contact with the road surface when the foot 150b is placed thereon if the road surface is flat. The material of the flexible portion 230 may be the same as that of the above-described first foot 150a, and explanations thereof are thus omitted.

In the foot 150b having the above-described construction, bottom portions which surround the first concavity 210 and which project most in the bottom surface of the main foot body 200, that is, bottom portions in front of and behind the plantar-arch portion 207, serve as ground-contact portions 205 which actually come into contact with the ground-contact surface (walking surface). Accordingly, when the foot bottom surface (ground-contact surface) of the main foot body 200 is placed on the road surface, the ground-contact portions 205 come into even contact with the road surface and support the weight of the legged mobile robot 100, while the surfaces of the plantar-arch portion 207 and the flexible portion 230 are separated from the road surface.

In addition, the edges at the periphery of the bottom surface of the main foot body 200, that is, portions between side surfaces 203 of the main foot body 200 and the ground-contact portions 205 or between the side surfaces 203 and the slope 212 of the first concavity are formed as smooth curved surfaces (R surfaces) 204. Accordingly, stumbling of the legged mobile robot 100 caused when, for example, one of the edges at the periphery of the foot 150a strikes a bump on the road surface or is pushed into the road surface can be prevented. In addition, even when the legged mobile robot 100 is in a danger of falling over, the motion of the legged mobile robot 100 can be smoothly changed to safe falling motion.

Similar to the foot 150a of the first example, since the foot 150b of the second example includes the plantar-arch portion 207 in the bottom surface of the main foot body 200, even when the position of the ZMP varies and deformation of the foot 150b occurs as the legged mobile robot walks, variation in the shape of the resistive-force-generation effective surface and reduction in the area thereof can be reduced. As a result, variation in the resistive force against the moment about the yaw axis can be reduced, and unexpected change in the behavior of the robot does not easily occur. In addition, the possibility that spinning motion in which the robot rotates around the ground-contact portion will occur can be reduced. Accordingly, the attitude stability of the robot can be increased and the stable motion of the robot can be continued.

In addition, since the plantar-arch portion is separated from the road surface, a contact pressure applied to the road surface can be increased and the robustness against the moment about the yaw axis generated in the legged mobile robot can be increased accordingly. In addition, the excessive increase in the frictional force between the foot and the road surface can be suppressed, which helps to prevent the stumbling of the robot. In addition, in the foot 150b, the flexible portion 230 is disposed in the concavity 210 formed in the bottom surface of the foot 150b. Accordingly, even in a situation which cannot be dealt with by other portions of the foot 150b, for example, even when there is a risk of dangerous behavior, such as sliding, suitable countermeasures can be implemented. The state and the movement of the foot 150b in such a special situation will be described in detail below.

The main foot body 200 is preferably composed of a light, strong material such as an aluminum alloy and a magnesium alloy.

A third example 150c of the foot 150 will be described below with reference to FIGS. 11 to 15.

Figure 11:
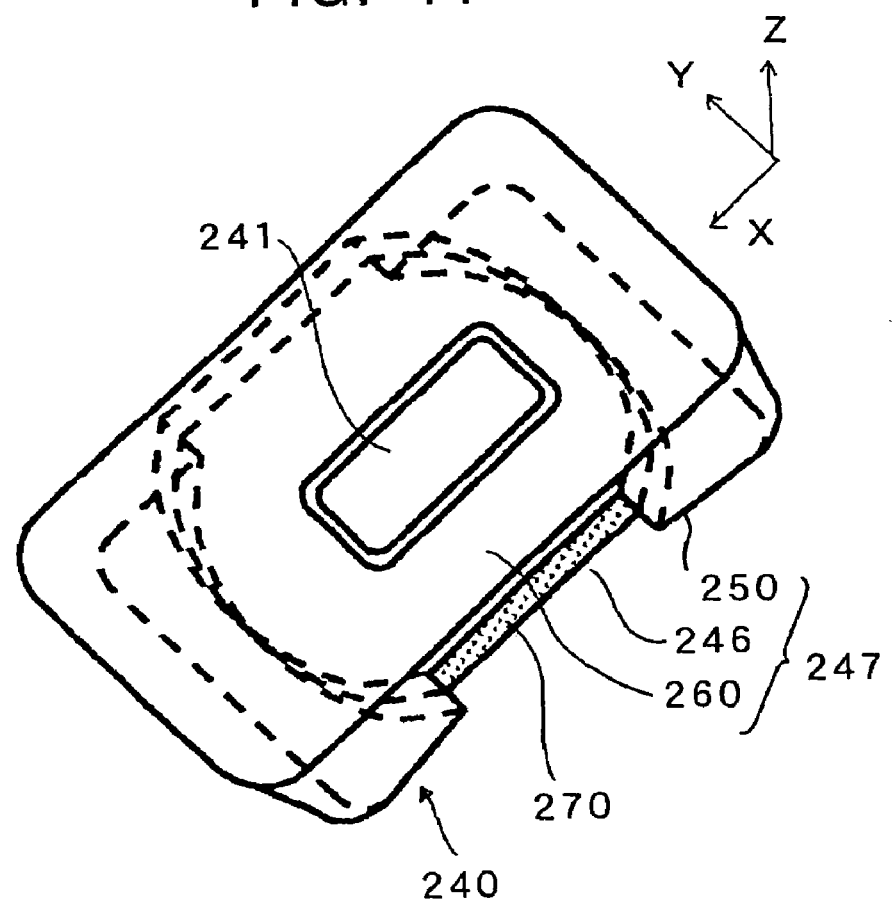
FIG. 11 is a perspective view of a foot of the legged mobile robot according to a third example.
Figure 12:
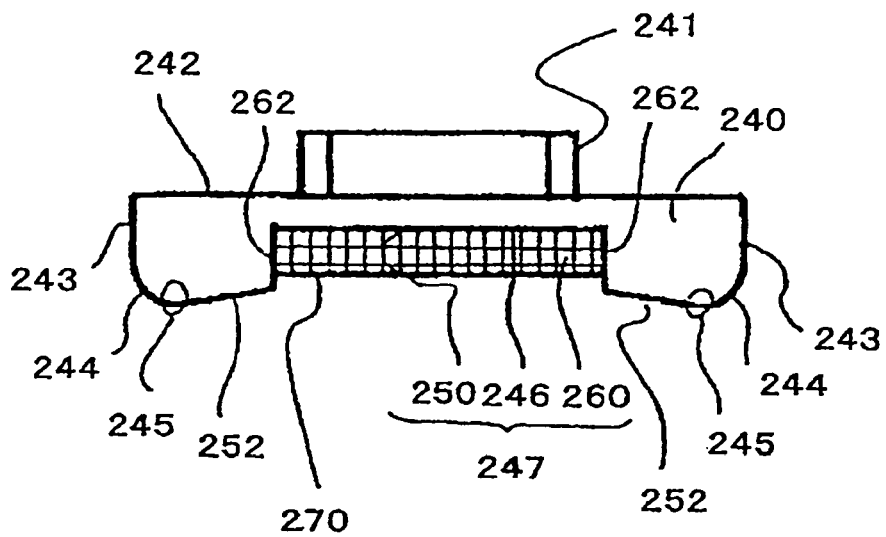
FIG. 12 is a side view of the foot of the legged mobile robot according to the third example.
Figure 13:
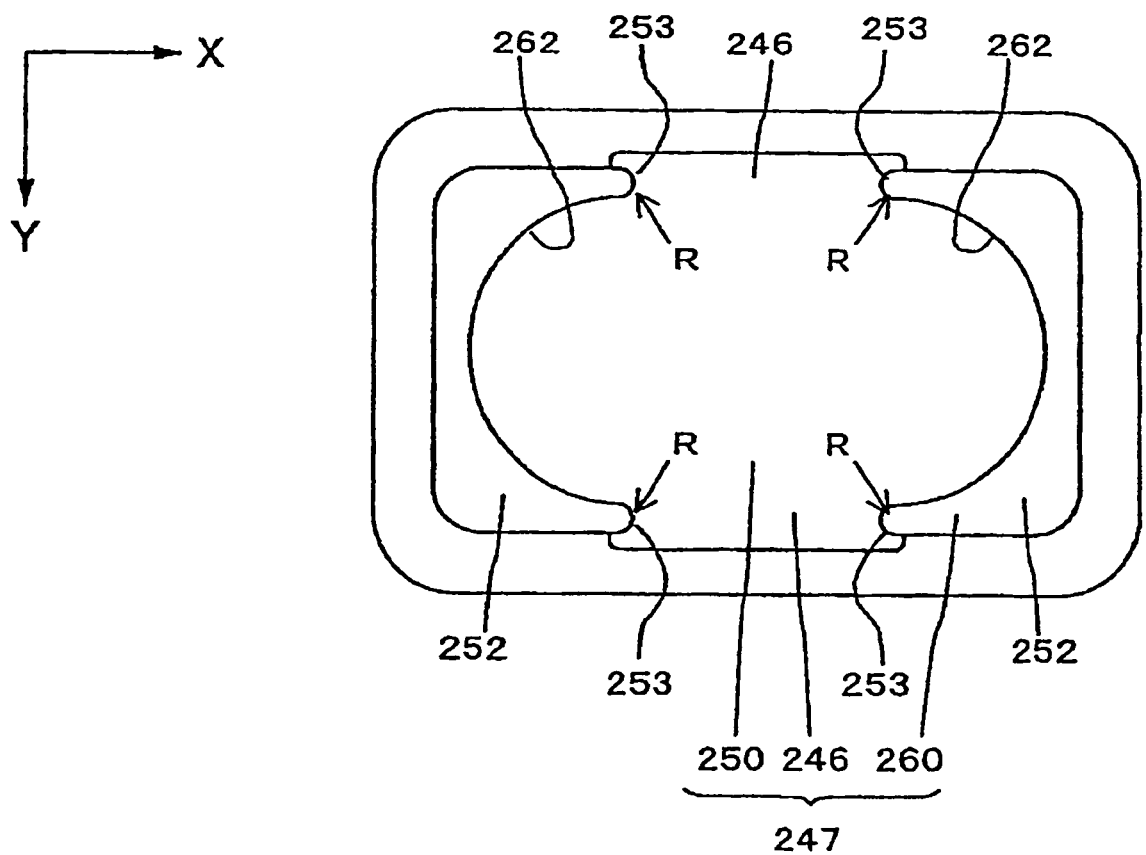
FIG. 13 is a bottom view of the foot of the legged mobile robot according to the third example.
Figure 14:
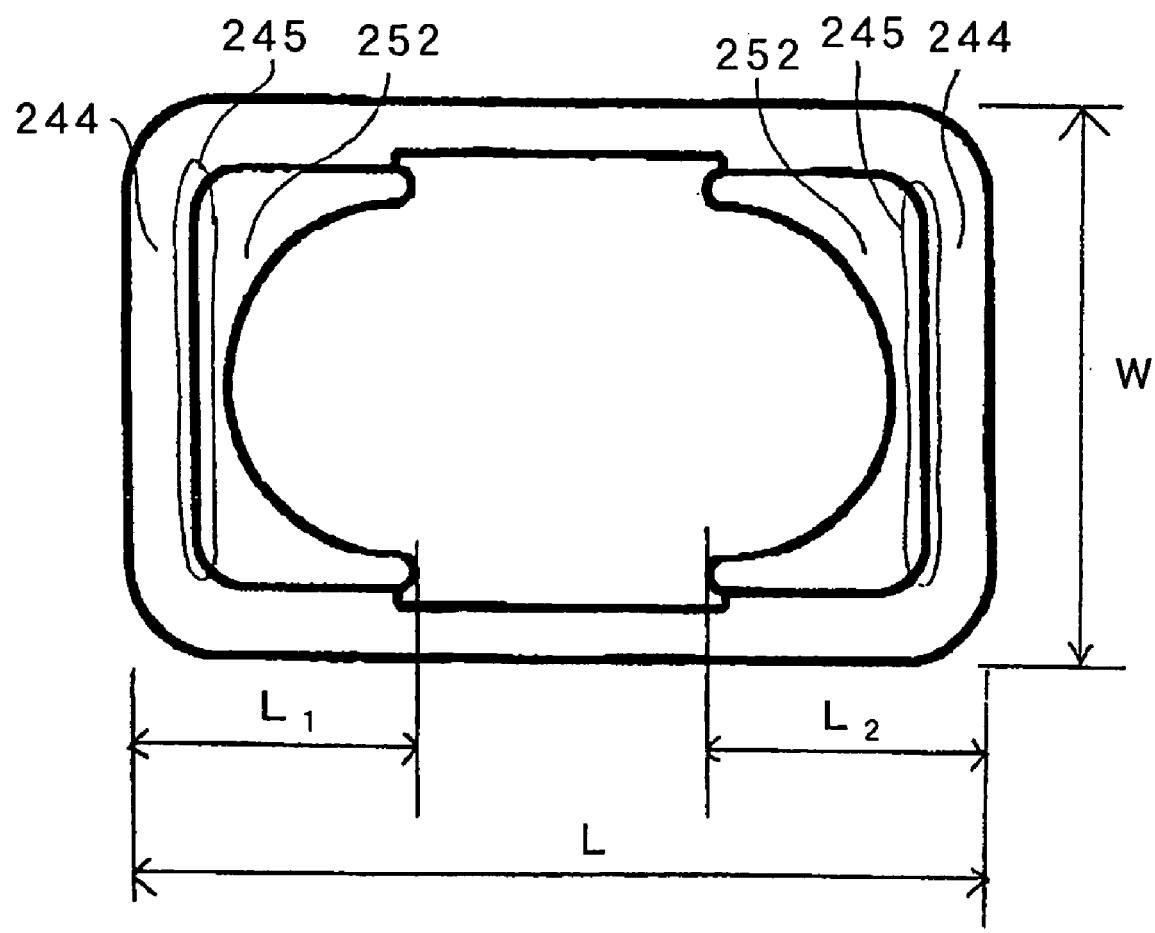
FIG. 14 is a diagram for explaining dimensions of the foot of the legged mobile robot shown in FIG. 11.

FIG. 11 is a perspective view of the third example 150c of the foot, FIG. 12 is a side view thereof, and FIG. 13 is a bottom view thereof. In addition, FIGS. 14 and 15 are diagrams for explaining suitable dimensions of the foot 150c.

The foot 150c includes a main foot body 240 constructed of a rectangular plate-shaped member and a connector 241 which is formed integrally with the main foot body 240 on a top surface 242 of the main foot body and which is connected to the ankle 114 of the corresponding lower limb 110.

The bottom surface (foot bottom surface) of the main foot body 240 includes slopes 252 which extend from a peripheral portion of the bottom surface and gently slope inward so as to form a dome-shaped first concavity (recess) 250. In addition, a columnar second concavity (recess) 260 is formed deeper into the main foot body 240 than the first concavity 250 at the central area of the main foot body 240.

In addition, notches are formed in the peripheral portion of the bottom surface of the foot 150c at the central positions of the inner and outer sides of the peripheral portion, the notches being cut to the bottom surface (ceiling surface) of the second concavity 260 so that the main foot body 240 does not come into contact with the floor surface (walking surface) at those positions. In other words, the bottom surface (ceiling surface) of the first concavity 250 and sidewalls of the second concavity 260 are partially removed at the central positions of the bottom surface of the main foot body 240 in the X direction, so that the second concavity extends through the main foot body 240 in the lateral direction (Y direction) thereof at the central position in the walking direction. The overall concavity formed in the bottom surface of the main foot body 240 including the first concavity 250, the second concavity 260, and the notches 246 serves as a plantar-arch portion 247 of the foot 150c.

A flexible portion 270 is formed on the surface of the second concavity 260. When an external force is applied to the flexible portion 270, the flexible portion 270 deforms while exerting a predetermined elastic force as a reaction force, and when the external force is removed, the flexible portion 270 returns to its original shape. The flexible portion 270 is formed by supplying a predetermined flexible material into the second concavity 260 such that the flexible material covers the bottom surface (ceiling surface) 261 of the second concavity 260 and the inner space of the second concavity 260 is partially filled with the flexible material and such that the surface of the flexible portion 270 does not come into contact with the road surface when the foot 150c is placed thereon if the road surface is flat. The material of the flexible portion 270 may be the same as that of the above-described first foot 150a, and explanations thereof are thus omitted.

In the foot 150c having the above-described construction, peripheral portions of the first concavity 250 which project most in the bottom surface of the main foot body 240 serve as ground-contact portions 245 which actually come into contact with the ground-contact surface (walking surface). Accordingly, when the foot bottom surface (ground-contact surface) of the main foot body 240 is placed on the road surface, the ground-contact portions 245 come into even contact with the road surface and support the weight of the legged mobile robot 100, while the plantar-arch portion 247 is separated from the road surface.

In addition, side surfaces 262 of the second concavity 260 are discontinuously connected to the slopes 252 of the first concavity 250 such that edges are provided therebetween, and are formed such that they are approximately parallel to the vertical direction (Z direction) which is perpendicular to the ground-contact surface. Since the side surfaces of the second concavity 260 are constructed as described above, when, for example, the robot walks on a soft floor, such as a carpet, and soft objects such as fibers of the carpet enter the second concavity 260, the soft objects encounter the side surfaces of the second concavity 260 and are caught by the discontinuous edges. As a result, resistive force and reaction force are applied to the fibers against the moving direction of the fibers, and frictional force is applied to the walking surface of the foot 150c. Accordingly, even on a slippery walking surface as described above, sufficient frictional force can be obtained, and efficiencies of braking force and impelling force can be increased.

In addition, end portions 253, which are parts of the slopes of the first concavity 250 and the side surfaces of the second concavity 260 and which face the notches 246, are formed of smooth curved surfaces (R surfaces), as shown in FIG. 13. Accordingly, the amount of indentation in a soft moving surface, such as a carpet, can be adjusted and generation of the falling moment can be prevented. In addition, the floor surface can be protected.

In addition, the edges at the periphery of the bottom surface of the main foot body 240, that is, portions between side surfaces 243 of the main foot body 240 and the ground-contact portions 245 are formed as smooth curved surfaces (R surfaces) 244. Accordingly, stumbling of the legged mobile robot 100 caused when, for example, one of the edges at the periphery of the foot 150c strikes a bump on the road surface or is pushed into the road surface can be prevented. In addition, even when the legged mobile robot 100 is in a danger of falling over, the motion of the legged mobile robot 100 can be smoothly changed to safe falling motion.

Next, dimensions of the foot 150c of the third example will be described below with reference to FIGS. 14 and 15. The size of the foot 150c may be arbitrarily determined in accordance with, for example, the overall size of the legged mobile robot. However, in the case in which the legged mobile robot walks in a Japanese house, it can be assumed that a doorsill of a "fusuma" (Japanese sliding door) having grooves and bumps would be a major barrier to the walking motion of the small legged mobile robot. Therefore, it is extremely effective to limit the dimensions of the foot 150c under predetermined conditions for the purpose of making the robot walk stably on the doorsill. The conditions under which the legged mobile robot can walk stably even when the foot 150c steps on the doorsill will be described below.

In this case, the sizes of the ground-contact portions 245 of the foot 150c must be set such that the ground-contact portions 245 do not fall into the grooves of the doorsill. As shown in FIG. 14, in the foot 150c, end portions in front of and behind the first concavity 250 serve as the ground-contact portions 245. In addition, the peripheral edges of the ground-contact portions 245 are connected to the side surfaces 243 of the main foot body 240 with the smooth curved surfaces 244, and edges of the ground-contact portions 245 which are closer to the center of the main foot body are connected to the gently slopes 252 of the first concavity 250. Thus, it can be assumed that the areas from the slopes 252 to the curved surfaces at the peripheral edges of the main foot body 240 are the ground-contact areas which project from main foot body and which should be prevented from falling into the grooves of the doorsill. Accordingly, with reference to FIG. 14, conditions are set on the lengths $L_1$ and $L_2$ of the contact areas in the walking direction (X direction), the overall length L of the foot 150c, and the width W of the foot 150c, that is, the length of the contact areas in the lateral direction (Y direction).

Doorsills used in Japanese houses are shaped as shown in, for example, FIG. 15. FIG. 15(A) shows a doorsill with two grooves, and FIG. 15(B) shows a doorsill with three grooves. In FIGS. 15(A) and 15(B), widths of the grooves are $L_{g1}$, $L_{g2}$, and $L_{g3}$, and those of bumps are $L_{m1}$ and $L_{m2}$. In common doorsills, $L_{g1}=L_{g2}=L_{g3}=21$ mm and $L_{m1}=L_{m2}=12$ mm are satisfied.

When the legged mobile robot walks in a normal walking direction, in order to prevent the foot 150c from falling into the grooves of the doorsill with two grooves, the dimensions of the contact areas and the foot must satisfy the following expression:

$$L_1, L_2 > L_{g1} (= L_{g2})$$

$$L > L_{g1} + L_{m1} + L_{g2} \quad (1)$$

In addition, when the legged mobile robot walks in the normal walking direction, in order to prevent the foot 150c from falling into the grooves of the doorsill with three grooves, the dimensions of the contact areas and the foot must satisfy the following expression:

$$L_1, L_2 > L_{g1} (= L_{g2})$$

$$L > L_{g1} + L_{m1} + L_{g2}$$

$$L_1, L_2 < L_{m1} + L_{g1} + L_{m2} \quad (2)$$

Accordingly, when the above-described common doorsills are considered, $L_1$, $L_2 > 21$ mm and $L > 54$ mm must be satisfied to prevent the foot 150c of the legged mobile robot from falling into the grooves of the doorsill with two grooves, and $21 < L_1$, $L_2 < 45$ mm and $L > 54$ mm must be satisfied to prevent the foot 150c of the legged mobile robot from falling into the grooves of the doorsill with three grooves. In the foot 150c of the present example, L=105.8 mm, W=69.8 mm, and L1=L2=33 mm are satisfied.

When the legged mobile robot walks sideways, it is also necessary to set a condition on the length of the foot 150c in the lateral direction similarly to the case in which it walks in the normal walking direction. However, this will not be discussed here since the foot 150c is not divided in the lateral direction and has a sufficient length relative to the widths of the grooves of the doorsill.

The foot 150c has the above-described construction, and similar to the feet 150a and 150b of the first and second examples, since the foot 150c includes the plantar-arch portion 247 in the bottom surface of the main foot body 200, even when the position of the ZMP varies and deformation of the foot 150c occurs as the legged mobile robot walks, variation in the shape of the resistive-force-generation effective surface and the reduction in the area thereof can be reduced. As a result, variation in the resistive force against the moment about the yaw axis can be reduced, and unexpected change in the behavior of the robot does not easily occur. In addition, the possibility that so-called spinning motion in which the robot rotates around the ground-contact portion will occur can be reduced. Accordingly, the attitude stability of the robot can be increased and the stable motion of the robot can be continued.

In addition, since the plantar-arch portion is separated from the road surface, a contact pressure applied to the road surface can be increased and the robustness against the moment about the yaw axis generated in the legged mobile robot can be increased accordingly. In addition, the excessive increase in the frictional force between the foot and the road surface can be suppressed, which also helps to prevent the stumbling of the robot.

In addition, in the foot 150c, the flexible portion 270 is disposed in the second concavity 260 formed in the bottom surface of the foot 150c. Accordingly, even in a situation which cannot be dealt with by other portions of the foot 150c, for example, even when there is a risk of dangerous behavior, such as slipping, suitable countermeasures can be implemented. The state and the movement of the foot 150c in such a special situation will be described in detail below.

The main foot body 160 is preferably composed of a light, strong material such as an aluminum alloy and a magnesium alloy.

A fourth example of the foot 150 will be described below with reference to FIGS. 16 to 23.

Figure 16:
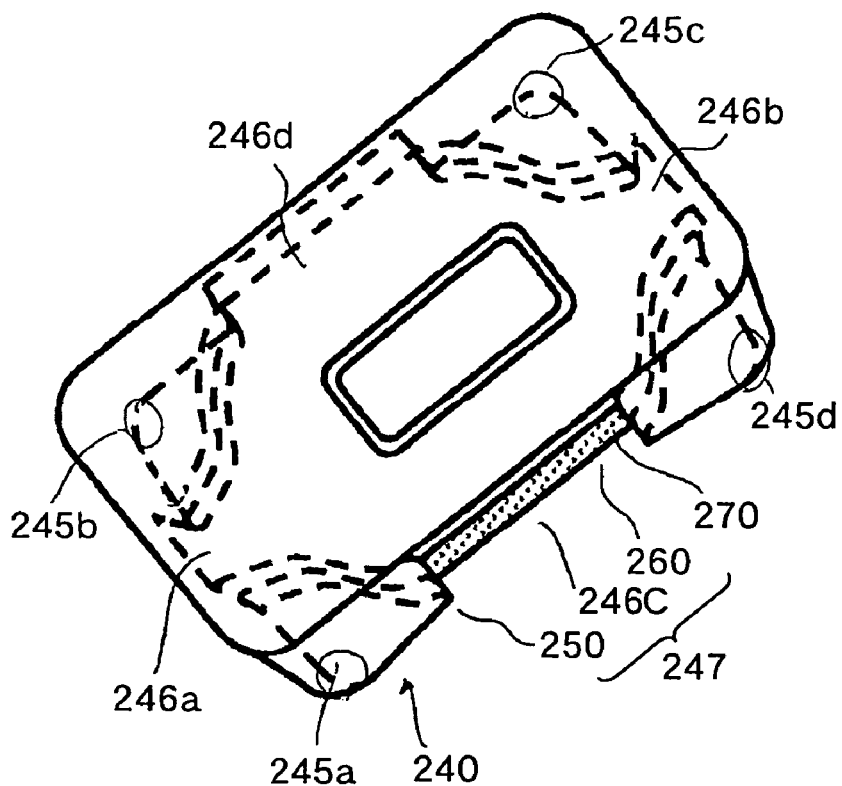
FIG. 16 is a perspective view of a foot of the legged mobile robot according to a fourth example.
Figure 17:
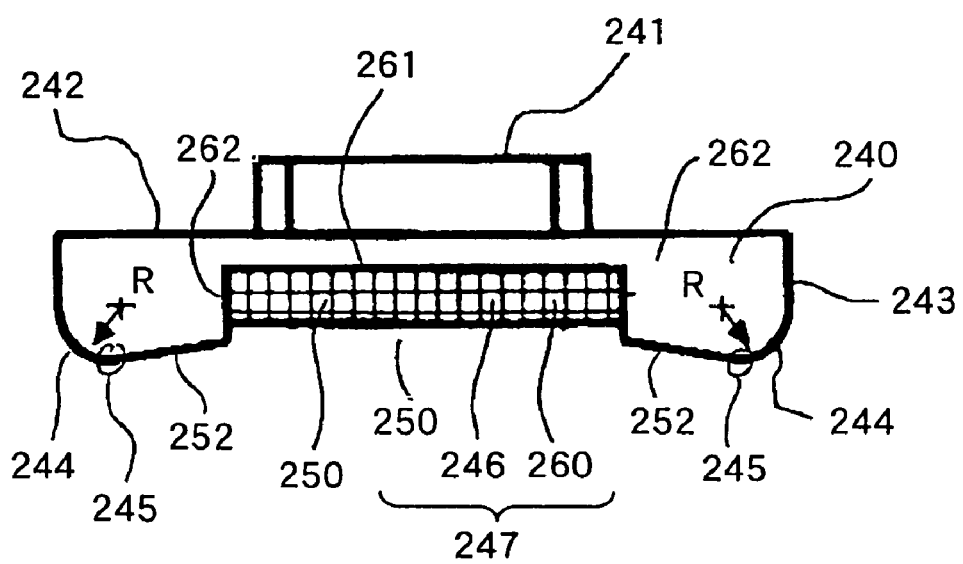
FIG. 17 is a side view of the foot of the legged mobile robot according to the fourth example.
Figure 18:
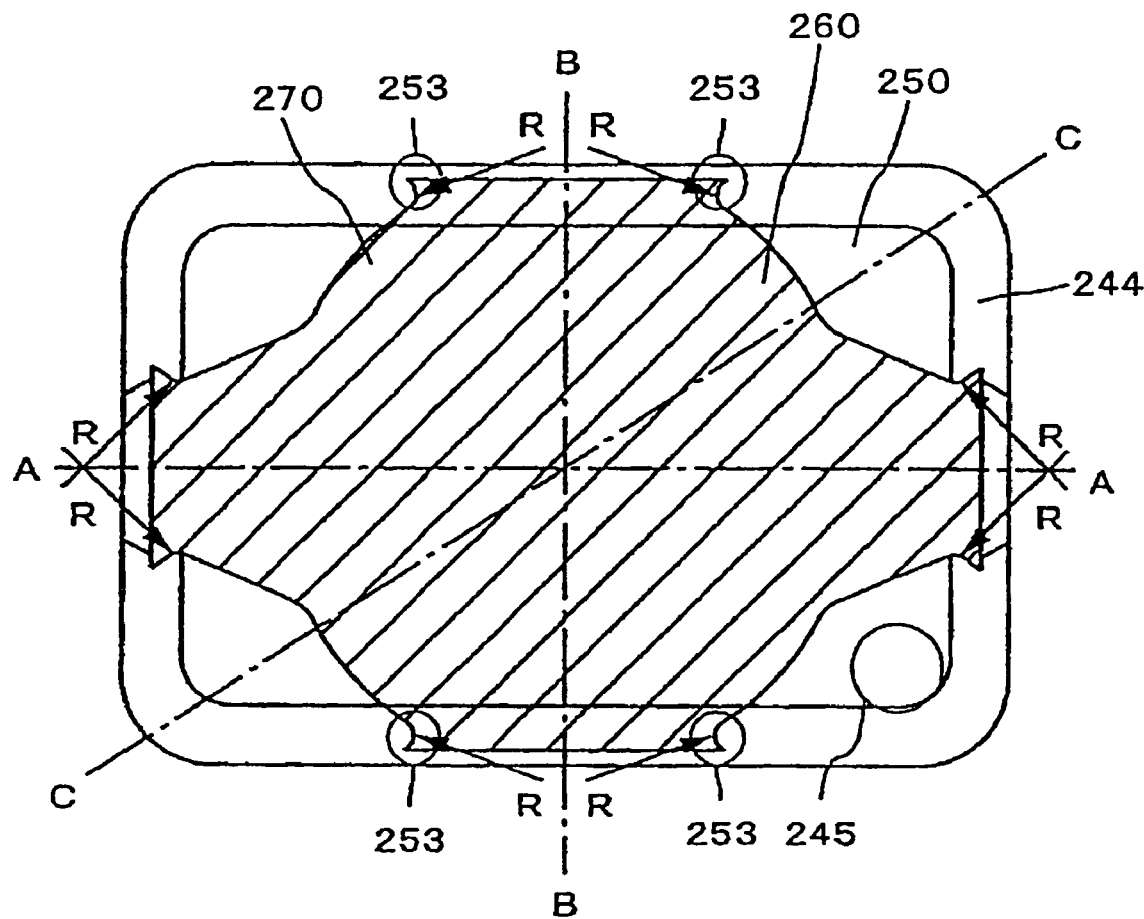
FIG. 18 is a bottom view of the foot of the legged mobile robot according to the fourth example.
Figure 19:
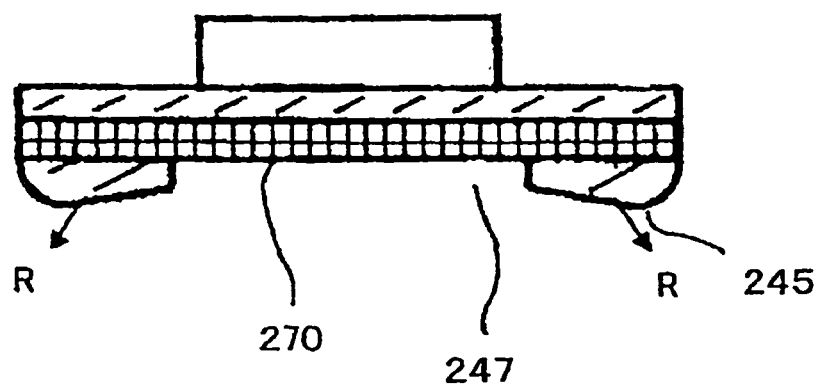
FIG. 19 is a sectional view of FIG. 18 cut along line A—A.
Figure 20:
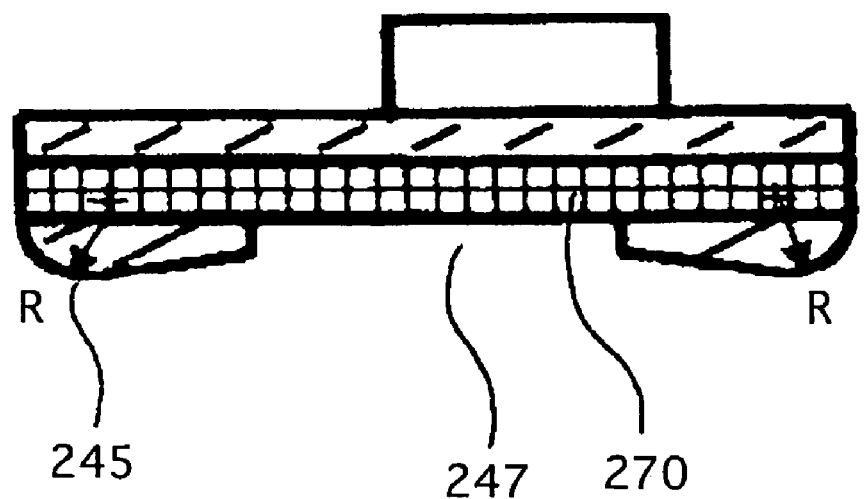
FIG. 20 is a sectional view of FIG. 18 cut along line B—B.
Figure 21:
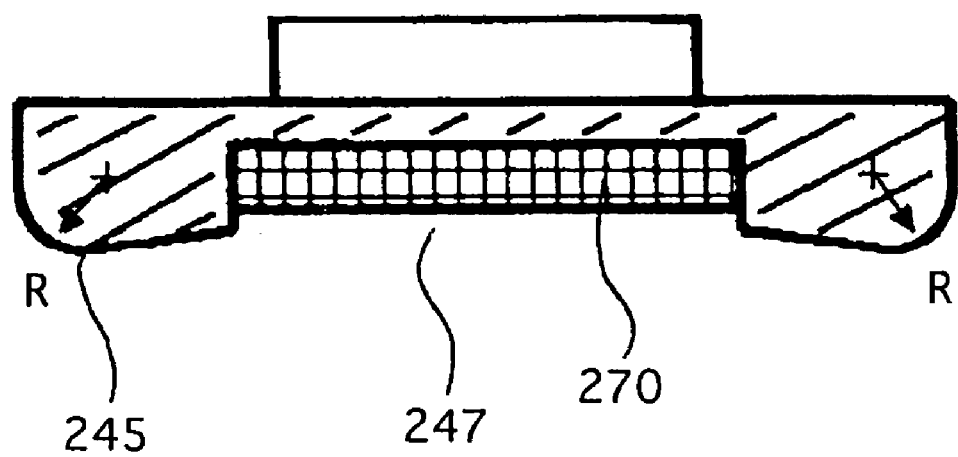
FIG. 21 is a sectional view of FIG. 18 cut along line C—C.
Figure 22:
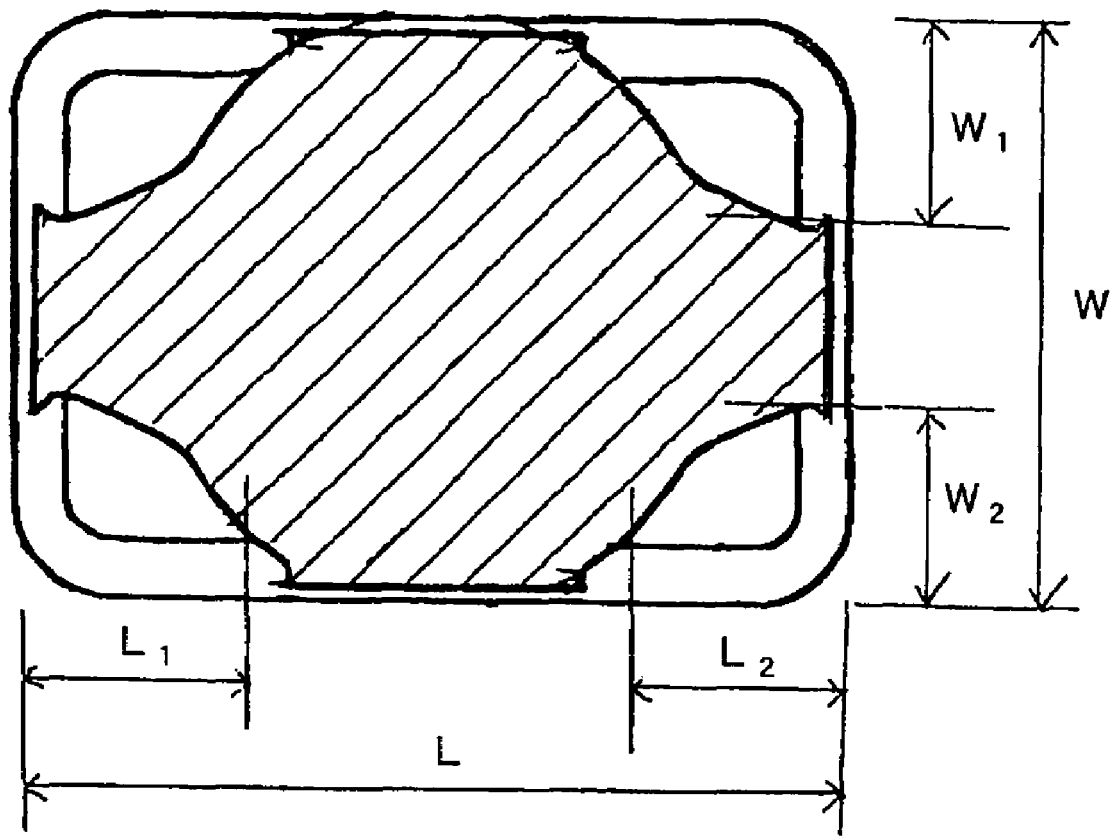
FIG. 22 is a diagram for explaining dimensions of the foot of the legged mobile robot shown in FIG. 16.
Figure 24:
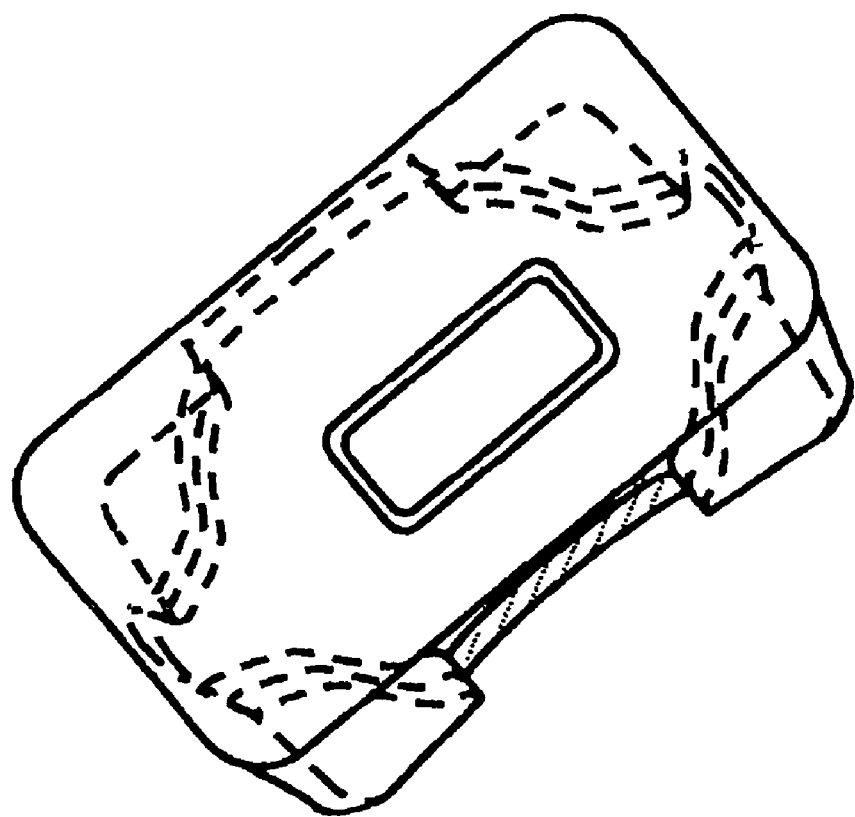
FIG. 24 is a perspective view of a foot of the legged mobile robot according to a fifth example.
Figure 25:
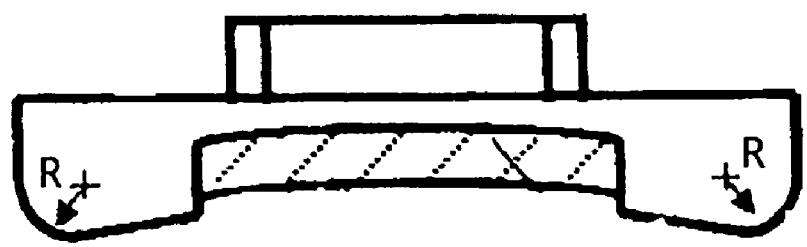
FIG. 25 is a side view of the foot of the legged mobile robot according to the fifth example.
Figure 26:
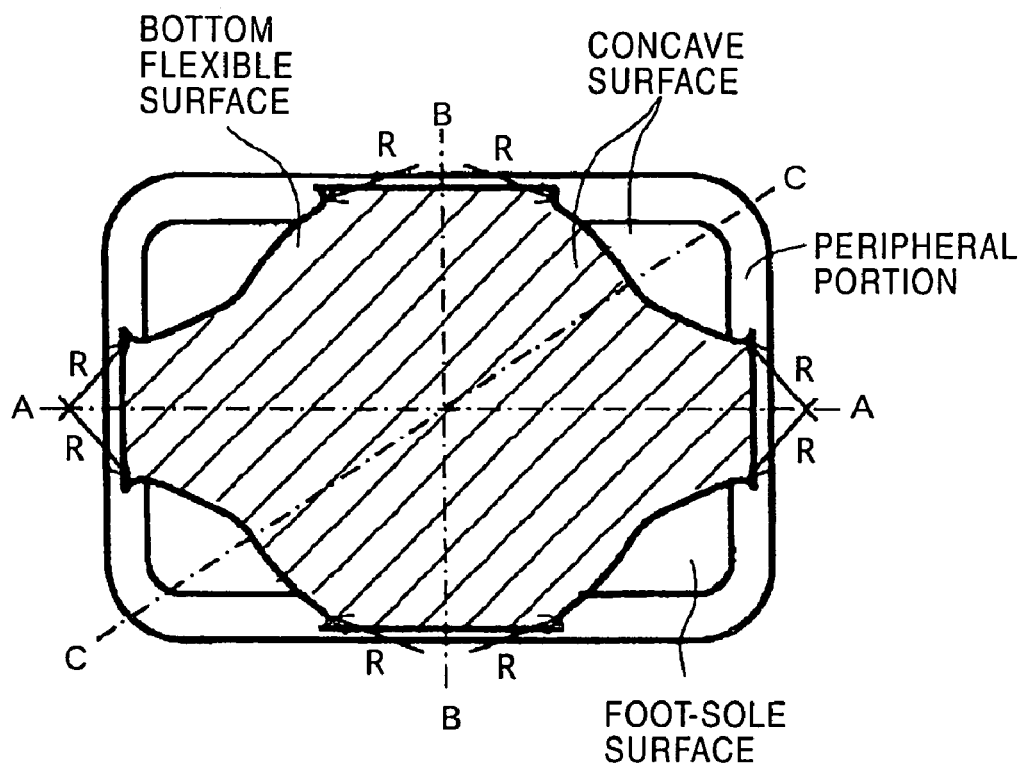
FIG. 26 is a bottom view of the foot of the legged mobile robot according to the fifth example.
Figure 27:
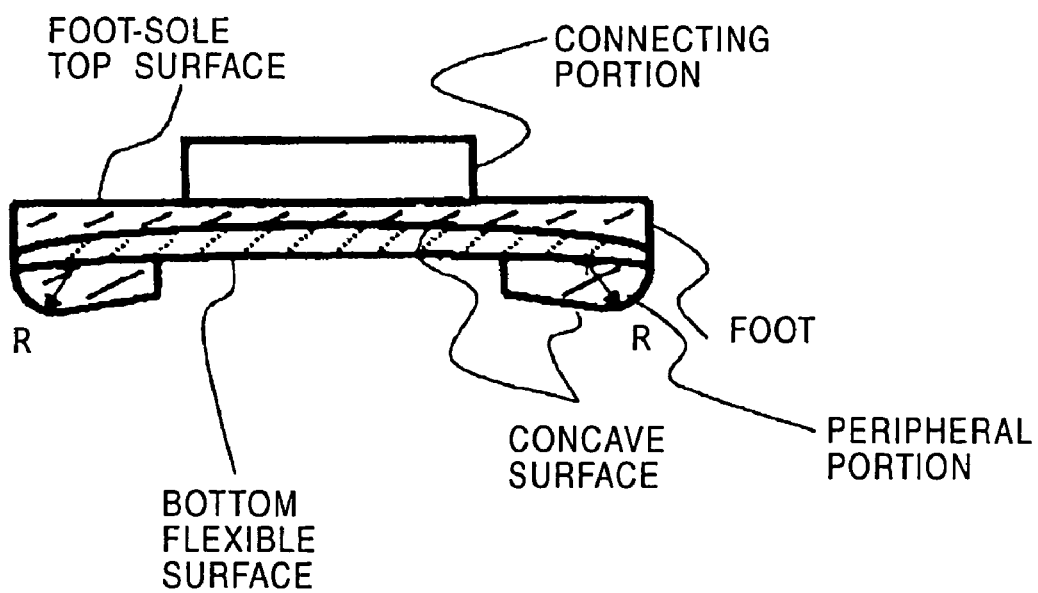
FIG. 27 is a sectional view of FIG. 26 cut along line A—A.
Figure 28:
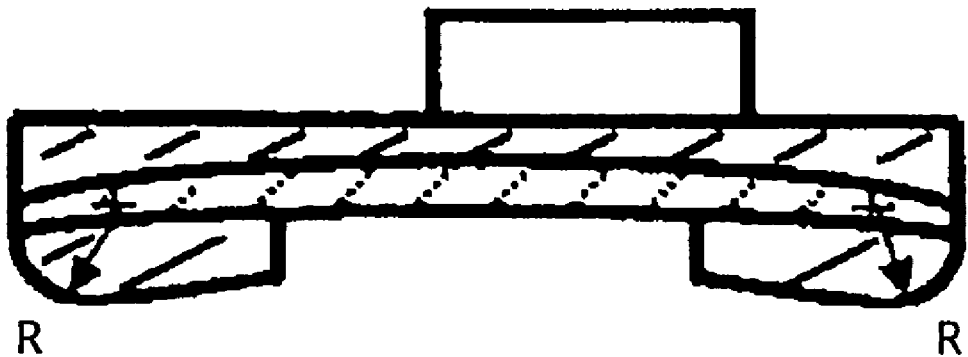
FIG. 28 is a sectional view of FIG. 26 cut along line B—B.
Figure 29:
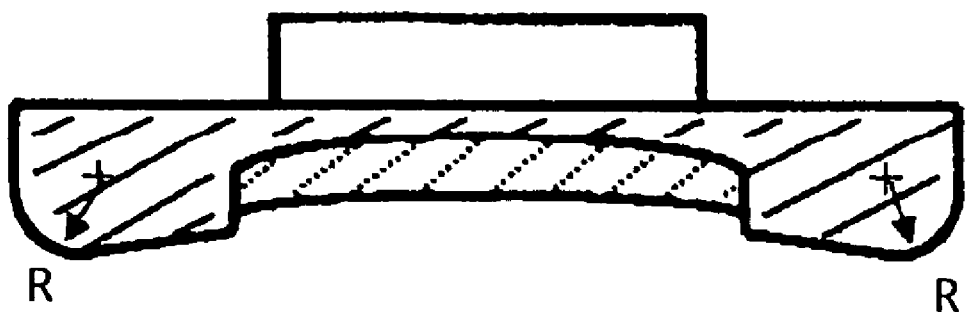
FIG. 29 is a sectional view of FIG. 26 cut along line C—C.

FIG. 16 is a perspective view of the foot 150; FIG. 17 is a side view of the foot 150; FIG. 18 is a bottom view of the foot 150; FIG. 19 is a sectional view of FIG. 18 cut along line A—A; FIG. 20 is a sectional view of FIG. 18 cut along line B—B; and FIG. 21 is a sectional view of FIG. 18 cut along line C—C. In addition, FIGS. 22 and 23 are diagrams for explaining suitable dimensions of the foot 150.

The foot 150 includes a main foot body 240 constructed of a rectangular plate-shaped member and a connector 241 which is formed integrally with the main foot body 240 on a top surface 242 of the main foot body and which is connected to the ankle 114 of the corresponding lower limb 110.

The bottom surface (foot bottom surface) of the main foot body 240 includes slopes 252 which extend from four corners of the bottom surface and gently slope inward so as to form a first concavity (recess) 250 of an imaginarily dome-like shape. In addition, a second concavity (recess) 260 of an imaginary columnar shape is formed deeper into the main foot body 240 than the first concavity 250 at the central area of the main foot body 240.

In addition, grooves 246a to 246d are formed in a peripheral portion of the bottom surface of the foot 150 at the central positions of four sides of the peripheral portion, the grooves 246a to 246d having the same depth as the that of the bottom surface (ceiling surface) of the second concavity 260 and extending from the central area of the main foot body 240 to the outside of the main foot body so that the main foot body 240 does not come into contact with the floor surface (walking surface) at those positions.

Accordingly, the concavity formed in the bottom surface of the main foot body 240 including the first concavity 250, the second concavity 260, and the grooves 246 serves as a plantar-arch portion 247 of the foot 150. The plantar-arch portion 247 generally refers to the concavity formed in the bottom surface of the foot 150. More specifically, any one of the concavities forming the four grooves 246a to 246d, continuous grooves which extend in the lateral direction and the walking direction, and the overall concavity formed in the foot 150 may be referred to as the plantar-arch portion.

Since the bottom surface of the foot 150 is divided by the four grooves 246a to 246d, four projections are provided on the bottom surface of the foot 150 at the four corners thereof. In each of the projections, a portion which projects most serves as a ground-contact portion 245 which actually comes into contact with the ground-contact surface (walking surface).

Although the above-described projections include the slopes 252 of the first concavity 250 and smooth curved surfaces 244 formed at the corners of the second concavity 260, which will be described below, portions at which the boundary areas between the slopes 252 and the curved surfaces 244 project most serve as the ground-contact portions 245.

When the foot bottom surface (ground-contact surface) of the main foot body 240 is placed on the road surface, the ground-contact portions 245 come into even contact with the road surface and support the weight of the legged mobile robot 100, while the plantar-arch portion 247 is separated from the road surface.

A flexible portion 270 is formed on the surface of the second concavity 260. When an external force is applied to the flexible portion 270, the flexible portion 270 deforms while exerting a predetermined elastic force as a reaction force, and when the external force is removed, the flexible portion 270 returns to its original shape.

The flexible portion 270 is formed by supplying a predetermined flexible material into the second concavity 260 such that the flexible material covers the bottom surface (ceiling surface) 261 of the second concavity 260 and the inner space of the second concavity 260 is partially filled with the flexible material and such that the surface of the flexible portion 270 does not come into contact with the road surface when the foot 150 is placed thereon if the road surface is flat.

The flexible material may be any material that has elasticity, viscosity, or flexibility, such as rubber, clay, and urethane. More specifically, a material having hysteresis characteristics, for example, a material which requires a relatively long time to return to its original shape or a material having shape-memory property, such as α-gel, memory foam, a component obtained by enclosing powders in a bag, etc., is preferably used as the flexible material.

In addition, side surfaces 262 of the second concavity 260 and the grooves 246 are discontinuously connected to the slopes 252 of the first concavity 250 such that edges are provided therebetween, and are formed such that they are approximately parallel to the vertical direction (Z direction) which is perpendicular to the ground-contact surface. Since the side surfaces 262 of the second concavity 260 and the notches 246 are constructed as described above, when, for example, the robot walks on a soft floor, such as a carpet, and soft objects such as fibers of the carpet enter the plantar-arch portion 247, the soft objects encounter the side surfaces 262 and are caught by the discontinuous edges. As a result, resistive force and reaction force are applied to the fibers against the moving direction of the fibers, and frictional force is applied to the walking surface of the foot 150. Accordingly, even on a slippery walking surface as described above, sufficient frictional force can be obtained, and efficiencies of braking force and impelling force can be increased.

In addition, end portions 253 of the side surfaces 262 of the notches 246 which are near the openings in the side surfaces of the main foot body 240 are formed of smooth curved surfaces (R surfaces), as shown in FIG. 6. Accordingly, the amount of indentation in a soft moving surface, such as a carpet, can be adjusted and generation of the falling moment can be prevented. In addition, the floor surface can be protected.

In addition, the edges at the periphery of the bottom surface of the main foot body 240, that is, portions between side surfaces 243 of the main foot body 240 and the ground-contact portions 245 or between the side surfaces 243 and the slopes 252 of the first concavity 250 are formed as smooth curved surfaces (R surfaces) 244. Accordingly, stumbling of the legged mobile robot 100 caused when, for example, one of the edges at the periphery of the foot 150 strikes a bump on the road surface or is pushed into the road surface can be prevented. In addition, even when the legged mobile robot 100 is in a danger of falling over, the motion of the legged mobile robot 100 can be smoothly changed to safe falling motion. The main foot body 160 is preferably composed of a light, strong material such as an aluminum alloy and a magnesium alloy.

Next, dimensions of the foot 150 will be described below with reference to FIGS. 22 and 23.

The size of the foot 150 may be arbitrarily determined in accordance with, for example, the overall size of the legged mobile robot. However, in the case in which the legged mobile robot walks in a Japanese house, it can be assumed that a doorsill of a "fusuma" (Japanese sliding door) having grooves and bumps would be a major barrier to the walking motion of the small legged mobile robot. Therefore, it is extremely effective to limit the dimensions of the foot 150 under predetermined conditions for the purpose of making the robot walk stably on the doorsill. The conditions under which the legged mobile robot can walk stably even when the foot 150 steps on the doorsill will be described below.

In this case, the sizes of the ground-contact portions 245 of the foot 150 must be set such that the ground-contact portions 245 do not fall into the grooves of the doorsill. As shown in FIG. 10, in the foot 150, end portions in front of and behind the first concavity 250 serve as the ground-contact portions 245. In addition, the peripheral edges of the ground-contact portions 245 are connected to the side surfaces 243 of the main foot body 240 with the smooth curved surfaces 244, and edges of the ground-contact portions 245 which are closer to the center of the main foot body are connected to the gently slopes 252 of the first concavity 250. Thus, it can be assumed that the projecting areas from the slopes 252 to the curved surfaces at the peripheral edges of the main foot body 240 are the ground-contact areas which project from main foot body and which should be prevented from falling into the grooves of the doorsill.

If the legged mobile robot walks only in the normal walking direction, it is only necessary to restrict the dimensions of the foot 150 in the direction perpendicular to the grooves of the doorsill, that is, the walking direction (X direction). However, in this example, a case in which the legged mobile robot walks sideways and steps on the doorsill is also considered. Accordingly, the dimensions of the foot 150 in the lateral direction (Y direction) which is perpendicular to the walking direction are also considered under the same conditions of the doorsill.

Accordingly, in the foot 150 of the present example, with reference to FIG. 22, conditions are set on the lengths $L_1$ and $L_2$ of the contact areas in the walking direction (X direction), the overall length L of the overall foot 150, the lengths $W_1$ and $W_2$ of the contact areas in the lateral direction (Y direction), and the overall width W of the foot 150.

Doorsills used in Japanese houses are shaped as shown in, for example, FIG. 11. FIG. 23(A) shows a doorsill with two grooves, and FIG. 23(B) shows a doorsill with three grooves. In FIGS. 23(A) and 23(B), widths of the grooves are $L_{g1}$, $L_{g2}$, and $L_{g3}$, and those of bumps are $L_{m1}$ and $L_{m2}$. In common doorsills, $L_{g1}=L_{g2}=L_{g3}=21$ mm and $L_{m1}=L_{m2}=12$ mm are satisfied.

When the legged mobile robot walks in a normal walking direction, in order to prevent the foot 150 from falling into the grooves of the doorsill with two grooves, the dimensions of the contact areas and the foot must satisfy the following expression:

$$L_1, L_2 > L_{g1}(=L_{g2})$$

$$L > L_{g1} + L_{m1} + L_{g2} \quad (3)$$

In addition, when the legged mobile robot walks in the normal walking direction, in order to prevent the foot 150 from falling into the grooves of the doorsill with three grooves, the dimensions of the contact areas and the foot must satisfy the following expression:

$$L_1, L_2 > L_{g1}(=L_{g2})$$

$$L > L_{g1} + L_{m1} + L_{g2}$$

$$L_1, L_2 < L_{m1} + L_{g1} + L_{m2} \quad (4)$$

Accordingly, $L_1$, $L_2 > 21$ mm and $L > 54$ mm must be satisfied to prevent the foot 150 of the legged mobile robot from falling into the grooves of the doorsill with two grooves, and $21 < L_1$, $L_2 < 45$ mm and $L > 54$ mm must be satisfied to prevent the foot 150 of the legged mobile robot from falling into the grooves of the doorsill with three grooves.

In addition, when the legged mobile robot walks in the lateral direction, in order to prevent the foot 150 from falling into the grooves of the doorsill with two grooves, the dimensions of the contact areas and the foot must satisfy the following expression:

$$W_1, W_2 > L_{g1}(=L_{g2})$$

$$W > L_{g1} + L_{m1} + L_{g2} \quad (3)$$

In addition, when the legged mobile robot walks in the lateral direction, in order to prevent the foot 150 from falling into the grooves of the doorsill with three grooves, the dimensions of the contact areas and the foot must satisfy the following expression:

$$W_1, W_2 > L_{g1}(=L_{g2})$$

$$W > L_{g1} + L_{m1} + L_{g2}$$

$$W_1, W_2 < L_{m1} + L_{g2} + L_{m2} \quad (6)$$

Accordingly, $W_1$, $W_2 > 21$ mm and $W > 54$ mm must be satisfied to prevent the foot 150 of the legged mobile robot from falling into the grooves of the doorsill with two grooves, and $21 < W_1$, $W_2 < 45$ mm and $W > 54$ mm must be satisfied to prevent the foot 150 of the legged mobile robot from falling into the grooves of the doorsill with three grooves.

The actual size of the foot 150 is L=105.8 mm, W=69.8 mm, and L1=L2=33 mm, and all of the above-described conditions are satisfied.

A fifth example of the foot 150 will be described below with reference to FIGS. 24 to 29.

FIGS. 24 to 29 show a perspective view, a side view, a bottom view, and sectional views of a foot 150b.

As shown in the figures, in the foot 150b, a ceiling surface of a second concavity is dome-shaped, and a flexible portion 190 is constructed in a different manner. The structure of the foot may be arbitrarily determined such that a desired behavior can be achieved in accordance with the walking environment, obstacles, etc.

For example, the flexible portions 190 and 230 are formed so as to cover the inner surfaces of the first concavities 170 and 210, respectively. In addition, in the foot 150, the flexible portion 270 is formed so as to cover the ceiling surface 261 of the second concavity 260. However, in any of the above-described cases, it is not necessary that the flexible portion cover the entire region of the corresponding surface. The flexible portion may also be formed such that it covers only a part of the first concavity or the second concavity, or be selectively formed at an area where a possibility that bumps on the road surface will enter is high. In addition, a plurality of flexible portions may also be provided. Accordingly, the construction of the flexible portion may be determined arbitrarily.

In addition, although an elastic and viscous material having hysteresis characteristics is preferably used as the material of the flexible portion in the above-described examples, the material of the flexible portion is not limited to this as long as it has flexibility. For example, a material which does not have hysteresis characteristics may also be used for applications where hysteresis characteristics are not necessary.

In addition, although the side surfaces 262 of the second concavity 260 extend along the direction approximately perpendicular to the ground-contact surface, that is, the vertical direction, in the foot 150, the present invention is not limited to this. More specifically, the side surfaces 262 of the second concavity 260 may be inclined at any angle as long as the inclination thereof is closer to vertical than the slopes 252 of the first concavity 250.

The above examples of feet of the legged mobile robot are described in order to facilitate understanding of the present invention, and are not intended to limit the scope of the present invention. The components described in the above-described examples may be replaced with other components of different design or equivalents which belong to the technical scope of the present invention. In addition, various modifications are possible.

For example, in the feet 150a and 150b according to the first and second examples, respectively, the flexible portions 190 and 230 are formed so as to cover the inner surfaces of the first concavities 170 and 210, respectively. In addition, in the foot 150c of the third example, the flexible portion 270 is formed so as to cover the ceiling surface 261 of the second concavity 260. However, in any of the above-described cases, it is not necessary that the flexible portion cover the entire region of the corresponding surface. The flexible portion may also be formed such that it covers only a part of the first concavity or the second concavity, or be selectively formed at an area where a possibility that bumps on the road surface will enter is high. In addition, a plurality of flexible portions may also be provided. Accordingly, the construction of the flexible portion may be determined arbitrarily.

In addition, although it is described above that an elastic and viscous material having hysteresis characteristics is preferably used as the material of the flexible portion, the material of the flexible portion is not limited to this as long as it has flexibility. For example, a material which does not have hysteresis characteristics may also be used for applications where hysteresis characteristics are not necessary.

In addition, although the side surfaces 262 of the second concavity 260 extend along the direction approximately perpendicular to the ground-contact surface, that is, the vertical direction, in the foot 150c, the present invention is not limited to this. More specifically, the side surfaces 262 of the second concavity 260 may be inclined at any angle as long as the inclination thereof is closer to vertical than the slopes 252 of the first concavity 250.

In addition, in the foot 150c, the slopes 252 of the first concavity 250 and the side surfaces 262 of the second concavity 260 are discontinuously connected to each other such that, for example, edges of a predetermined angle are provided therebetween. However, they may also be connected with smooth curved surfaces similarly to the edges of the bottom surface of the main foot body 240. The shapes, etc., of the side surfaces 262 of the second concavity 260 and the edges thereof may be arbitrarily determined in accordance with conditions and environments, for example, whether or not the robot is planned to walk on a soft surface, characteristics of the soft surface, etc.

In addition, the shape of the concavity formed in the bottom surface of the foot 150 is not limited to the dome shape (cone shape), and the concavity may have an arbitrary shape as long as it has a slope (for example, a tapered surface) which extend continuously from the ground-contact portions 265 toward the inside of the main foot body 240. For example, the concavity may have a quadrangular pyramidal shape, a circular conical shape, an arch shape, a tunnel shape, etc.

A sixth example of the foot 150 will be described below with reference to FIGS. 30 to 34.

Figure 30:
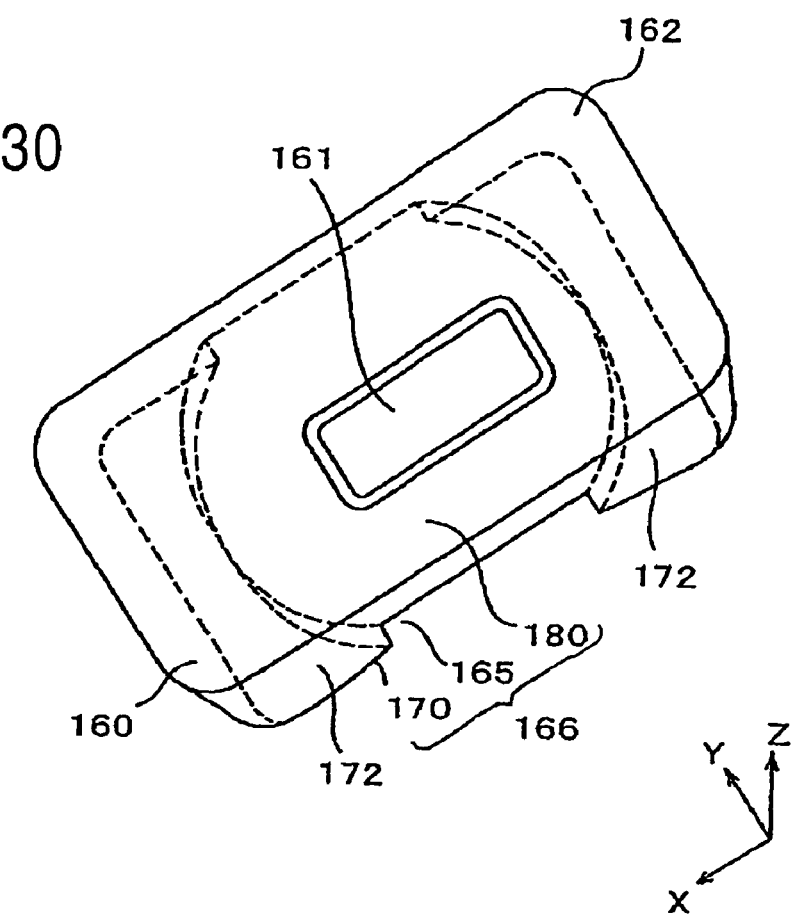
FIG. 30 is a perspective view of a foot of the legged mobile robot according to a sixth example.
Figure 31:
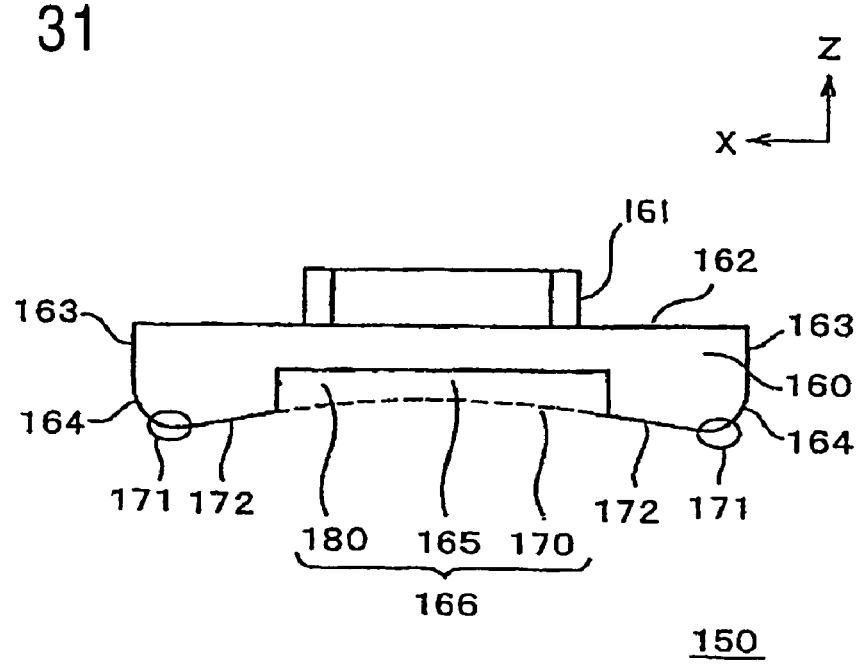
FIG. 31 is a side view of the foot of the legged mobile robot according to the sixth example.
Figure 32:
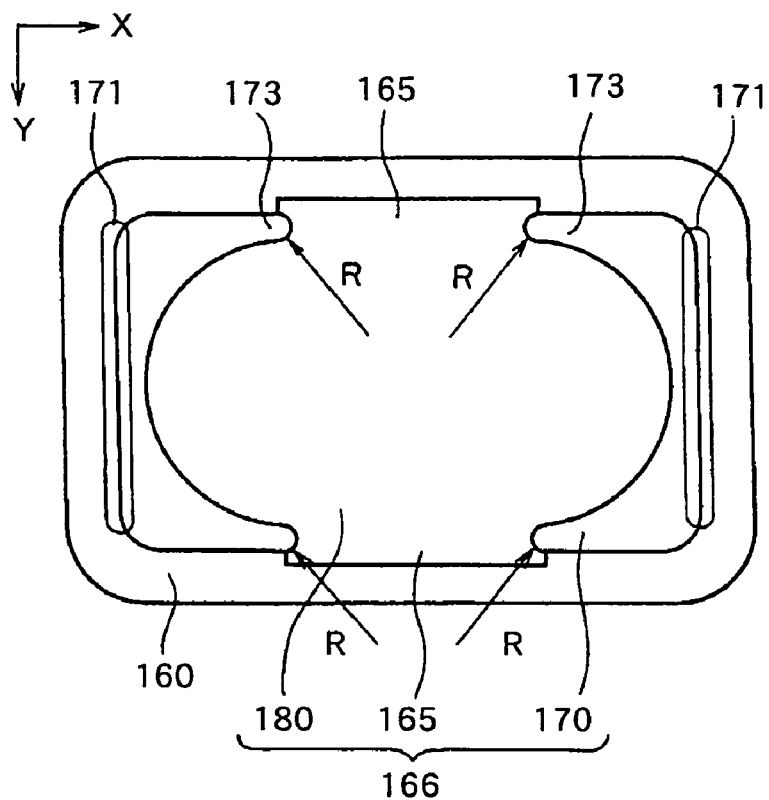
FIG. 32 is a bottom view of the foot of the legged mobile robot according to the sixth example.

FIGS. 30 to 32 are diagrams showing the construction of the foot 150, where FIG. 30 is a perspective view, FIG. 31 is a side view, and FIG. 32 is a bottom view of the foot 150.

The foot 150 includes a main foot body 160 constructed of a rectangular plate-shaped member and a connector 161 which is formed integrally with the main foot body 160 on a top surface 162 of the main foot body and which is connected to the ankle 114 of the corresponding lower limb 110.

The bottom surface (foot bottom surface) of the main foot body 160 includes slopes 172 which extend from a peripheral portion of the bottom surface and gently slope inward so as to form a dome-shaped first concavity (recess) 170. In addition, a columnar second concavity (recess) 180 is formed deeper into the main foot body 160 than the first concavity 170 at the central region of the main foot body 160.

In addition, notches are formed in the peripheral portion of the bottom surface of the foot 150 at the central positions of the inner and outer sides of the peripheral portion, the notches being cut to the bottom surface (ceiling surface) of the second concavity 180 so that the main foot body 160 does not come into contact with the floor surface (walking surface) at those positions. In other words, the bottom surface (ceiling surface) of the first concavity 170 and sidewalls of the second concavity 180 are partially removed at the central positions of the bottom surface of the main foot body 160 in the X direction, so that the second concavity extends through the main foot body 160 in the lateral direction (Y direction) thereof at the central region in the walking direction. The overall concavity formed in the bottom surface of the main foot body 160 including the first concavity 170, the second concavity 180, and the notches 165 serves as a plantar-arch portion 166 of the foot 150.

In the foot 150, peripheral portions of the first concavity 170 which project most in the bottom surface of the main foot body 160 serve as ground-contact portions 171 which actually come into contact with the ground-contact surface (walking surface). Accordingly, when the foot bottom surface (ground-contact surface) of the main foot body 160 is placed on the road surface, the ground-contact portions 171 come into even contact with the road surface and support the weight of the legged mobile robot 100, while the plantar-arch portion 166 is separated from the road surface.

In addition, side surfaces of the second concavity 180 are discontinuously connected to the slopes 172 of the first concavity 170 such that edges are provided therebetween, and are formed such that they are approximately parallel to the vertical direction (Z direction) which is perpendicular to the ground-contact surface. Since the side surfaces of the second concavity 180 are constructed as described above, when, for example, the robot walks on a soft floor, such as a carpet, and soft objects such as fibers of the carpet enter the second concavity 180, the soft objects encounter the side surfaces of the second concavity 180 and are caught by the discontinuous edges. As a result, resistive force and reaction force are applied to the fibers against the moving direction of the fibers, and frictional force is applied to the walking surface of the foot 150. Accordingly, even on a slippery walking surface as described above, sufficient frictional force can be obtained, and efficiencies of braking force and impelling force can be increased.

In addition, end portions 173, which are parts of the slopes of the first concavity 170 and the side surface of the second concavity 180 and which face the notches 165, are formed of smooth curved surfaces (R surfaces). Accordingly, the amount of indentation in a soft moving surface, such as a carpet, can be adjusted and generation of the falling moment can be prevented. In addition, the floor surface can be protected.

In addition, the edges at the periphery of the bottom surface of the main foot body 160, that is, portions between side surfaces 163 of the main foot body 160 and the ground-contact portions 171 are formed as smooth curved surfaces (R surfaces) 164. Accordingly, stumbling of the legged mobile robot 100 caused when, for example, one of the edges at the periphery of the foot 150 strikes a bump on the road surface or is pushed into the road surface can be prevented. In addition, even when the legged mobile robot 100 is in a danger of falling over, the motion of the legged mobile robot 100 can be smoothly changed to safe falling motion.

The main foot body 160 is preferably composed of a light, strong material such as an aluminum alloy and a magnesium alloy.

Next, dimensions of the foot 150 will be described below with reference to FIGS. 33 and 34. The size of the foot 150 may be arbitrarily determined in accordance with, for example, the overall size of the legged mobile robot. However, in the case in which the legged mobile robot walks in a Japanese house, it can be assumed that a doorsill of a "fusuma" (Japanese sliding door) having grooves and bumps would be a major barrier to the walking motion of the small legged mobile robot. It is extremely effective to limit the dimensions of the foot 150 under predetermined conditions for the purpose of making the robot walk stably on the doorsill. The conditions under which the legged mobile robot can walk stably even when the foot 150 steps on the doorsill will be described below.

In this case, the size of the ground-contact portions 171 of the foot 150 must be set such that the ground-contact portions 171 do not fall into grooves of the doorsill. As shown in FIG. 33, in the foot 150, end portions in front of and behind the first concavity 170 serve as the ground-contact portions 171. In addition, the peripheral edges of the ground-contact portions 171 are connected to the side surfaces 163 of the main foot body 160 with the smooth curved surfaces 164, and edges of the ground-contact portions 171 which are closer to the center of the main foot body are connected to the gently slopes 172 of the first concavity 170. Thus, it can be assumed that the areas from the slopes 172 to the curved surfaces at the peripheral edges of the main foot body 160 are the ground-contact areas which project from main foot body and which should be prevented from falling into the grooves of the doorsill.

Figure 33:
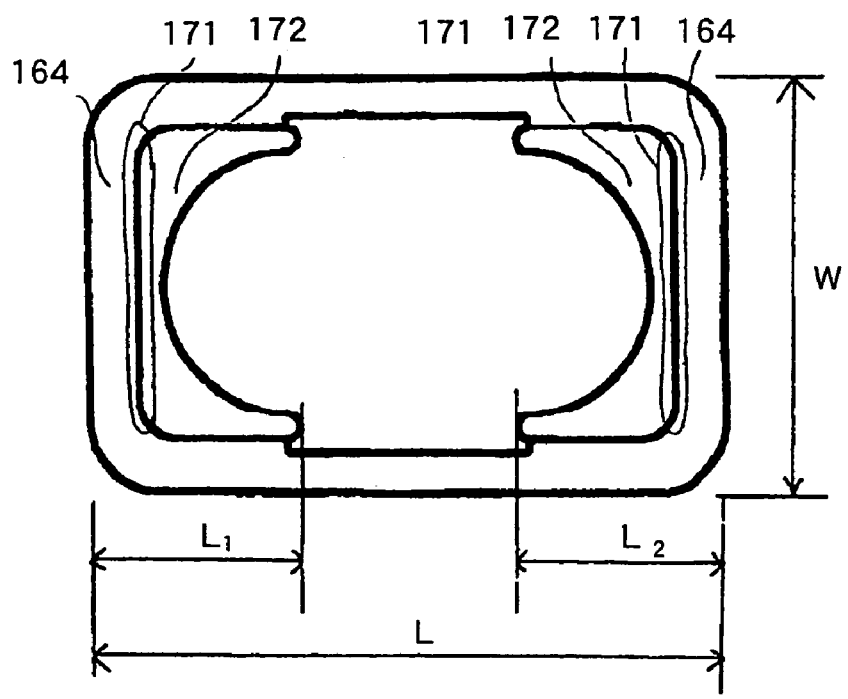
FIG. 33 is a diagram for explaining dimensions of the foot of the legged mobile robot shown in FIG. 30.

Accordingly, with reference to FIG. 33, conditions are set on the lengths $L_1$ and $L_2$ of the contact areas in the walking direction (X direction), the overall length L of the foot 150c, and the width W of the foot 150c, that is, the length of the contact areas in the lateral direction (Y direction).

Doorsills used in Japanese houses are shaped as shown in, for example, FIG. 34. FIG. 34(A) shows a doorsill with two grooves, and FIG. 34(B) shows a doorsill with three grooves. In FIGS. 34(A) and 34(B), widths of the grooves are $L_{g1}$, $L_{g2}$, and $L_{g3}$, and those of bumps are $L_{m1}$ and $L_{m2}$. In common doorsills, $L_{g1}=L_{g2}=L_{g3}=21$ mm and $L_{m1}=L_{m2}=12$ mm are satisfied.

When the legged mobile robot walks in a normal walking direction, in order to prevent the foot 150 from falling into the grooves of the doorsill with two grooves, the dimensions of the contact areas and the foot must satisfy the following expression:

$$L_1, L_2 > L_{g1}(=L_{g2})$$

$$L > L_{g1} + L_{m1} + L_{g2} \qquad (7)$$

In addition, when the legged mobile robot walks in the normal walking direction, in order to prevent the foot 150c from falling into the grooves of the doorsill with three grooves, the dimensions of the contact areas and the foot must satisfy the following expression:

$$L_1, L_2 > L_{g1}(=L_{g2})$$

$$L > L_{g1} + L_{m1} + L_{g2}$$

$$L_1, L_2 < L_{m1} + L_{g1} + L_{m2} \qquad (8)$$

Accordingly, $L_1$, $L_2 > 21$ mm and $L > 54$ mm must be satisfied to prevent the foot 150c of the legged mobile robot from falling into the grooves of the doorsill with two grooves, and $21 < L_1$, $L_2 < 45$ mm and $L > 54$ mm must be satisfied to prevent the foot 150c of the legged mobile robot from falling into the grooves of the doorsill with three grooves. In the foot 150c, L=105.8 mm, W=69.8 mm, and L1=L2=33 mm are satisfied.

When the legged mobile robot walks sideways, it is also necessary to set a condition in the lateral direction of the foot 150 similarly to the case in which it walks in the normal walking direction. However, this will not be discussed here since the ground-contact area of the foot 150 is not divided in the lateral direction by, for example, a plantar-arc portion and the foot 150 has a sufficient length relative to the widths of the grooves of the doorsill.

Figure 35:
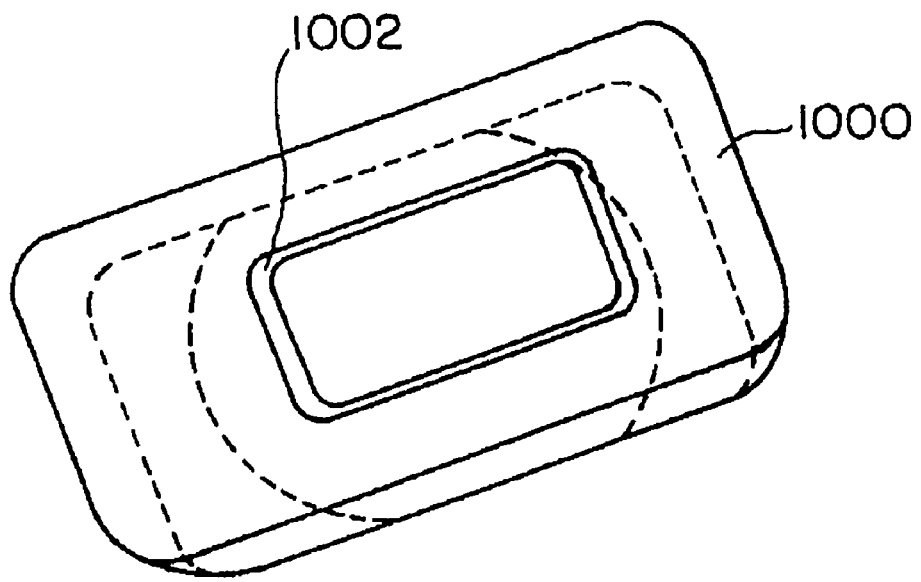
FIG. 35 is a perspective view of a foot of the legged mobile robot according to a seventh example.
Figure 36:
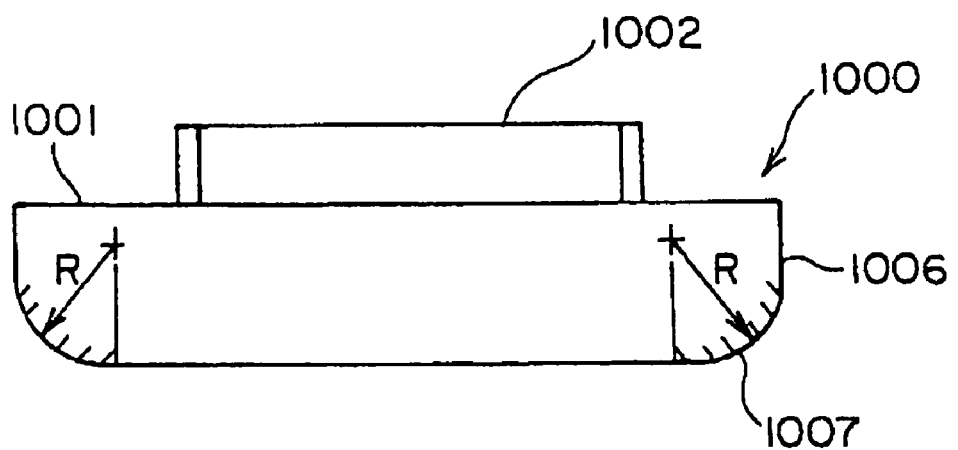
FIG. 36 is a side view of the foot of the legged mobile robot according to the seventh example.
Figure 37:
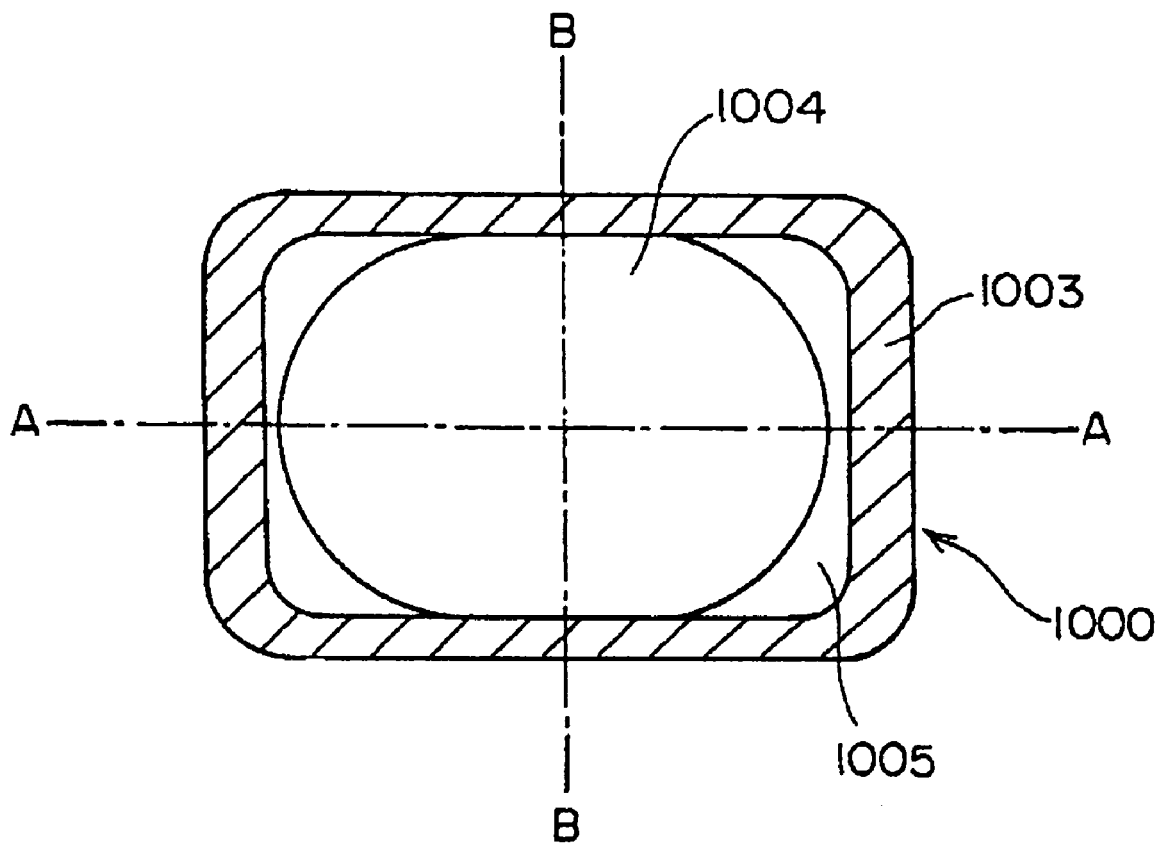
FIG. 37 is a bottom view of the foot of the legged mobile robot according to the seventh example.
Figure 38:
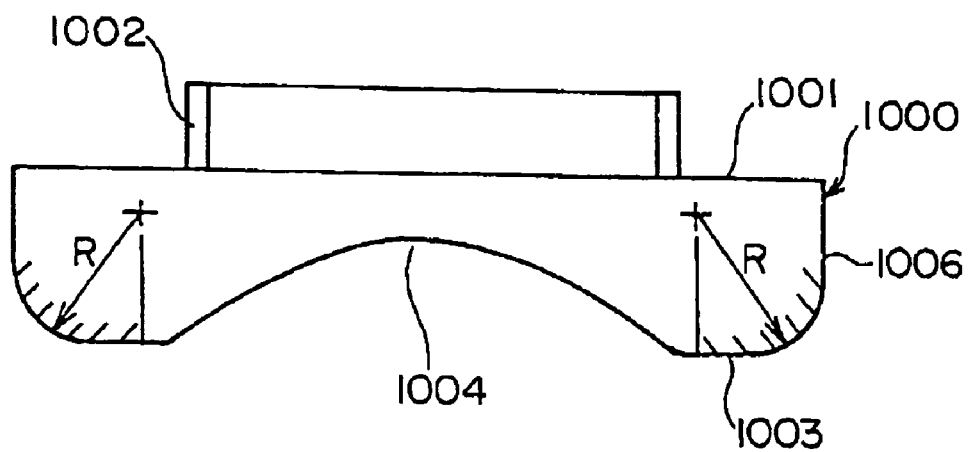
FIG. 38 is a sectional view of FIG. 37 cut along line A—A.
Figure 39:
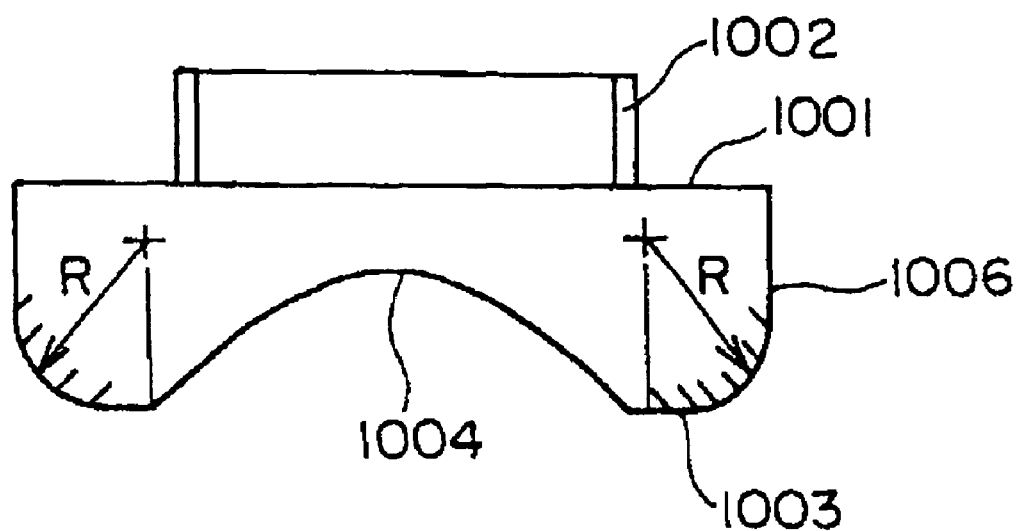
FIG. 39 is a sectional view of FIG. 37 cut along line B—B.

A seventh example of the foot 150 will be described below with reference to FIGS. 35 to 39. FIG. 35 is a perspective view; FIG. 36 is a side view; FIG. 37 is a bottom view; FIG. 38 is a sectional view of FIG. 37 cut along line A—A; and FIG. 39 is a sectional view of FIG. 37 cut along line B—B.

The foot according to a seventh structure includes a main foot body 1000 which is constructed of a rectangular plate-shaped member and which is connected to the ankle 114 of the corresponding lower limb 110. The main foot body 1000 is preferably composed of a light, strong material such as an aluminum alloy and a magnesium alloy.

A connector 1002 for providing connection to the ankle 114 is formed integrally with the main foot body 1000 on a top surface 1001 of the main foot body 1000. In addition, a ground-contact portion 1003 is formed on the bottom surface (foot bottom surface) of the main foot body 1000 at the peripheral region thereof (see the hatched area in FIG. 6). A plantar-arch portion 1004 having a slope 1005 which slopes inward so as to form a concavity is formed in the bottom surface of the main foot body 1000 at an area inside the ground-contact portion 1003.

The plantar-arch portion 1004 is dome-shaped and is connected to the ground-contact portion 1003 at the periphery thereof. Accordingly, when the foot bottom surface of the main foot body 1000 is placed on the road surface, the ground-contact portion 1003 comes into even contact with the road surface, while the plantar-arch portion 1004 is separated from the road surface. The shape of the plantar-arch portion 1004 is not limited to the dome shape, and may also be a quadrangular pyramidal shape or a circular conical shape (cone shape). In addition, the plantar-arch portion 1004 may also have other shapes as long as it has a slope (for example, a tapered surface) which extends continuously from the ground-contact portion 1002 and which slopes inward.

Side surfaces 1006 of the main foot body 1000 and the ground-contact portion (ground-contact surface) 1003 are connected to each other with smooth curved surfaces (R surfaces) 1007. Preferably, the ground-contact portion 1003 and the plantar-arch portion 1004 are also connected to each other with smooth curved surfaces.

Since the main foot body 1000 includes the plantar-arch portion 1004 in the foot bottom surface of the main foot body 1000 at an area inside the ground-contact portion 1003, even when the position of the ZMP varies and deflection of the main foot body 1000 occurs as the legged mobile robot walks, variation in the position and the shape of the ground-contact portion 1003 is extremely small. Accordingly, variation in the resistive force against the moment about the yaw axis can be reduced, and unexpected change in the behavior of the robot does not easily occur. In addition, the possibility that the spinning motion (motion in which the robot rotates around the ground-contact portion) will occur can be reduced. Accordingly, the attitude stability of the robot can be increased and the stable motion of the robot can be continued. In addition, since the plantar-arch portion 1004 is separated from the road surface, the ground-contact portion 1003 is separated from the center of the main foot body 1000. Accordingly, the area of the ground-contact portion 1003 is reduced without reducing the resistive force against moment around the yaw axis. Therefore, the excessive increase in the frictional force between the foot and the road surface can be prevented, which also helps to prevent the stumbling of the robot.

In addition, since the side surfaces 1006 of the main foot body 1000 and the ground-contact portion 1003 are connected to each other with the smooth R surfaces 1007, these portions can be prevented from being caught by a road surface having bumps and depressions and stumbling of the robot can be prevented. Accordingly, the possibility that the robot will fall over can be reduced.

In addition, since the plantar-arch portion 1004 is provided, even when there are bumps and depressions on the road surface and the central area of the foot bottom surface is positioned above a bump on the road surface, the possibility that the foot will step on the bump and fall into a so-called seesaw state can be reduced.

Figure 40:
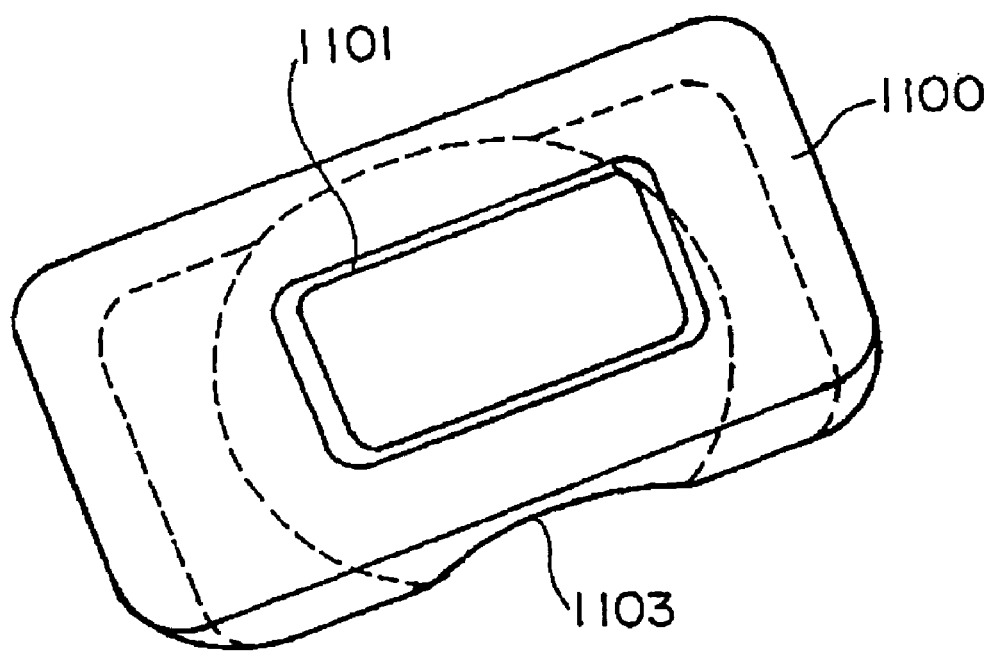
FIG. 40 is a perspective view of a foot of the legged mobile robot according to an eighth example.
Figure 41:
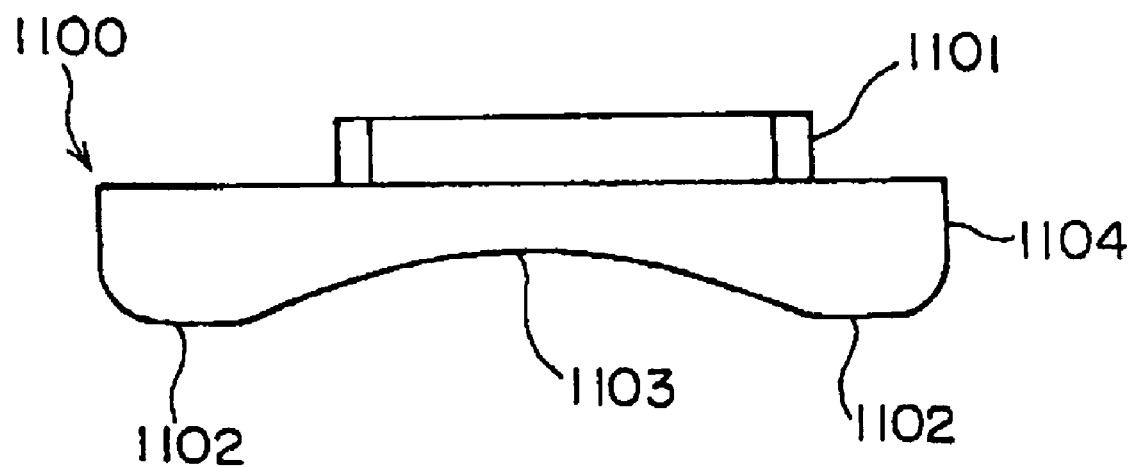
FIG. 41 is a side view of the foot of the legged mobile robot according to the eighth example.

An eighth example of the foot 150 will be described below with reference to FIGS. 40 and 41. FIG. 40 is a perspective view and FIG. 41 is a sectional side view.

The foot according to an eighth structure includes a main foot body 1100 which is constructed of a rectangular plate-shaped member and which is connected to the ankle 114 of the corresponding lower limb 110. The main foot body 1100 is preferably composed of a light, strong material such as an aluminum alloy and a magnesium alloy.

A connector 1101 for providing connection to the ankle 114 is formed integrally with the main foot body 1100 on the top surface of the main foot body 1100. In addition, ground-contact portions 1102 are formed on the bottom surface (foot bottom surface) of the main foot body 1100 at the front and rear ends thereof. A plantar-arch portion 1103 is formed in the bottom surface of the main foot body 1100 at an area inside the ground-contact portions 1102.

The plantar-arch portion 1103 is dome-shaped and is connected to the ground-contact portions 1102 at the front and rear ends thereof. In addition, the plantar-arch portion 1103 is directly connected to the side surfaces of the main foot body 1100 at the left and right sides thereof. Accordingly, when the foot bottom surface of the main foot body 1100 is placed on the road surface, the ground-contact portions 1102 comes into even contact with the road surface, while the plantar-arch portion 1103 extend through the main foot body 1100 in the lateral direction. The shape of the plantar-arch portion 1103 is not limited to the dome shape, and may also be a quadrangular pyramidal shape or a circular conical shape (cone shape). In addition, the plantar-arch portion 1103 may also have other shapes as long as it has a slope (for example, tapered surfaces) which extends continuously from the ground-contact portions 1102 and which slopes inward.

Side surfaces 1104 of the main foot body 1100 and the ground-contact portions (contact surfaces) 1102 are connected to each other with smooth curved surfaces (R surfaces). Preferably, the ground-contact portions 1102 and the plantar-arch portion 1103 are also connected to each other with smooth surfaces.

Figure 42:
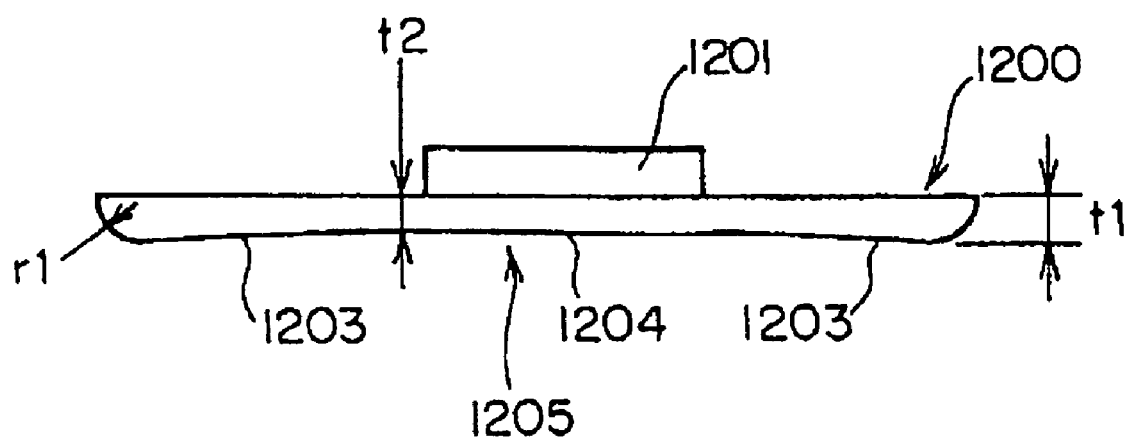
FIG. 42 is a side view of a foot of the legged mobile robot according to a ninth example.
Figure 43:
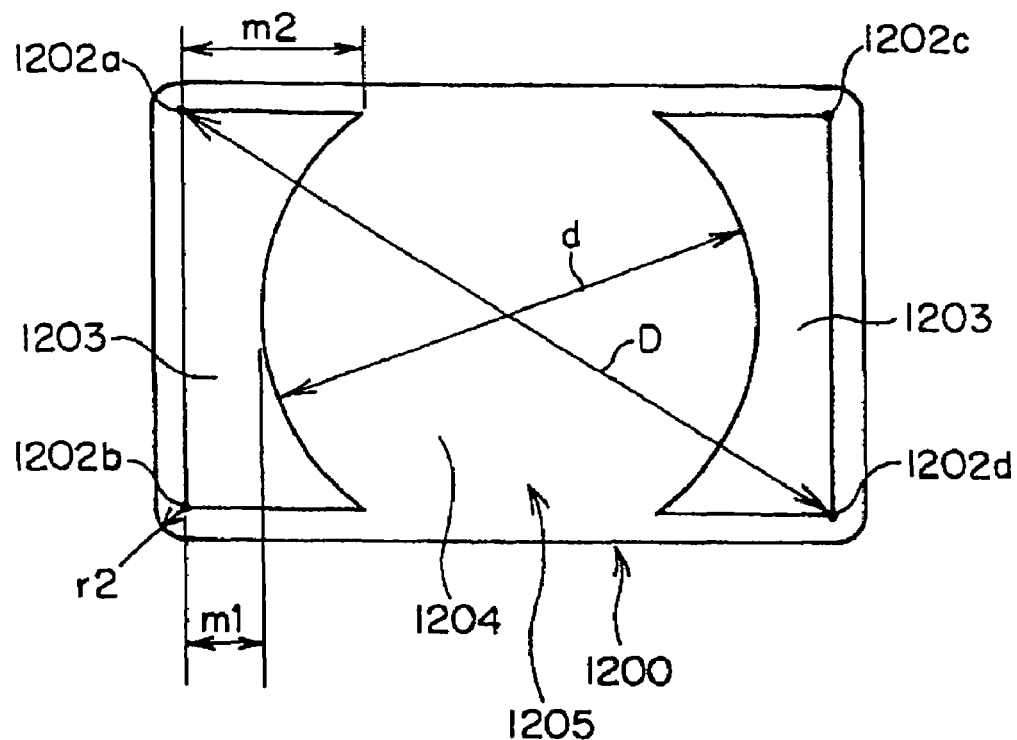
FIG. 43 is a bottom view of the foot of the legged mobile robot according to the ninth example.

A ninth example of the foot 150 will be described below with reference to FIGS. 42 and 43. FIG. 42 is a sectional side view and FIG. 43 is a bottom view.

The foot according to a ninth structure includes a main foot body 1200 which is constructed of a rectangular plate-shaped member and which is connected to the ankle 114 of the corresponding lower limb 110. The main foot body 1200 is preferably composed of a light, strong material such as an aluminum alloy and a magnesium alloy.

A connector 1201 for providing connection to the ankle 114 is formed integrally with the main foot body 1200 on the top surface of the main foot body 1200. In addition, four ground-contact portions 1202a to 1202d are formed in the bottom surface (foot bottom surface) of the main foot body 1200 at the corners thereof. A plantar-arch portion 1205 is formed in the bottom surface of the main foot body 1200 at an area surrounded by the ground-contact portions 1202a to 1202d. The plantar-arch portion 1205 has a pair of slopes 1203 and a circular flat portion 1204 which is approximately parallel to a plane including the ground-contact portions 1202a to 1202d. The flat portion 1204 is provided for ensuring the strength of the main foot body 1200 since the main foot body 1200 is relatively thin. If the main foot body 1200 is sufficiently thick, the flat portion 1204 may be omitted and the slopes may be formed such that the depth increases toward the center of the main foot body 1200.

The slopes 1203 are formed such that they slope inward, and the average inclination thereof may be, for example, 1/20. The slopes 1203 may be flat surfaces, circular conical surfaces, or surfaces of other shapes. In this case, the slopes 1203 are circular conical surfaces (cone-shaped surfaces) in which the inclination angle increases toward the center and decreases toward the left and right ends.

The detailed dimensions of each part will be described below for reference. The thickness of the main foot body 1200 at the areas where the ground-contact portions 1202a to 1202d are formed is t1=5 mm; the thickness of the main foot body 1200 at the area where the flat portion 1204 is formed is t2=4.2 mm; the radius of the curved surfaces between the ground-contact portions and the side surfaces is r1=4 mm; the radius of the curved surfaces between the side surfaces is r2=4 mm; the diameter of the flat portion is d=66 mm; the length of the diagonal lines between the ground-contact portions 1202a and 1202d or between the ground-contact portions 1202b to 1202c is D=100 mm; the dimension of each slope 1203 at the central position is m1=12 mm; and the dimension of each slope 1203 at both sides is m2=30 mm.

The construction may also be such that the ground-contact portions 1202a and 1202b are linearly connected to each other (at the constant height) and the ground-contact portions 1202c and 1202d are linearly connected to each other (at the constant height) so that linear ground-contact portions are provided. Alternatively, the areas between the ground-contact portions 1202a and 1202b and between the ground-contact portions 1202c and 1202d may be dented inward in an arc shape or other shape. In such a case, the slopes 1203 are formed such that they are smoothly connected to the shapes of these areas.

Figure 44:
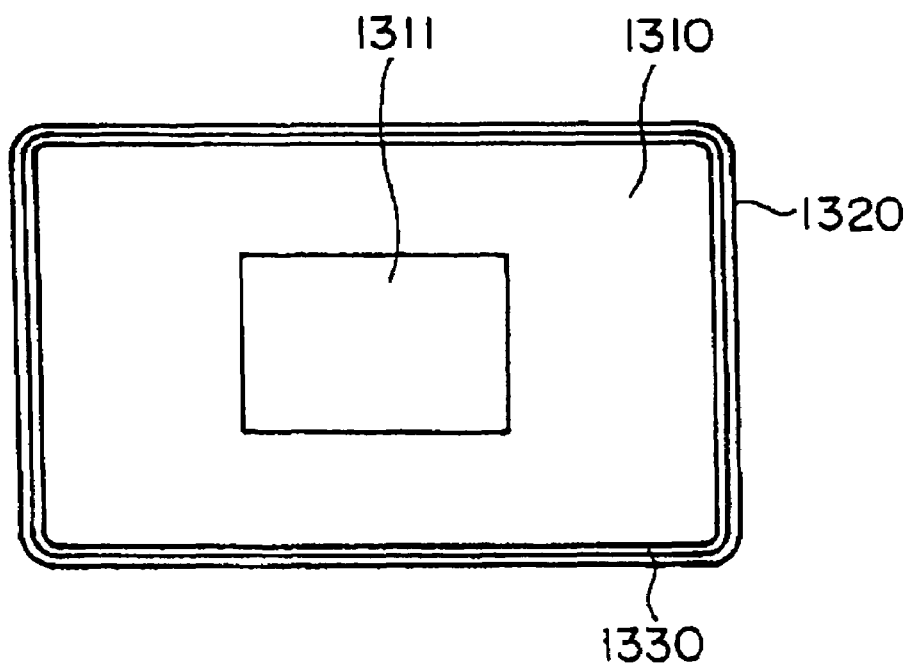
FIG. 44 is a bottom view of a foot of the legged mobile robot according to a tenth example.
Figure 45:
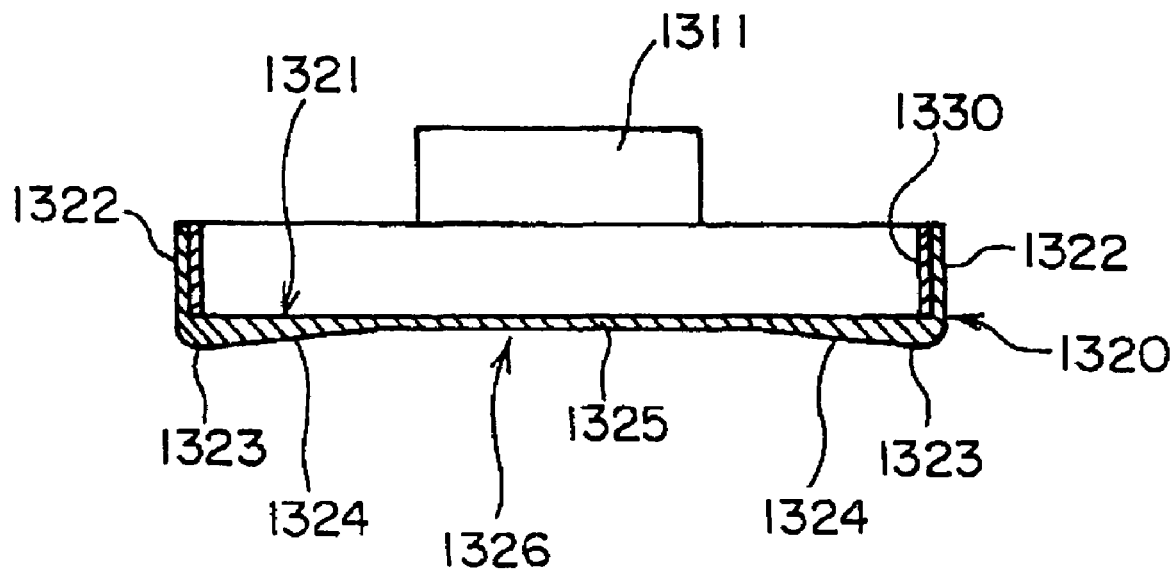
FIG. 45 is a side view of the foot of the legged mobile robot according to the tenth example.

A tenth example of the foot 150 will be described below with reference to FIGS. 44 and 45. FIG. 44 is a plan view and FIG. 45 is a partially sectioned side view.

The foot according to a tenth structure includes an instep 1310 which is connected to the ankle 114 of the corresponding lower limb 110 and a foot sole 1320 which directly comes into contact with the road surface, and has a two-part structure in which the foot sole 1320 is movably attached to the instep 1310.

The instep 1310 is constructed of a rectangular plate-shaped member and a connector 1311 for providing connection to the ankle 114 is formed integrally with the instep 1310 on the top surface of the instep 1310. Although not shown in the figure, a plurality of force sensors for detecting pressures in the Z-axis direction which are used for calculating the ZMP are provided on the bottom surface of the instep 1310. In the present example, four force sensors are disposed at four corners of the bottom surface of the instep 1310.

Each of these force sensors includes a metal diaphragm and four strain gauges, and is constructed by forming a bridge circuit with the four strain gauges and laminating the stain gauges on the metal diaphragm. However, the force sensors are not limited to this, and those having other constructions may also be used.

The foot sole 1320 is a rectangular box-shaped member with an open top which includes a bottom plate 1321 and upright side plates 1322 which are formed integrally with the bottom plate 1321 along the peripheral sides of the bottom plate 1321. The top surface of the bottom plate 1321 is in contact with the bottom surface of the instep 1310. In addition, the bottom surface of the bottom plate 1321 serves as the foot bottom surface of the foot 150. The bottom surface of the bottom plate 1321 and outer surfaces of the side plates 1322 are connected to each other with R surfaces (arc surfaces) or smooth curved surfaces.

The foot sole 1320 is provided with ground-contact portions 1323 at four corners thereof. In addition, a plantar-arch portion 1326 is formed in the bottom surface of the foot sole 1320 at an area surrounded by the ground-contact portions 1323. The plantar-arch portion 1323 has a pair of slopes 1324 and a circular flat portion 1325 which is approximately parallel to a plane including the ground-contact portions.

The slopes 1324 are formed such that they slope inward, and may be flat surfaces, circular conical surfaces, or surfaces of other shapes.

The internal shape of the side plates 1322 of the foot sole 1320 is similar to the shape of side surfaces of the instep 1310, but is slightly larger. The side surfaces of the instep 1310 face the inner surfaces of the side plates 1322 of the foot sole 1320 with small gaps (allowances) therebetween. Accordingly, the foot sole 1320 can move relative to the instep 1310 along the bottom surface of the instep 1310, that is, in an arbitrary direction in the X-Y plane.

The foot sole 1320 is attached to the instep 1310 with a retaining mechanism (not shown) in such a manner that the foot sole 1320 does not fall from the instep 1310 when the corresponding leg is off the road surface and the movement of the foot sole 1320 in the X-Y plane is not restricted. The retaining mechanism preferably has a mechanism for easily attaching/detaching the foot sole 1320 when the foot sole 1320 is to be replaced.

A buffer (buffer means) 1330 is disposed between the side plates 1322 of the foot sole 1320 and the side surfaces of the instep 1310. In this example, an endless rubber sheet is used as the buffer 1330, and is disposed such that gaps between the inner surfaces of the side plates 1322 of the foot sole 1320 and the side surfaces of the instep 1310 are completely filled with the rubber sheet. However, the buffer is not limited to this, and a leaf spring, a sponge, a solid or semi-solid viscous means may also be used.

The buffer is preferably formed such that the gaps between the inner surfaces of the side plates 1322 of the foot sole 1320 and the side surfaces of the instep 1310 are completely filled since foreign matter can be prevented from entering the gaps in such a case. However, the present invention is not limited to this, and a plurality of buffers may be arranged with gaps therebetween. In addition, the buffer may also be omitted.

Figure 46:
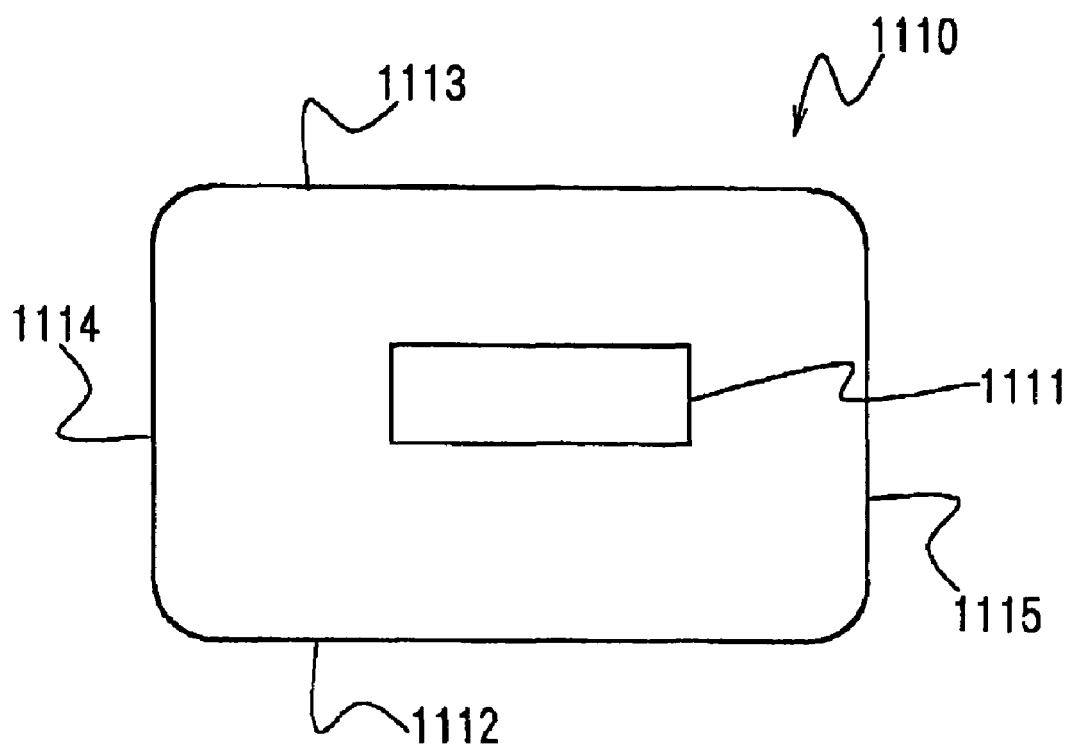
FIG. 46 is a plan view showing a foot of the legged mobile robot according to an eleventh structure.

An eleventh example of the foot 150 will be described below with reference to FIGS. 46 and 47. FIG. 46 is a plan view showing the schematic construction of the foot according to an eleventh structure. Although FIG. 46 shows only one of the feet attached to the left and right legs, the construction of the other one of the feet is plane-symmetric to that of the foot shown in the figure.

The foot according to the eleventh structure includes a main foot body 1110 which is constructed of a rectangular plate-shaped member and which is connected to the ankle 114 of the corresponding lower limb 110. The main foot body 1110 is preferably composed of a light, strong material such as an aluminum alloy and a magnesium alloy.

A connector 1111 for providing connection to the ankle 114 is formed integrally with the main foot body 1110 on the top surface of the main foot body 1110. In addition, the bottom surface (foot bottom surface) of the main foot body 1110 serves as the ground-contact surface. In the example shown in the figure, the foot bottom surface is flat.

As shown in the figure, the external shape of the foot bottom surface is rectangular. Although not particularly limited, a plurality of non-slip grooves or a plantar-arch portion having a concave shape may be formed in the foot bottom surface. Although not shown in the figure, the shape of the plantar-arch portion may be a dome shape, a quadrangular pyramidal shape, a circular conical shape (cone shape), etc. A foot having a plantar-arch portion is disclosed in, for example, Japanese Patent Application No. 2002-037988 which is applied by the present applicant.

In the figure, reference numeral 1112 denotes a side edge (outer side edge) or a side surface (outer side surface) which is remote from the other foot, reference numeral 1113 denotes a side edge (inner side edge) or a side surface (inner side surface) which is adjacent to the other foot, reference numeral 1114 denotes a side edge (front side edge) or a side surface (front side surface) at the front of the robot, and reference numeral 1115 denotes a side edge (rear side edge) or a side surface (rear side surface) at the rear of the robot.

As shown in the figure, all of the side surfaces 1112 to 1115 of the main foot body 1110 are flat, and all of the side edges 1112 to 1115 are linear accordingly. In the case in which the grooves or the plantar-arch portion which extends to the side edges 1112 to 1115 are formed in the foot bottom surface, the side edges 1112 to 1115 include a curved line or a discontinuous line corresponding to the shape of the grooves or the plantar-arch portion. However, it is only necessary that the shapes of the side edges 1112 to 1115 are linear lines when the side edges 1112 to 1115 are projected onto a plane including the foot bottom surface of the foot.

The adjacent side surfaces 1112 to 1115 of the main foot body 1110 are connected to each other with smooth curved surfaces. In the present example, the curved surfaces are arc surfaces (R surfaces). In addition, the side surfaces 1112 to 1115 of the main foot body 1110 and the foot bottom surface of the foot are also connected to each other with smooth curved surfaces. The reason for connecting the surfaces (side surfaces and the foot bottom surface) with the smooth curved surfaces is to prevent stumbling, etc., caused when these portions are caught by, for example, the surface having bumps and depressions.

Figure 47:
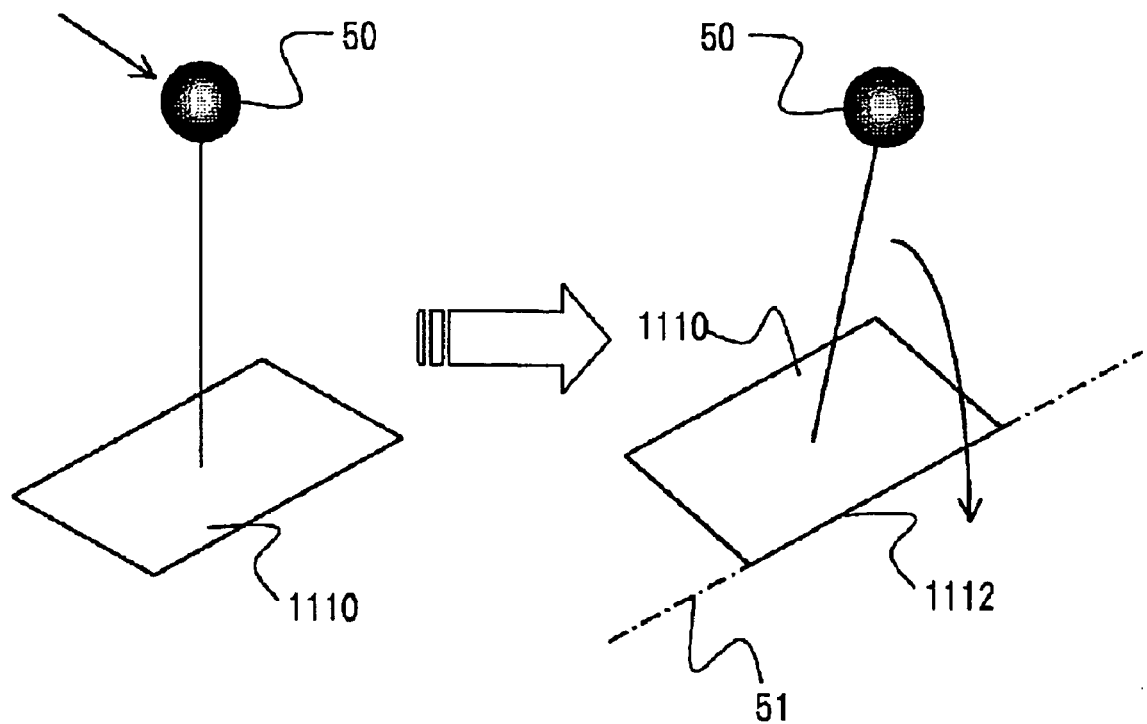
FIG. 47 is a diagram for explaining a behavior of the foot of the legged mobile robot according to the eleventh structure when the robot falls over.

FIG. 47 is a diagram for explaining the behavior of the foot according to the eleventh structure when the robot falls over. A state in which the robot is standing on one foot (right foot in this case) on the road surface is shown on the left in FIG. 47, where reference numeral 50 denotes the gravity center of the robot. In addition, a state in which the balance of the robot is shifted to the right by, for example, receiving an external force in the horizontal direction (from the left) and the robot is starting to fall over is shown in on the right in FIG. 47.

As shown on the right in FIG. 47, the robot starts to fall over by rotating around a line 51 including the outer side edge 1112 of the main foot body 1110, the line 51 serving as a reference of the falling motion (rotational center). Since the entire region of the outer side edge 1112 is in line contact with the road surface, the possibility that the robot will rotate around the yaw axis is extremely low. The above discussion also applies to the cases where the robot falls over around the inner side edge 1113, the front side edge 1114, and the rear side edge 1115.

In the foot according to the eleventh structure, all of the side surfaces 1112 to 1115 of the main foot body 1110 are flat, and no outward projections are provided thereon. Accordingly, when the robot falls over, it rotates around one of the side edges 1112 to 1115. Therefore, the attitude and behavior of the robot in the falling motion can be easily predicted.

A twelfth example of the foot 150 will be described below with reference to FIGS. 48 and 49.

Figure 48:
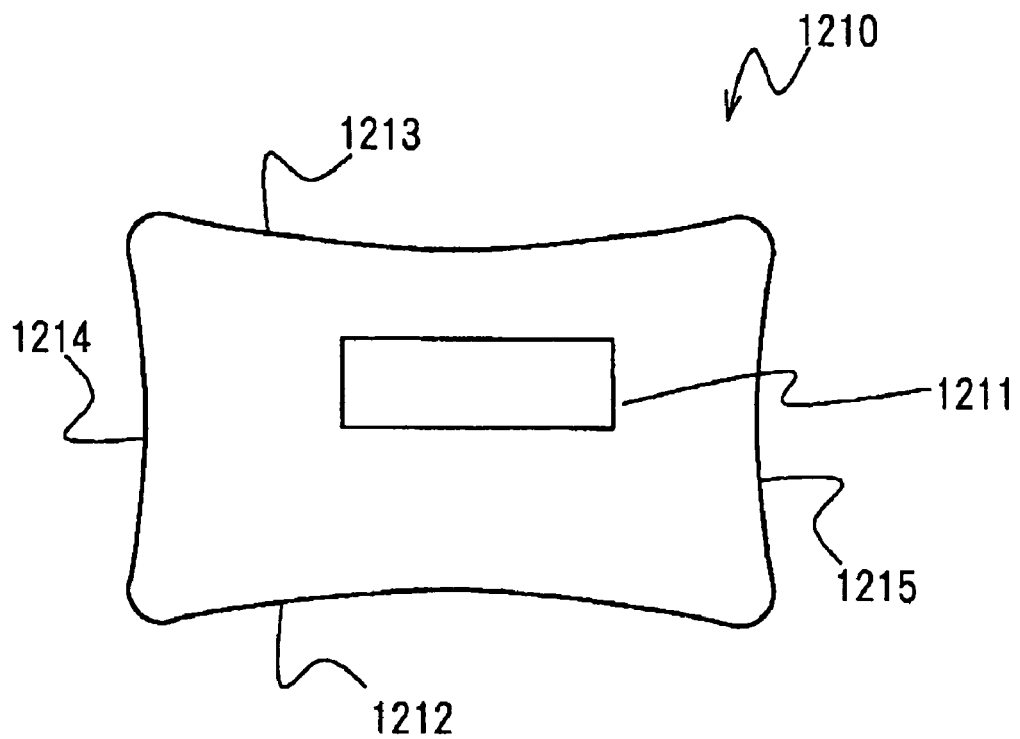
FIG. 48 is a plan view showing a foot of the legged mobile robot according to a twelfth structure.

FIG. 48 is a plan view showing the schematic construction of the foot according to a twelfth structure. Although FIG. 48 shows only one of the feet attached to the left and right legs, the construction of the other one of the feet is plane-symmetric to that of the foot shown in the figure.

The foot according to the twelfth structure includes a main foot body 1210 which is constructed of a rectangular plate-shaped member and which is connected to the ankle 114 of the corresponding lower limb 110. The main foot body 1210 is preferably composed of a material similar to that used in the foot according to the eleventh structure.

A connector 1211 for providing connection to the ankle 114 is formed integrally with the main foot body 1210 on the top surface of the main foot body 1210. In addition, the bottom surface (foot bottom surface) of the main foot body 1210 serves as the ground-contact surface. In this example, the foot bottom surface is flat.

The external shape of the foot bottom surface is shown in the figure. In addition, although not particularly limited, similar to the foot of the above-described eleventh structure, a plurality of non-slip grooves or a plantar-arch portion having a concave shape may be formed in the foot bottom surface.

In the figure, reference numeral 1212 denotes a side edge (outer side edge) or a side surface (outer side surface) which is remote from the other foot, reference numeral 1213 denotes a side edge (inner side edge) or a side surface (inner side surface) which is adjacent to the other foot, reference numeral 1214 denotes a side edge (front side edge) or a side surface (front side surface) at the front of the robot, and reference numeral 1215 denotes a side edge (rear side edge) or a side surface (rear side surface) at the rear of the robot.

As shown in the figure, all of the side surfaces 1212 to 1215 of the main foot body 1210 are curved inward, and all of the side edges 1212 to 1215 are also curved inward accordingly. In the case in which the grooves or the plantar-arch portion which extends to the side edges 1212 to 1215 are formed in the foot bottom surface, the side edges 1212 to 1215 include a curved line or a discontinuous line obtained by combining the shape of the grooves or the plantar-arch portion and the shape of the corresponding side surface. However, it is only necessary that the shapes of the side edges 1212 to 1215 are inwardly curved lines when the side edges 1212 to 1215 are projected onto a plane including the foot bottom surface of the foot.

Similar to the above-described first structure, the adjacent sides 1212 to 1215 of the main foot body 1210 are connected to each other with smooth curved surfaces, and the sides 1212 to 1215 and the foot bottom surface are also connected to each other with smooth curved surfaces.

Figure 49:
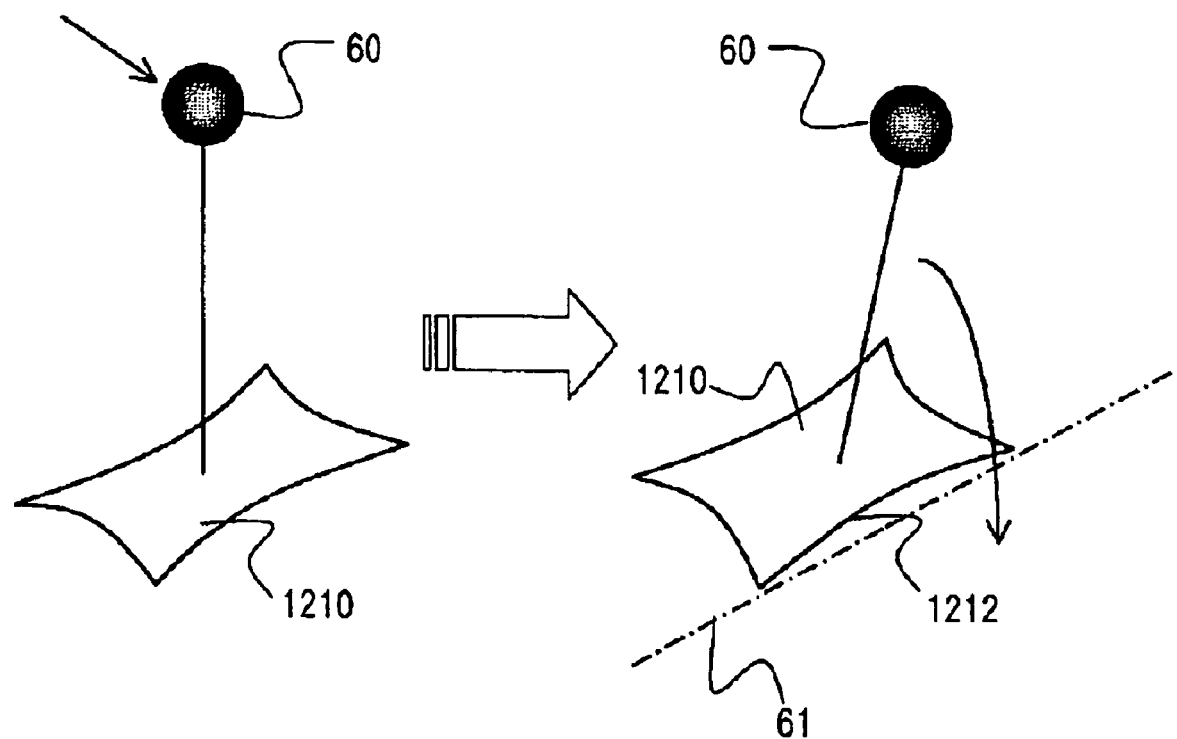
FIG. 49 is a diagram for explaining a behavior of the foot of the legged mobile robot according to the twelfth structure when the robot falls over.

FIG. 49 is a diagram for explaining the behavior of the foot according to the twelfth structure when the robot falls over. A state in which the robot is standing on one foot (right foot in this case) on the road surface is shown on the left in FIG. 49, where reference numeral 60 denotes the gravity center of the robot. In addition, a state in which the balance of the robot is shifted to the right by, for example, receiving an external force in the horizontal direction (from the left) and the robot is starting to fall over is shown in on the right in FIG. 49.

As shown on the right in FIG. 49, the robot starts to fall over by rotating around a line 61 which connects two points which project most on the outer side edge 1212 of the main foot body 1210 at the front and rear of the outer side edge 1212, the line 61 serving as a reference of the falling motion (rotational center). Since the two points on the outer side edge 1212 are in contact with the road surface, the possibility that the robot will rotate around the yaw axis is extremely low. The above discussion also applies to the cases where the robot falls over around the inner side edge 1213, the front side edge 1214, and the rear side edge 1215.

In the foot according to the twelfth structure, all of the side surfaces 1212 to 1215 of the main foot body 1210 are curved inward. Accordingly, when the robot falls over, it rotates around the line which connect two points which project most on one of the outer side edges 1212 to 1215 at the ends of the corresponding side edge. Therefore, the attitude and behavior of the robot in the falling motion can be easily predicted.

Although all of the side surfaces 1212 to 1215 are curved inward in this example, the construction may also be such that only one or more of them is curved inward.

Figure 50:
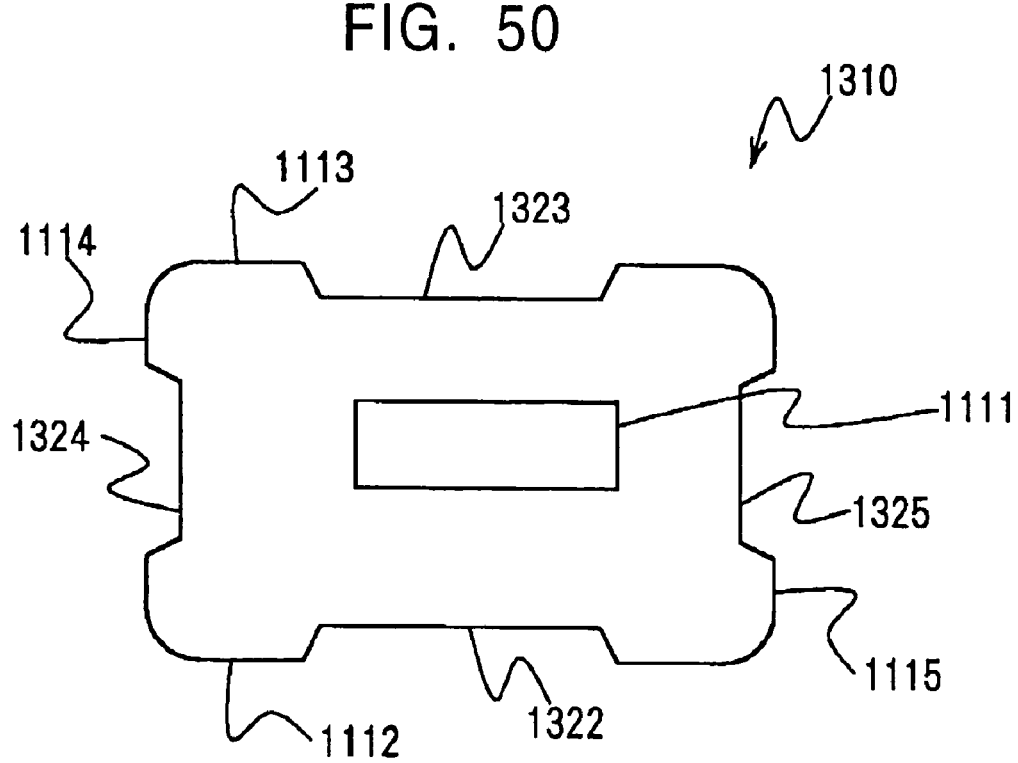
FIG. 50 is a plan view showing a foot of the legged mobile robot according to a thirteenth structure.

A thirteenth example of the foot 150 will be described below with reference to FIG. 50.

The foot according to a thirteenth structure is obtained by slightly modifying the foot according to the above-described eleventh structure. FIG. 50 is a plan view showing the schematic construction of the foot according to the thirteenth structure. Components similar to those of the above-described first structure are denoted by the same reference numerals, and explanations thereof are thus omitted.

A foot 1310 is different from that described above in that notches 1322 to 1325 are formed in the side surfaces 1112 to 1115, respectively, at central positions of the side surfaces 1112 to 1115. The notches 1322 to 1325 extend from the top surface of the foot 1310 to the bottom surface (foot bottom surface) thereof. Other constructions are similar to those of the above-described structure. When the robot falls over, it rotates around one of the side edges 1112 to 1115 while the corresponding one of the side edges 1112 to 1115 is in contact with the road surface (at regions excluding the notches 1322 to 1325).

The reason why the notches 1322 to 1325 are provided is because if there are small bumps or obstacles on the road surface when the robot falls over, the possibility that the side edge which is in contact with the road surface will be placed on the bumps or obstacles can be reduced by forming the notches 1322 to 1325. Accordingly, reduction in predictability of the attitude and behavior of the robot in the falling motion can be prevented.

The shape of the notches 1322 to 1325 is not limited to that shown in the figure, and may also be an arc shape or other shapes. In addition, it is not necessary that all of the side surfaces 1112 to 1115 be provided with the notches 1322 to 1325, and the construction may also be such that only one or more of them is provided with a notch.

Figure 51:
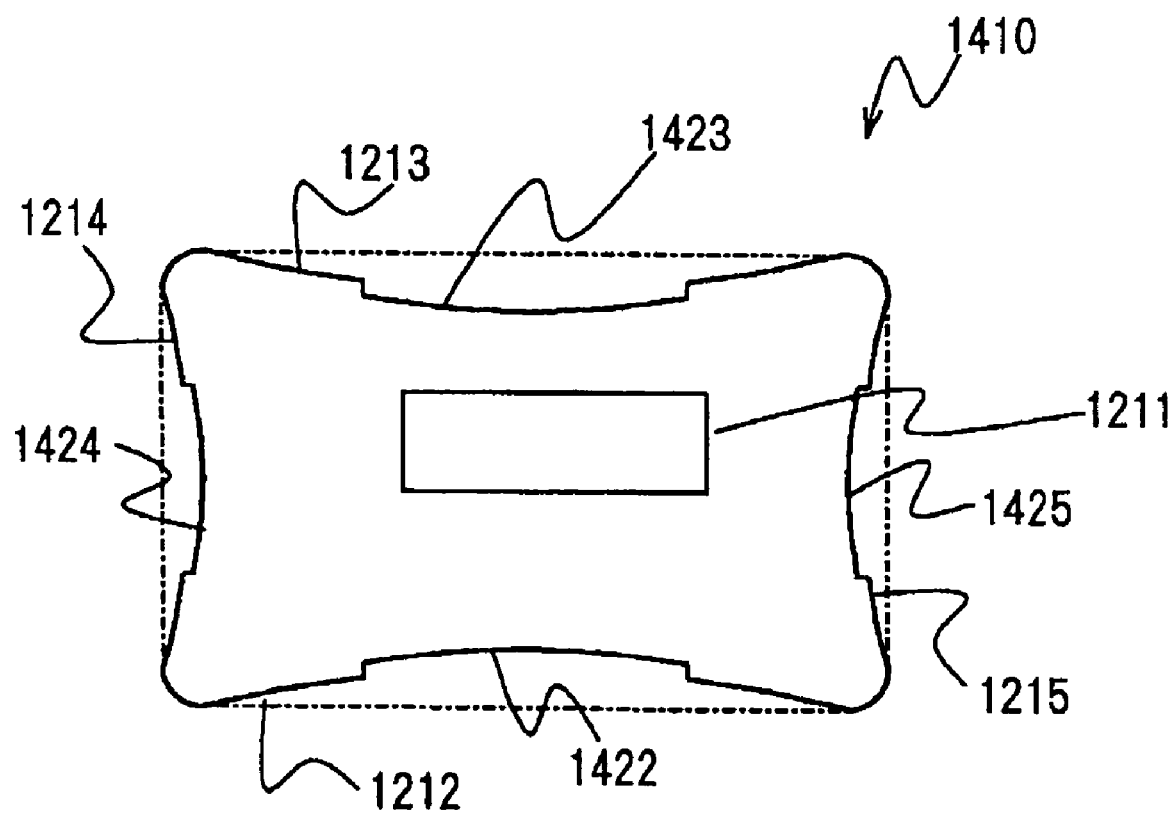
FIG. 51 is a plan view showing a foot of the legged mobile robot according to a fourteenth structure.
Figure 52:
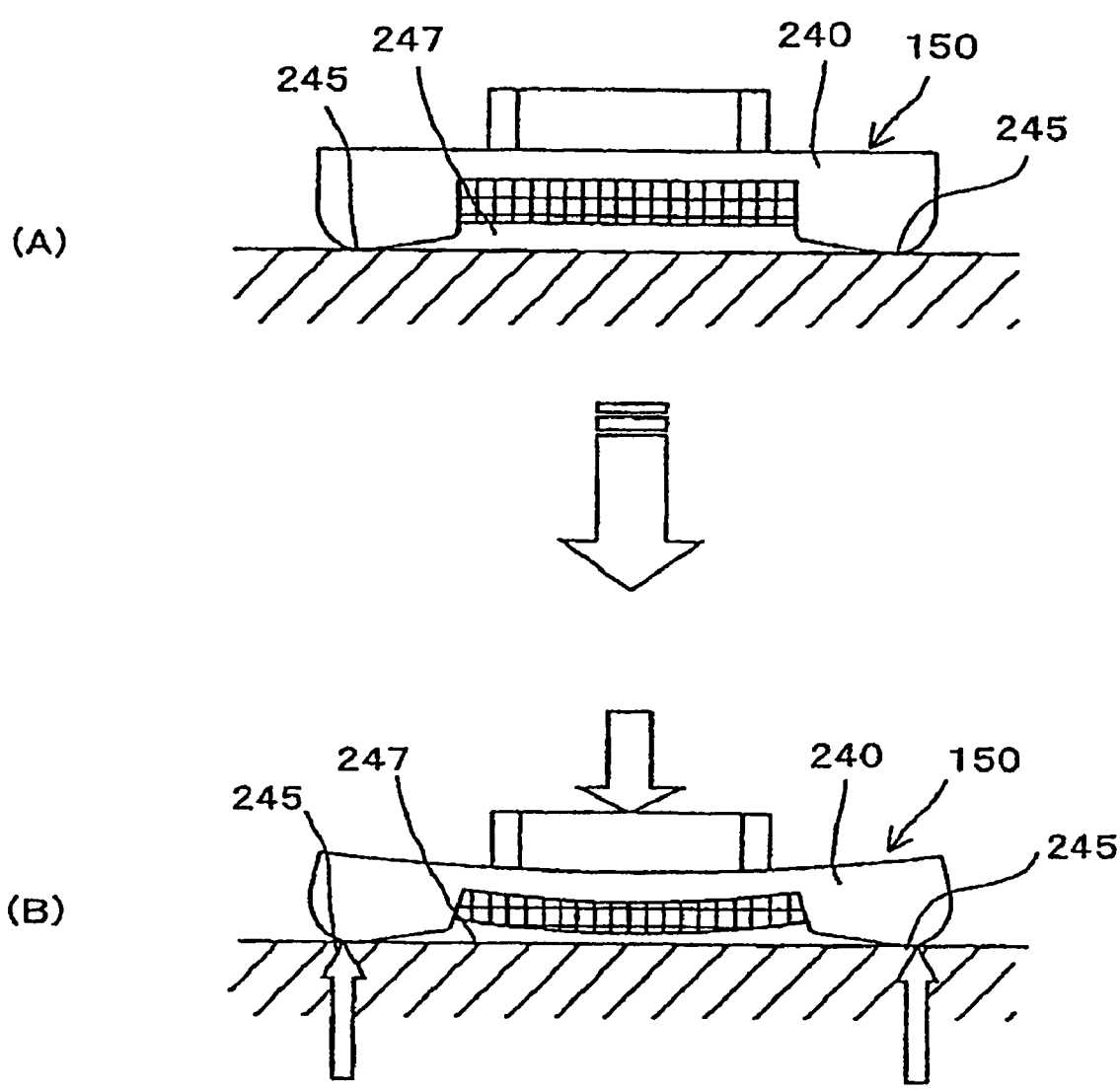
FIG. 52 is a diagram showing the state in which the foot of the legged mobile robot deforms due to the weight.

A fourteenth example of the foot 150 will be described below with reference to FIG. 51.

The foot according to a fourteenth structure is obtained by slightly modifying the foot according to the above-described twelfth structure. FIG. 51 is a plan view showing the schematic construction of the foot according to the fourteenth structure. Components similar to those of the above-described second structure are denoted by the same reference numerals, and explanations thereof are thus omitted.

A foot 1410 is different from that described above in that notches 1422 to 1425 are formed in the side surfaces 1212 to 1215, respectively, at central positions of the side surfaces 1212 to 1215. The notches 1422 to 1425 extend from the top surface of the foot 1410 to the bottom surface (foot bottom surface) thereof. Other constructions are similar to those of the above-described second structure. When the robot falls over, it rotates around an imaginary line (shown by a dotted chain line in the figure) which connects two points which project most on one of side edges 1212 to 1215 while the two points are in contact with the road surface.

The notches 1422 to 1425 are provided for a reason similar to that of the above-described foot according to the thirteenth structure. The shape of the notches 1422 to 1425 is not limited to that shown in the figure, and the notches 1422 to 1425 may also be formed similarly to the notches 1322 to 1325 shown in FIG. 50. In addition, it is not necessary that all of the side surfaces 1212 to 1215 be provided with the notches 1422 to 1425, and the construction may also be such that only one or more of them is provided with a notch.

Next, motion and characteristics of the foot (150a to 150c) of the legged mobile robot 100 according to the present invention will be described below with reference to FIGS. 52 to 61.

As shown in FIG. 52(A), in the foot 150 (150a to 150c) of the legged mobile robot 100 according to the present embodiment, a concavity, such as the plantar-arch portion 247, is formed in the bottom surface of the foot 150, so that the ground-contact portions are always positioned at the peripheral area of the foot 150. Accordingly, as shown in FIG. 52(B), even when the weight is applied to the foot 150 at the central position thereof and the foot-sole mechanism is deformed or when the position of the ZMP varies and deflection of the main foot body 160 occurs as the legged mobile robot walks, variation in the position and the shape of the ground-contact portions 245 is extremely small, and variation in the resistive force against the moment about the yaw axis can be reduced. More specifically, since the ground-contact portions are at the peripheral area of the foot 150 and reduction in the support moment can be reduced, unexpected change in the behavior of the robot, for example, spinning motion in which the robot rotates around the ground-contact portions, can be prevented. Accordingly, a legged mobile robot which has high attitude stability and which can continuously perform a stable motion can be obtained.

Figure 53:
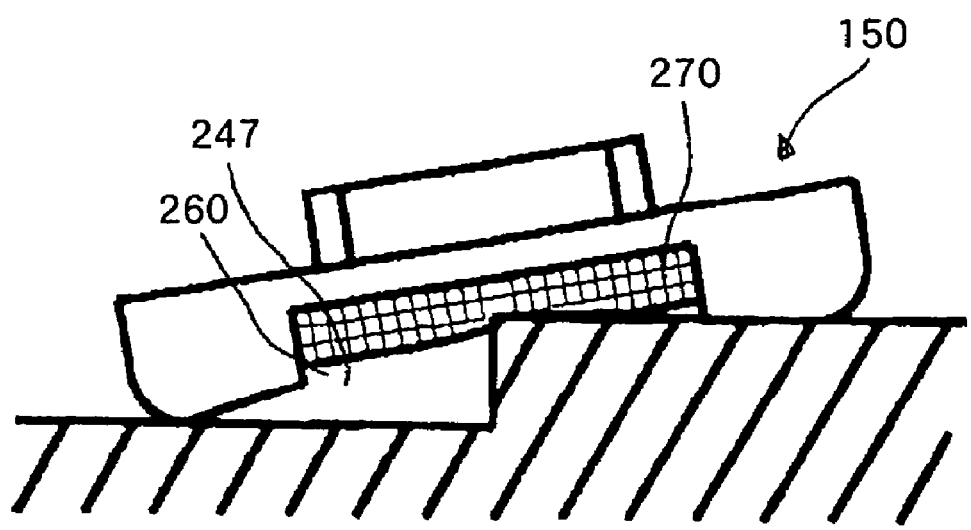
FIG. 53 is a diagram showing the state in which the foot of the legged mobile robot is placed on a step.

In addition, in the foot 150 of the legged mobile robot 100 according to the present embodiment, when, for example, the foot 150 is placed on a step, as shown in FIG. 53, the edge of the step can be received by the plantar-arch portion 247, in particular, the second concavity 260, so that the possibility that the foot-sole mechanism will be prevented from being directly affected can be increased. Accordingly, the walking performance of the legged mobile robot on the walking surfaces with bumps and depressions or steps can be improved and a legged mobile having robust characteristics can be obtained.

Figure 54:
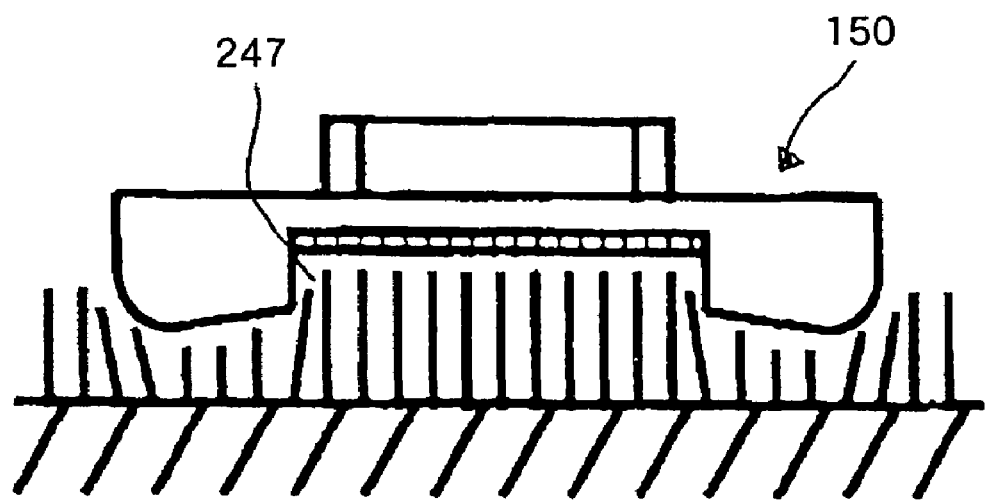
FIG. 54 is a diagram showing the state in which the foot of the legged mobile robot walks on a carpet.

The foot 150 is also effective when the robot walks on a soft surface, such as a carpet, as shown in FIG. 54.

In general, carpets are soft and slippery, and it is difficult for the legged mobile robot to walk on carpets since the moment around the yaw direction cannot be easily ensured and the support moment cannot be easily increased. In addition, there is a risk that the foot will be caught by the surface and the falling moment will be generated depending on the shape of the foot sole.

However, according to the foot 150 of the legged mobile robot 100 according to the present embodiment, since the peripheral portion of the foot sole has a smooth shape, the foot 150 can be prevented from being caught by fibers of the carpet. In addition, the fibers of the carpet are received by the concavity 180 such as the plantar-arch portion 247, so that suitable frictional force can be obtained and the moment around the yaw direction can be generated and adjusted. In addition, when the fibers of the carpet are long enough to reach the flexible portion, the friction generated between them serves as the support in the yaw direction. As a result, suitable braking force and impelling force can be obtained and the robot can walk stably.

Figure 55:
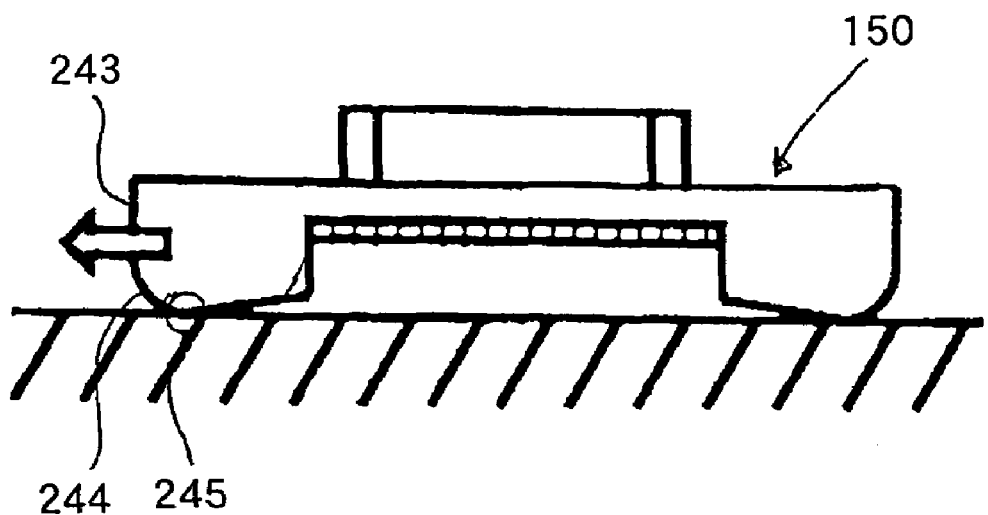
FIG. 55 is a diagram for explaining the motion of the foot of the legged mobile robot when the corners of the bottom surface of the foot are rounded.

In addition, in the foot 150, the side surfaces 243 of the main foot body 240 and the ground-contact portions 245 are connected to each other with smooth curved surfaces (R surfaces) 244. Accordingly, these portions can be prevented from being caught by the floor surface, that is, a risk that the frictional force will be increased excessively and the falling moment will be generated can be reduced, and the foot can be moved smoothly, as shown in FIG. 55.

In addition, the foot 150 includes the flexible portion 270 in the concavity such as the plantar-arch portion 247 of the main foot body 240. As described above with reference to FIG. 53, the flexible portion 270 deforms and receives a projection, such as a step, which enters the concavity. In addition, the flexible portion 270 exerts a frictional retaining force based on an adhesion force on the projection. More specifically, the flexible portion 270 adequately changes its shape so a to adapt itself to the state of the road surface.

Figure 56:
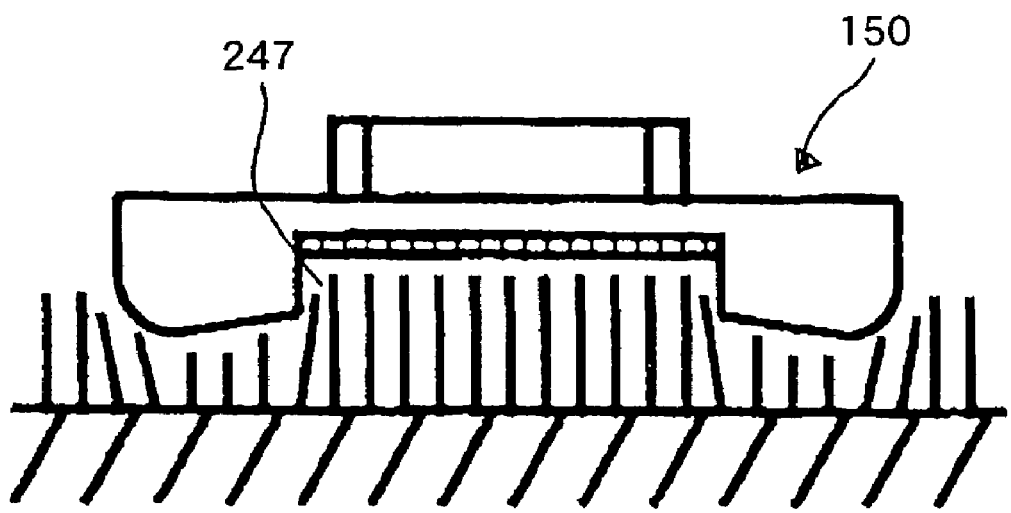
FIG. 56 is a diagram showing the state in which a concavity stepped on by the foot of the legged mobile robot reaches the bottom surface (ceiling surface) of a plantar-arch portion through a flexible portion of the foot.

For example, FIG. 56 shows a state in which the ceiling surface 261 of the second concavity 260 is in contact with a step. In this state, the flexible portion 270 adapt itself to the road surface and exerts a frictional force, so that the foot 150 can be prevented from slipping and sliding down the step.

Figure 57:
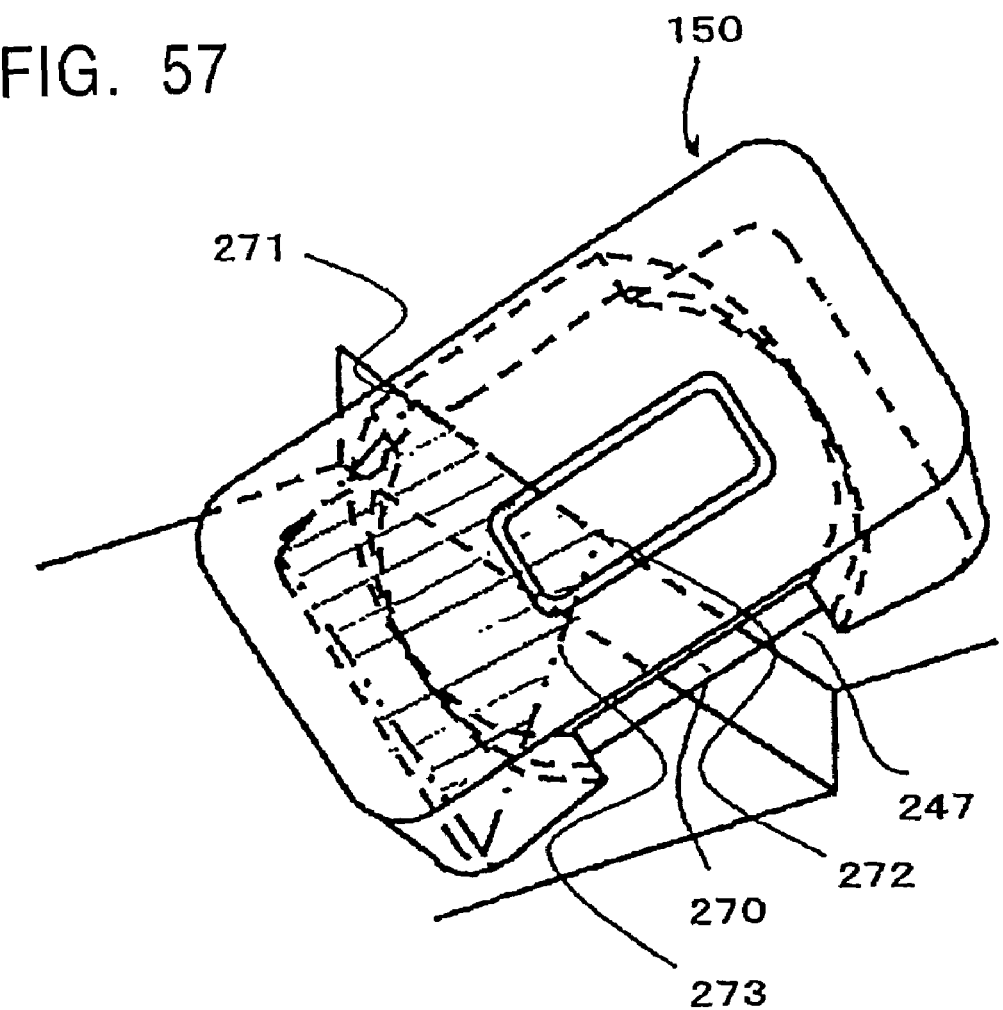
FIG. 57 is a diagram showing the state in which the foot of the legged mobile robot steps on a relatively large step.

In particular, the case is considered in which the step is relatively large compared to the foot 150, as shown in FIG. 57, and the robot must be supported by the plantar-arch portion 247. In this case, although the flexible portion 270 first comes into contact with the step at a position 271 on one side of the flexible portion 270, and then deforms such that the contact area extends to a position 272. Accordingly, a support polygon 273 has a trapezoidal shape, as shown in the figure. As a result, the control stability region increases, and the stability of control can be improved.

Figure 58:
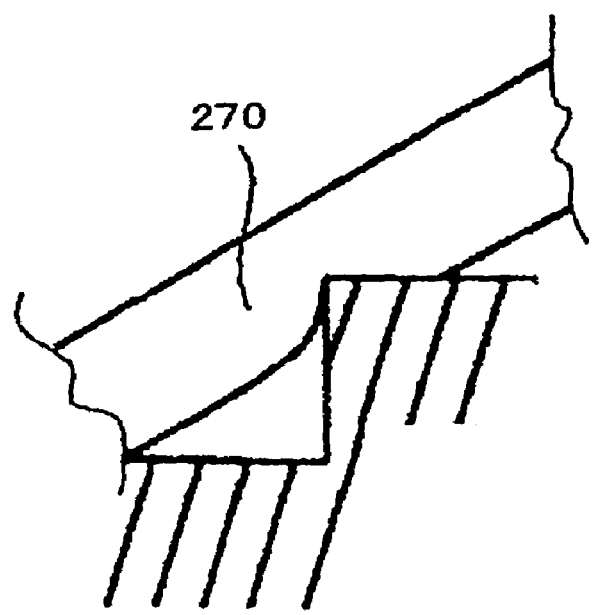
FIG. 58 is a diagram showing the manner in which the flexible portion of the foot of the legged mobile robot deforms when the flexible portion is formed of a normal elastic material.
Figure 59:
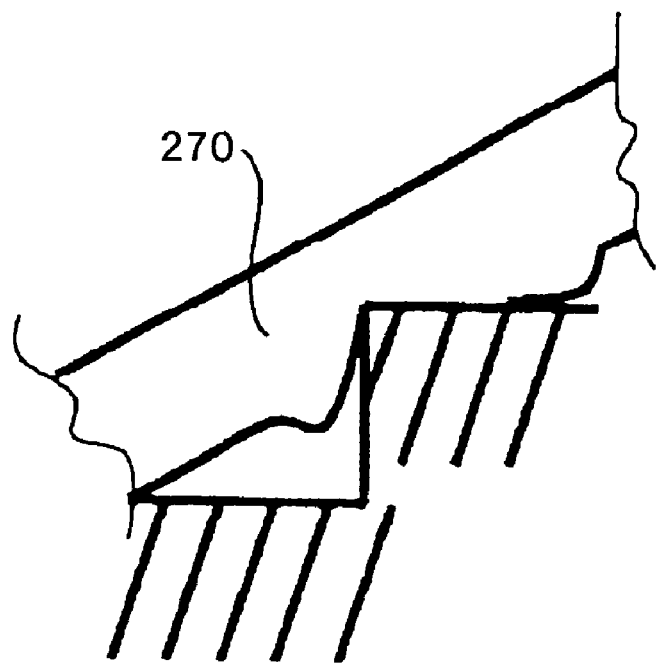
FIG. 59 is a diagram showing the manner in which the flexible portion of the foot of the legged mobile robot deforms when the flexible portion is formed of a material with a relatively high flexibility.

FIGS. 58 and 59 show modifications of the flexible portion 270 in the case in which a projection on the road surface reaches the flexible portion 270. FIG. 58 shows the manner in which a standard flexible portion 270 composed of a normal elastic material such as rubber deforms. In this case, there is a limit to the support moment which can be generated by the flexible portion 270. In contrast, when a material which is more flexible and which can maintain the deformed state for a certain time, that is, a material having hysteresis characteristics, is used, the support moment can be increased, as shown in FIG. 59. When the flexible portion 270 deforms in the manner shown in the figure, the legged mobile robot can be more safely supported even in places where there is a risk of sliding down, such as steps.

Figure 60:
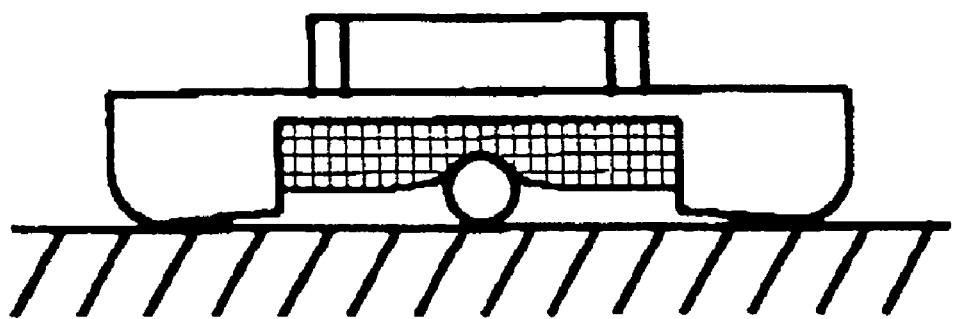
FIG. 60 is a diagram showing the state in which the foot of the legged mobile robot steps on an obstacle which can roll.
Figure 61:
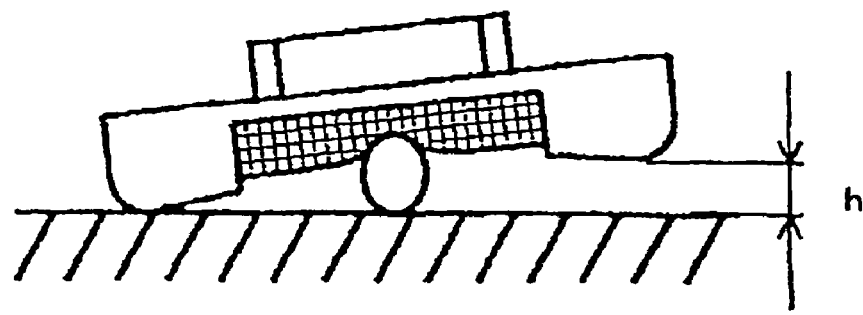
FIG. 61 is a diagram showing the state in which the foot of the legged mobile robot steps on a relatively large obstacle which can roll.

In addition, the foot 150 is also effective when the foot 150 steps on an obstacle which can roll, as shown in FIGS. 60 and 61. When a normal foot steps on such an obstacle, the foot totters and moves like a seesaw on the obstacle. Thus, the support moment cannot be generated and the behavior of the foot becomes nonlinear. Accordingly, stability of control is reduced.

In comparison, when the flexible portion 270 is provided, the flexible portion 270 is placed on the obstacle so as to enwrap it, as shown in FIG. 60, if the obstacle is small. Accordingly, the support point of the foot sole can be ensured. In addition, even when the obstacle is relatively large, a height h by which the foot sole is separated from the road surface is small. Thus, the factor of instability can be reduced.

In addition, since the obstacle is received by the flexible portion 270 and is flexibly adapted to the bottom surface of the main foot body 260, the obstacle functions as if it is a part of the foot, and the possibility that the extremely fast motion will occur or the robot cannot be controlled because of discontinuous, nonlinear motion thereof can be largely reduced.

In addition, in the foot 150, the widths of the grooves 246 decrease toward the side surfaces of the foot 150. In the case in which the robot moves on a slippery road surface, such as a carpet, if the side surfaces 262 of the grooves 246 are parallel to each other and the widths of the grooves 246 are constant, the fibers of the carpet smoothly move inside the plantar-arch portion 247 and do not exert a reaction force.

Figure 62:
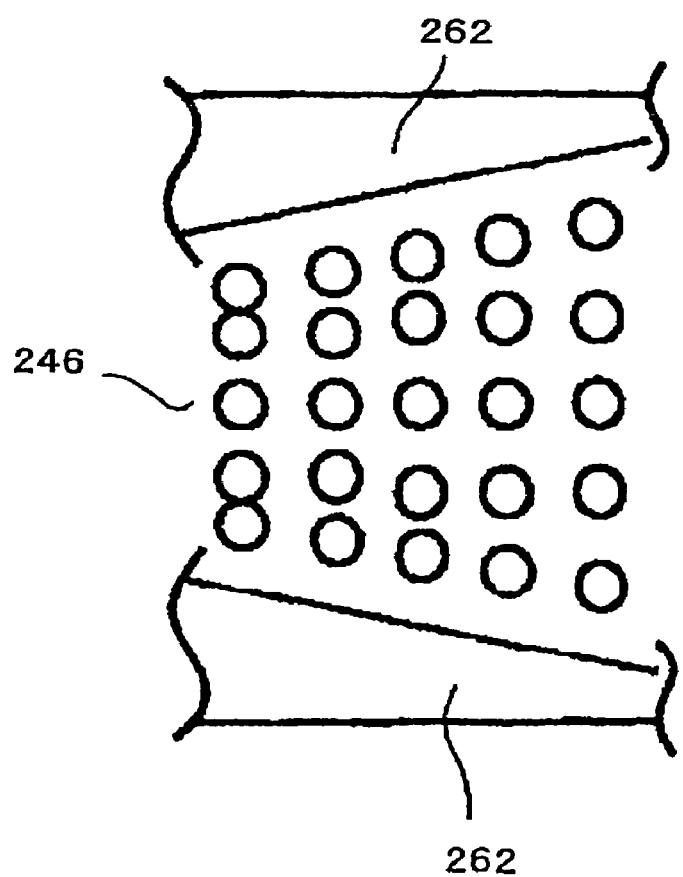
FIG. 62 is a diagram showing the state in which the foot of the legged mobile robot moves on a carpet.

In comparison, when the side surfaces 262 are not parallel, as shown in FIG. 62, the fibers are collected between the side surfaces 262 and exert a reaction force. This reaction force serves as a frictional retaining force, which is extremely effective when the robot is on the carpet where the frictional force cannot be easily ensured.

In addition, in the foot 150, four grooves 246 are formed at the front, rear, left, and right positions of the foot 150 such that the grooves 246 extend from the concavity at the central area to the outside. Accordingly, the motions, operations, and effects which are described above with reference to the figures can be obtained irrespective of the direction in which the foot is moved, the angle at which the foot is placed on the step, and the part of the foot which steps on an obstacle.

Accordingly, a stable legged mobile robot with small factor of instability which can be stably controlled can be provided.

Support Structure of Instep and Foot Sole

Figure 63:
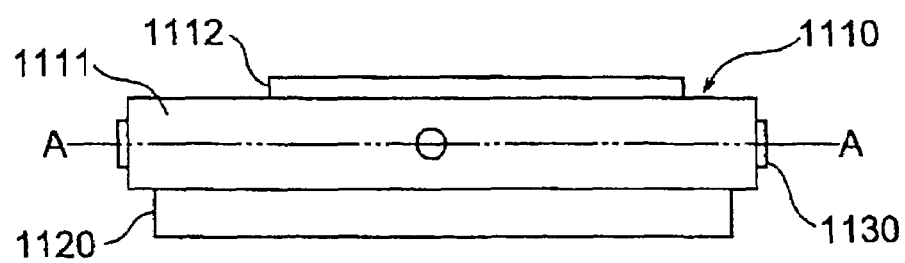
FIG. 63 is a side view showing a support structure of an instep (upper portion of a foot) and a foot bottom (sole of the foot) according to a first example.
Figure 64:
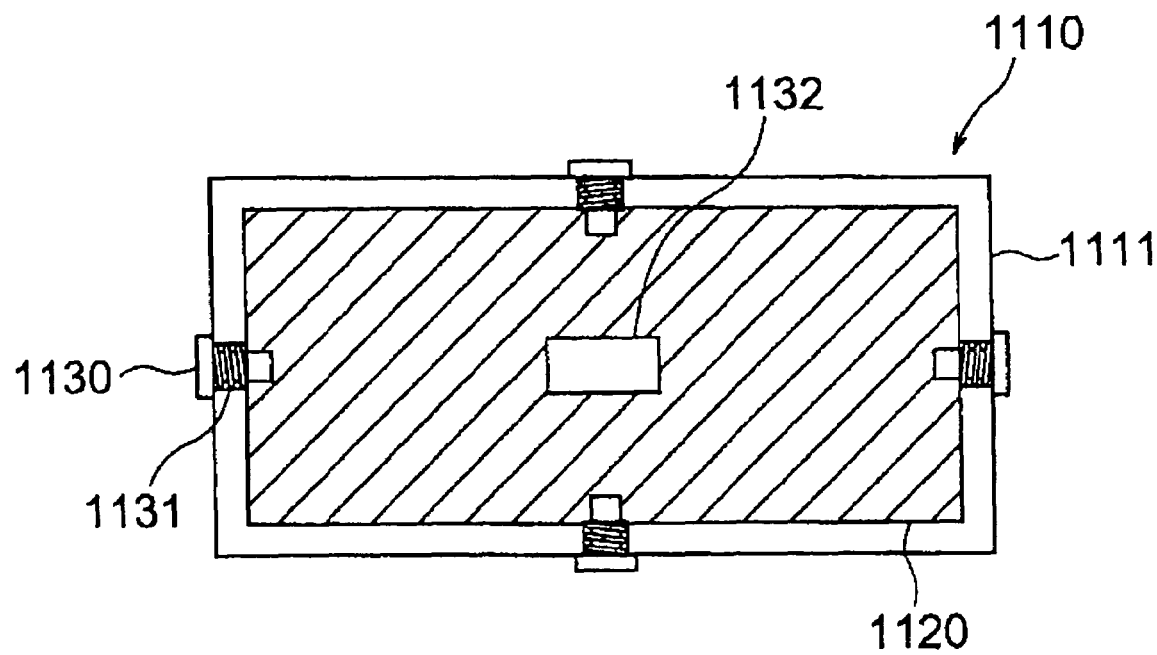
FIG. 64 is a sectional view of FIG. 63 cut along lint A—A.

A first example of a support structure of an instep (upper portion of a foot) and a foot bottom (sole of the foot) will be described below with reference to FIGS. 63 and 64. FIG. 63 is a side view of the foot and FIG. 64 is a sectional view of FIG. 63 cut along line A—A.

The foot according to the first structure includes an instep 1110 which is connected to the ankle 114 of the corresponding lower limb 110 and a foot sole 1120 which directly comes into contact with the road surface, and has a two-part structure in which the foot sole 1120 is movably attached to the instep 1110. The instep 1110 and the foot sole 1120 are preferably composed of a light, strong material such as an aluminum alloy and a magnesium alloy.

The instep 1110 includes a rectangular outer frame 1111, a top plate which covers the top side of the outer frame 1111, and a connector 1112 which is disposed on the top plate. The connector 1112 is used for providing connection to the ankle 114. Four side surfaces of the outer frame 1111 are provided with through holes for receiving fixing pins at the central positions of the side surfaces. The holes for receiving the fixing pins are long holes which extend in the horizontal direction (X-axis direction and Y-axis direction).

The foot sole 1120 is constructed of a rectangular plate-shaped member, and the shape of the side surfaces of the foot sole 1120 is slightly smaller than the shape of the inner surfaces of the outer frame 1111 of the instep 1110. The four side surfaces of the foot sole 1120 are provided with holes for receiving the fixing pins at positions corresponding to the holes for receiving the fixing pins formed in the outer frame 1111 of the instep 1110.

The foot sole 1120 is attached to the instep 1110 by inserting the fixing pins 1130 into the holes formed in the outer frame 1111 from outside while the foot sole 1120 is inserted into the outer frame 1111 of the instep 1110 from below, fitting coil springs 1131 to end portions of the fixing pins 1130, and press-fitting the end portions of the fixing pins 1130 into their respective holes formed in the foot sole 1120.

In this state, the top surface of the foot sole 1120 faces the bottom surface of the top plate of the instep 1110, and the side surfaces of the foot sole 1120 face their respective inner surfaces of the outer frame 1111 of the instep 1110 with predetermined gaps (allowance) therebetween. The coil springs 1131 through which the fixing pins 1130 are inserted are disposed between the side surfaces of the foot sole 1120 and the inner surfaces of the outer frame 1111 of the instep 1110 in a compressed state. Accordingly, the foot sole 1120 can move in two-axis directions (X-axis direction and Y-axis direction) along the bottom surface of the top plate of the instep 1110 (in the X-Y plane) within a range corresponding to the gaps (or an area corresponding to the length of the holes in the side surfaces of the instep 1110).

Forces applied to the foot sole 1120 by the coil springs 1131 are set such that the foot sole 1120 is placed at the central position (neutral position) inside the outer frame 1111 of the instep 1110 when no external force is applied to the foot sole 1120.

Although not shown in the figure, a plurality of force sensors for detecting pressures in the Z-axis direction are provided on the bottom surface of the foot sole 1120. These force sensors are used for calculating the ZMP, and, in the present example, four force sensors are disposed at four corners on the bottom surface of the foot sole 1120.

Each of these force sensors includes a metal diaphragm and four strain gauges, and is constructed by forming a bridge circuit with the four strain gauges and laminating the stain gauges on the metal diaphragm. However, the force sensors are not limited to this, and those having other constructions may also be used. In addition, the number of force sensors for detecting the ZMP and the arrangement thereof are also not limited to the above descriptions.

In addition, an acceleration sensor 1132 for detecting accelerations in the X-axis direction and the Y-axis direction are mounted on the foot sole 1120. The position at which the acceleration sensor 1132 is disposed is not particularly limited. In the present embodiment, the acceleration sensor 1132 is disposed at the central position of the foot sole 1120, as shown in FIG. 64. The output from the acceleration sensor is used for detecting the inclination of the road surface with respect to the direction of gravity or the stumbling motion caused by, for example, bumps and depressions on the road surface.

In the above-described construction, the end portions of the fixing pins 1130 are press-fitted into the holes formed in the foot sole 1120 in order to attach the foot sole 1120 to the instep 1110 in a movable manner. Alternatively, however, the end portions of the fixing pins 1130 may also be screwed into the holes formed in the foot sole 1120 by forming male threads in the end portions of the fixing pins 1130 and female threads in the holes in the foot sole 1120. In addition, the construction may also be such that the fixing pins 1130 are fixed to the instep 1110 by press-fitting or by means of screws and the holes for receiving the fixing pins in the foot sole 1120 are formed as long holes which extend in the horizontal direction (X-axis direction and Y-axis direction), so that the end portions of the fixing pins 1130 can slide in the holes in the X and Y directions. However, the construction for movably attaching the foot sole 1120 to the instep 1110 is not limited to this, and various other constructions may also be used.

In addition, although the coil springs 1130 are used as buffer means in the present example, the buffer means is not limited to this, and other elastic members such as a leaf spring, other types of springs, or rubber may also be used.

Since the foot sole 1120 is movably attached to the instep 1110, a time delay is generated between the motion of the foot sole 1120 and that of the instep 1110 when the robot walks. In addition, since the coil springs 1131 are placed between the foot sole 1120 and the instep 1110 as the buffer means, when the idling leg is placed on the road surface, the reaction force from the road surface is slowly applied to the lower limb 100. Accordingly, the impact on the joints of the lower limb 110 can be reduced and load on the actuators can also be reduced. In addition, the attitude stability of the robot with respect to fast operations of the actuators which occurs when the robot is moved fast can be improved. In addition, even when there are mechanical errors (displacements) in the driving system or when control errors occur, they may be absorbed within the movable range of the foot sole 1120 and their influence can be reduced.

In addition, since there is a time lag between the detection of the stumbling motion of the robot based on the output from the acceleration sensor 1132 provided on the foot sole 1120 and the time when the foot sole 1120 reaches the end of its movable range with respect to the instep 1110 and the impact is completely transmitted to the instep 1110, motion to avoid falling over can be performed during this time. Accordingly, the controllability of the robot's attitude and the attitude stability can be improved.

Since elastic means (coil springs 1130) is used as the buffer means between the instep 1110 and the foot sole 1120, there is a risk in that the foot sole 1120 will continuously vibrate with respect to the instep 1110 for a long time and the vibration will adversely affect the controllability of the walking motion. In such a case, viscous means (for example, a damper) is preferably provided along with the elastic means in order to improve the damping characteristics. In this case, the elasticity coefficient of the elastic member and the viscosity coefficient of the viscous member are preferably set such that the vibration of the foot sole 1120 which occurs when the foot sole 1120 leaves the road surface in the walking motion of the leg is reduced to a predetermined extent before the foot sole 1120 is placed on the road surface again. Since the vibration of the foot sole 1120 is reduced to a predetermined extent at the time when the idling leg is placed on the ground, it is not necessary for the robot's control system to re-perform the trajectory calculation and other calculations for control. Accordingly, the controllability can be improved. The above-described predetermined extent refers to a minimum necessary vibration which can be tolerated while the control system of the robot achieves stable walking motion.

Figure 65:
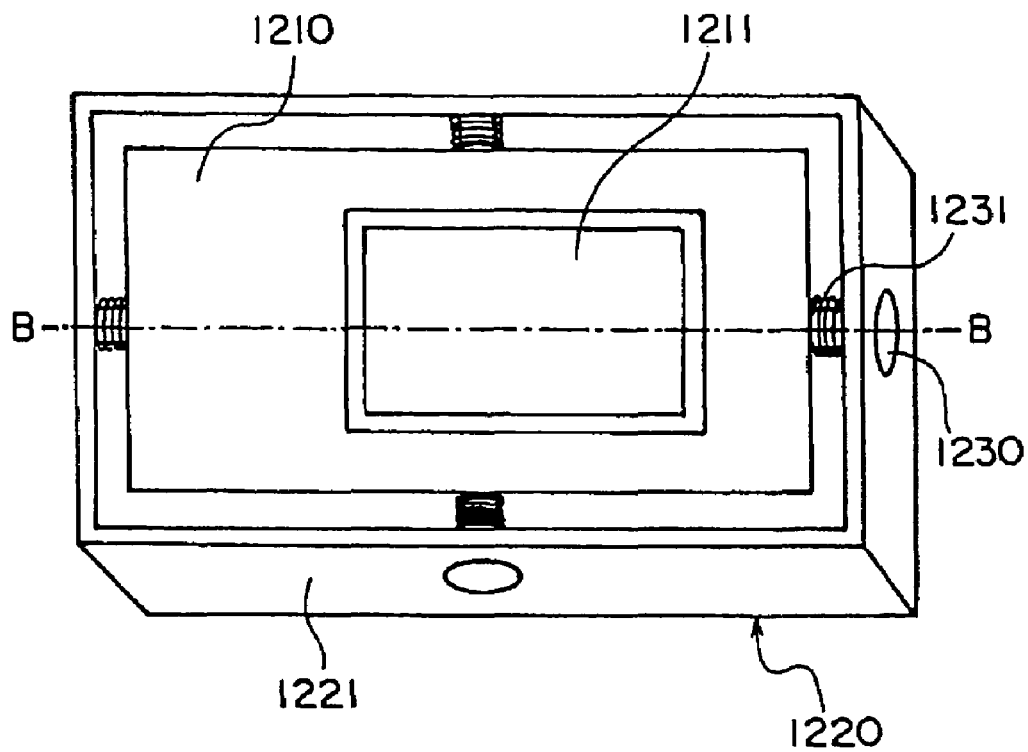
FIG. 65 is a perspective view showing a support structure of an instep (upper portion of a foot) and a foot bottom (sole of the foot) according to a second example.
Figure 66:
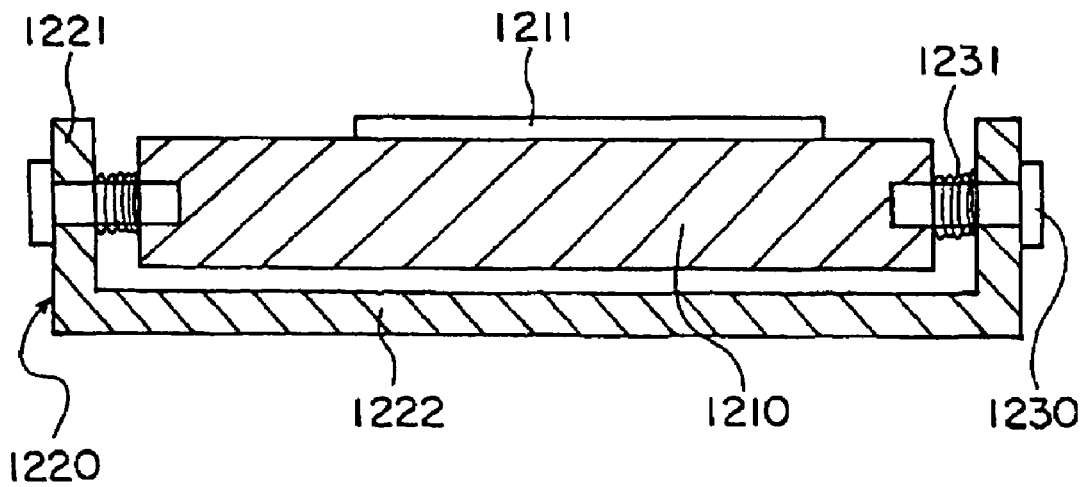
FIG. 66 is a sectional view of FIG. 65 cut along lint B—B.

A second example of a support structure of an instep (upper portion of a foot) and a foot bottom (sole of the foot) will be described below with reference to FIGS. 65 and 66. FIG. 65 is a side view of the foot and FIG. 66 is a sectional view of FIG. 4 cut along line B—B.

The foot of this example includes an instep 1210 which is connected to the ankle 114 of the corresponding lower limb 110 and a foot sole 1220 which directly comes into contact with the road surface, and has a two-part structure in which the foot sole 1220 is movably attached to the instep 1210. The instep 1210 and the foot sole 1220 are preferably composed of a light, strong material such as an aluminum alloy and a magnesium alloy.

The instep 1210 is constructed of a rectangular plate-shaped member, and four side surfaces of the instep 1210 are provided with holes for receiving fixing pins. In addition, a connector 1211 for providing connection to the ankle 114 is formed integrally with the instep 1210 on the top surface of the instep 1210.

The foot sole 1220 includes a rectangular outer frame 1221 and a bottom plate 1222 which covers the bottom side of the outer frame 1221. The shape of the inner surfaces of the outer frame 1221 of the foot sole 1220 is slightly larger than the shape of the side surfaces of the instep 1210. The four side surfaces of the outer frame 1221 of the foot sole 1220 are provided with through holes for receiving the fixing pins at positions corresponding to the holes for receiving the fixing pins formed in the side surfaces of the instep 1210. The holes for receiving the fixing pins formed in the side surfaces of the foot sole 1220 are long holes which extend in the horizontal direction (X-axis direction and Y-axis direction).

The foot sole 1220 is attached to the instep 1210 by inserting the fixing pins 1230 into the holes formed in the outer frame 1211 from outside while the instep 1210 is inserted into the outer frame 1211 from above, fitting coil springs 1231 to end portions of the fixing pins 1230, and press-fitting the end portions of the fixing pins 1230 into their respective holes formed in the instep 1210.

In this state, the top surface of the bottom plate 1222 of the foot sole 1220 faces the bottom surface of the instep 1210, and the inner surfaces of the outer frame 1221 of the foot sole 1220 face their respective side surfaces of the instep 1210 with predetermined gaps (allowances) therebetween. The coil springs 1231 through which the fixing pins 1230 are inserted are disposed between the inner surfaces of the outer frame 1221 of the foot sole 1220 and the side surfaces of the instep 1210 in a compressed state. Accordingly, the foot sole 1220 can move in two-axis directions (X-axis direction and Y-axis direction) along the bottom surface of the instep 1210 (in the X-Y plane) within a range corresponding to the gaps (or an area corresponding to the length of the holes in the side surfaces of the foot sole 1220).

Pressures applied to the foot sole 1220 by the coil springs 1231 are set such that the instep 1210 is placed at the central position (neutral position) inside the outer frame 1221 of the foot sole 1220 when no external force is applied to the foot sole 1220.

Similar to the above-described first structure, force sensors for calculating the ZMP and an acceleration sensor for detecting accelerations in the X-axis direction and the Y-axis direction are mounted on the foot sole 1220. In addition, also in this example, the buffer means is preferably constructed by combining elastic means and viscous means.

Advantages obtained by the above-described first structure can also be obtained by this structure. In addition, since the outer frame 1221 of the foot sole 1220 is constructed so as to cover the side surfaces of the instep 1210, the impact which occurs when one of the side surfaces of the foot strikes an obstacle can be reduced.

Figure 67:
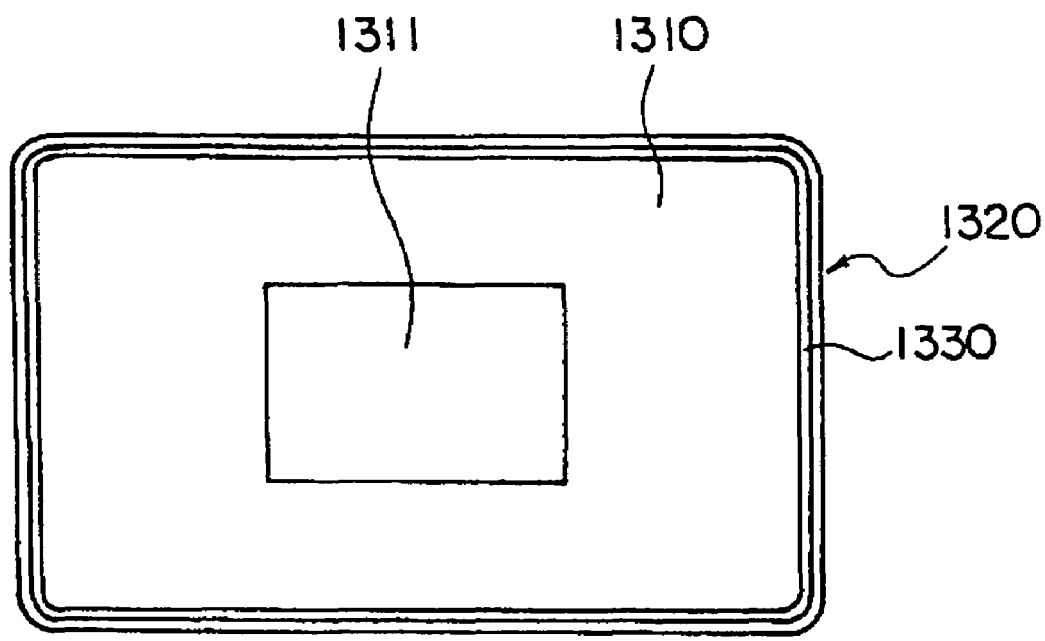
FIG. 67 is a plan view showing a support structure of an instep (upper portion of a foot) and a foot bottom (sole of the foot) according to a third example.
Figure 68:
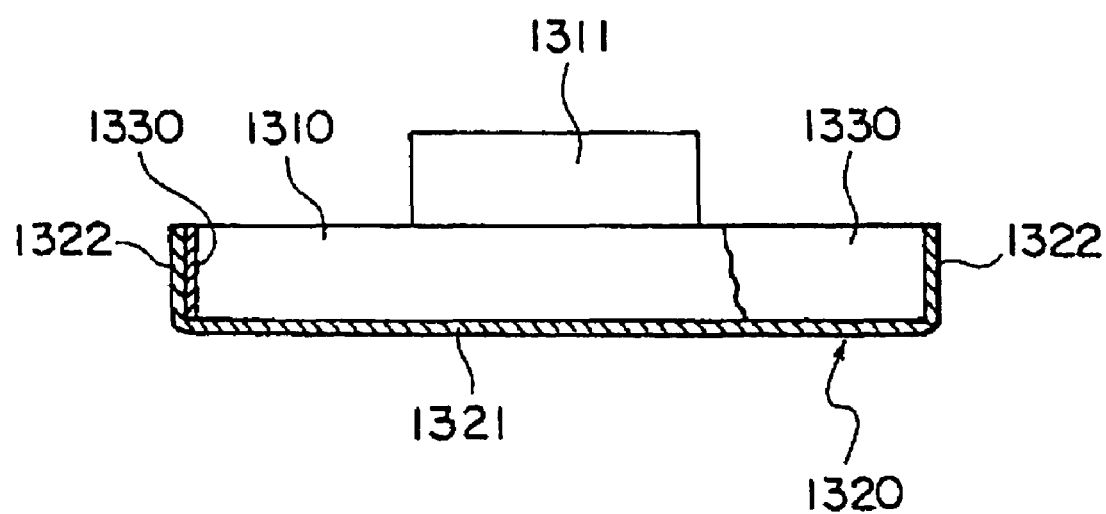
FIG. 68 is a partially broken side view showing a support structure of an instep (upper portion of a foot) and a foot bottom (sole of the foot) according to a third example.

A third example of a support structure of an instep (upper portion of a foot) and a foot bottom (sole of the foot) will be described below with reference to FIGS. 67 and 68. FIG. 67 is a plan view of the foot and FIG. 68 is a partially broken side view of the foot.

The foot according to the third structure includes an instep 1310 which is connected to the ankle 114 of the corresponding lower limb 110 and a foot sole 1320 which directly comes into contact with the road surface, and has a two-part structure in which the foot sole 1320 is movably attached to the instep 1310.

The instep 1310 is constructed of a rectangular plate-shaped member and a connector 1311 for providing connection to the ankle 114 is formed integrally with the instep 1310 on the top surface of the instep 1310. Although not shown in the figure, a plurality of force sensors for detecting pressures in the Z-axis direction which are used for calculating the ZMP are provided on the bottom surface of the instep 1310. More specifically, four force sensors are disposed at four corners of the bottom surface of the instep 1310.

Each of these force sensors includes a metal diaphragm and four strain gauges, and is constructed by forming a bridge circuit with the four strain gauges and laminating the stain gauges on the metal diaphragm. However, the force sensors are not limited to this, and those having other constructions may also be used.

The foot sole 1320 is a rectangular box-shaped member with an open top which includes a bottom plate 1321 and upright side plates 1322 which are formed integrally with the bottom plate 1321 along the peripheral sides of the bottom plate 1321. The top surface of the bottom plate 1321 is in contact with the bottom surface of the instep 1310. In addition, the bottom surface of the bottom plate 1321 serves as the foot bottom surface of the foot 150. The bottom surface of the bottom plate 1321 and outer surfaces of the side plates 1322 are connected to each other with R surfaces (arc surfaces) or smooth curved surfaces.

The internal shape of the side plates 1322 of the foot sole 1320 is similar to the shape of side surfaces of the instep 1310, but is slightly larger. The side surfaces of the instep 1310 face the inner surfaces of the side plates 1322 of the foot sole 1320 with small gaps (allowances) therebetween. Accordingly, the foot sole 1320 can move relative to the instep 1310 along the bottom surface of the instep 1310, that is, in an arbitrary direction in the X-Y plane.

The foot sole 1320 is attached to the instep 1310 with a retaining mechanism (not shown) in such a manner that the foot sole 1320 does not fall from the instep 1310 when the corresponding leg is off the road surface and the movement of the foot sole 1320 in the X-Y plane is not restricted. The retaining mechanism preferably has a mechanism for easily attaching/detaching the foot sole 1320 when the foot sole 1320 is to be replaced.

A buffer (buffer means) 1330 is disposed between the side plates 1322 of the foot sole 1320 and the side surfaces of the instep 1310. For example, an endless rubber sheet may be used as the buffer 1330, and be disposed such that gaps between the inner surfaces of the side plates 1322 of the foot sole 1320 and the side surfaces of the instep 1310 are completely filled with the rubber sheet. However, the buffer is not limited to this, and a leaf spring, a sponge, a solid or semi-solid viscous means may also be used.

In addition, the inner surfaces of the side plates 1322 of the foot sole 1320 and the side surfaces of the instep 1310 may be adhered to each other in the process of assembling the foot by filling the gaps between them with an adhesive which shows elasticity and/or viscosity in a cured or solid state. In such a case, foreign matter can be prevented from entering the gaps, and effects of the retaining mechanism for movably attaching the foot sole 1320 on the foot sole 1310 can be obtained without using one.

According to this structure, the foot sole 1320 can move in an arbitrary direction relative to the instep 1310 along the bottom surface of the instep 1310, and restriction on the moving direction is less compared to the above-described first and second structures.

The above-described buffer is preferably formed such that the gaps between the inner surfaces of the side plates 1322 of the foot sole 1320 and the side surfaces of the instep 1310 are completely filled since foreign matter can be prevented from entering the gaps in such a case. However, the present invention is not limited to this, and a plurality of buffers may be arranged with gaps therebetween. In addition, it is not necessary that the buffer be provided, and the buffer may also be omitted.

Connection/Replacement Structure of Leg and Foot at Ankle

Next, a connection structure of a leg and a foot and a replacement structure of the foot at an ankle of the legged mobile robot will be described below.

A first example of a connection structure of a leg and a and a replacement structure of the foot at an ankle of the legged mobile robot will be described below with reference to FIGS. 69 and 70.

FIG. 69 is a sectional view of a foot 150 and connecting parts between a lower limb (movable leg) 110 and the foot 150.

A leg-mounted connecting part 1001 which is provided on the ankle 114 of the lower limb 110 includes a connection/positioning projection 1002 and a connector 1003 for providing electrical connection. In addition, a notch 1004 is formed in a side surface of the connection/positioning projection 1002.

In addition, a connecting part 1102 which is provided on a main foot body 1101 of the foot 150 at the upper side of the main foot body 1101 includes a connection/positioning concavity 1102, a connector 1103 for providing electrical connection, a container 1104 for accommodating the connector 1103, and a connection actuator 1105.

A positioning pin 1106 is attached to an end of the connection actuator 1105 in such a manner that the positioning pin 1106 can move forward and backward (in the X-axis direction) along the bottom surface of the connection/positioning concavity 1102. When the positioning pin 1106 projects into the connection/positioning concavity 1102, it is fitted in the notch 1004 formed in the side surface of the connection/positioning projection 1002. In the state shown in FIG. 69, the positioning pin 1106 is retracted by the connection actuator 1105 so that the connection/positioning projection 1002 can be inserted into and removed from the connection/positioning concavity 1102.

Figure 70:
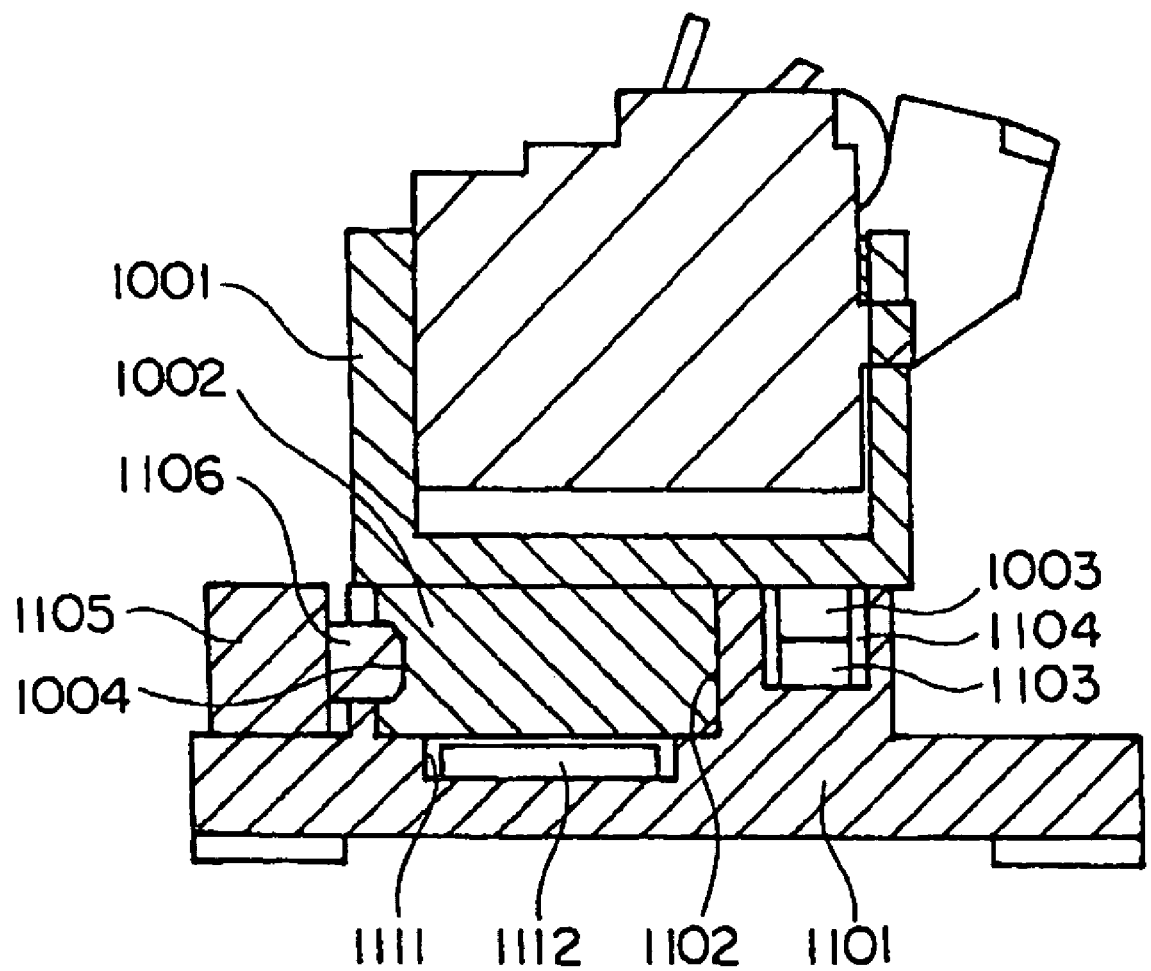
FIG. 70 is a sectional view showing the construction of the foot shown in FIG. 69 and a connecting part in the state in which the foot is connected to the ankle.

FIG. 70 is a sectional view of the connecting parts in the state in which the main foot body 1101 is attached to the leg-mounted connecting part 1001.

The main foot body 1101 is strongly connected to the leg-mounted connecting part 1001 by pushing out the positioning pin 1106 by the connection actuator 1105 and fitting an end portion of the connection/positioning projection 1002 into the notch 1004 while the connection/positioning projection 1002 is completely fitted in the connection/positioning concavity 1102.

At this time, the connector 1003 is inserted into the container 1104 and is mechanically engaged with the connector 1103 which is disposed at the bottom of the container 1104, and terminals of the connector 1003 and their respective terminals of the connector 1103 are electrically connected to each other. Accordingly, electric power can be supplied from the leg, that is, from the robot's main body, to the main foot body 1101 and control commands and other data signals can be communicated between them.

A concavity 1111 is formed in the bottom surface of the connection/positioning concavity 1102 of the main foot body 1101, and an electrical circuit substrate 1112 is disposed in the concavity 1111. The electrical circuit substrate 1112 includes the ROM 305 (see FIG. 3) which serves as memory means which stores various data and other related circuits, and the main control unit 300 of the robot's main body can access the ROM 305 via the connectors 1103 and 1003 and the bus 304. In addition, the electrical circuit substrate 1112 also includes signal processing circuits for various sensors provided on the main foot body 1101.

Although not shown in the figure, force sensors and an acceleration sensor are also provided on the main foot body 1101. More specifically, a plurality of force sensors for detecting pressures in the Z-axis direction are provided on the ground-contact portion on the bottom of the main foot body 1101. These force sensors are used for calculating the ZMP, and, in the present example, four force sensors are disposed at four corners of the bottom surface (foot bottom surface) of the main foot body 1101.

Each of these force sensors includes a metal diaphragm and four strain gauges, and is constructed by forming a bridge circuit with the four strain gauges and laminating the stain gauges on the metal diaphragm. However, the force sensors are not limited to this, and those having other constructions may also be used. In addition, the number of force sensors for detecting the ZMP and the arrangement thereof are also not limited to the above descriptions.

In addition, an acceleration sensor for detecting accelerations in the X-axis direction and the Y-axis direction are also mounted on the main foot body 1101. Although the position at which the acceleration sensor is disposed is not particularly limited, it is disposed in the concavity 1111 in the present example. The output from the acceleration sensor is used for detecting the inclination of the road surface with respect to the direction of gravity or the stumbling motion caused by, for example, bumps and depressions on the road surface. Output signals from these sensors are transmitted to the main control unit 300 of the robot's main body via processing circuits on the electrical circuit substrate 1112, the connectors 1103 and 1003, and the bus 304.

The ROM 305 mounted on the electrical circuit substrate 1112 stores foot information described below as information related to the main foot body 1101.

The foot information includes information identical to the corresponding main foot body 1101 which is necessary for the main control unit 300 to perform the trajectory calculation and other calculations. More specifically, the foot information includes foot identification information, foot structure information, foot sensor information, etc.

The foot identification information is identification information (ID) used for distinguishing the corresponding main foot body 1101 from other main foot bodies. The foot structure information includes the dimensions (shape), the material, the weight, the coefficient of friction of a ground-contact surface, etc., of the main foot body and its structural members. In the foot structure information, the shape of the foot bottom surface (sole shape) of the main foot body 1101 including the ground-contact portion which comes into contact with the road surface is particularly important for the control calculation. This shape is expressed in the form of a mathematical formula (two dimensional approximate formula) or by bitmap format.

The foot sensor information is information related to various sensors provided on the main foot body 1101, and includes identification information (ID for distinguishing the corresponding sensors from other sensors), the number, the arrangement, and the characteristics of the sensors. Since the force sensors for detecting the ZMP and the acceleration sensor for detecting collision or the inclination of the road surface are provided on the main foot body 1101, sensor information related to these sensors is stored. In addition, other sensors, for example, contact sensors for determining whether or not the foot bottom surface is placed on the road surface, sensors for detecting the displacement (slipping) of the foot bottom surface placed on the road surface with respect to the road surface, etc., may also be provided. In this case, sensor information for each of the sensors is stored.

Although the ROM in which data cannot be overwritten is used as the memory means for storing the foot information in this case, an EPROM, a SRAM, a DRAM with a backup power source, etc., in which data can be overwritten may be used as the memory means. In such a case, dynamically changing information may also be stores as the foot information, and be updated as necessary. For example, log information showing the variation in the characteristics of the sensors over time may also be stored as the foot information.

In addition to the above-described information, other various information related to the corresponding main foot body 1101 may also be stored as the foot information. In addition, information which is not directly related to the corresponding main foot body 1101 may also be stored.

The foot information stored in the memory means provided on the main foot body 1101 is read out by the CPU 301 of the main control unit 300 of the robot's main body via the bus 304, etc., when the main foot body 1101 is connected to the ankle 114 of the lower limb 110 in the process of replacing the main foot body 1101, etc., when the legged mobile robot is initialized (when the power is turned on or when the robot is reset), or at other suitable time. Then, the foot information is used by the main control unit 300 for various control calculations including calculations for obtaining commands supplied to each of the actuators 306.

Since the main foot body 1101 includes the ROM as the memory means for storing the foot information related to the main foot body 1101, it is not necessary that the memory means (the ROM 303, the RAM 302, and other external memories) included in the main control unit 300 store the information related to the main foot body 1101. Accordingly, the number of memories or the capacity of the memory used as the memory means can be reduced. Alternatively, the memory area which has been used for storing this information can be used for storing other information.

In addition, when various kinds of main foot bodies which have different sole shapes and numbers and kinds of sensors suitable for various states of road surfaces, and which store their foot information, are prepared and are replaced as necessary, it is not necessary to input the foot information manually, or by other means, each time the main foot bodies are replaced.

The foot information stored in the memory means of the main foot body may include only the foot identification information, or only the foot identification information and other main information (for example, the shape of the foot sole). In such a case, the remaining information such as the foot structure information and the foot sensor information are stored in the memory of the main control unit 300 in correspondence with the foot identification information. When the main foot body is connected to the ankle, the foot identification information is read out and is used for obtaining the corresponding foot structure information, the foot sensor information, etc. Also in this case, the task of manually inputting the identification information of the foot when the foot is replaced is not necessary, and the task of replacing the foot can be facilitated.

A second example of a connection structure of a leg and a foot and a replacement structure of the foot at an ankle of the legged mobile robot will be described below with reference to FIG. 71.

In this example shown in the figure, the foot is replaced by using an actuator which is necessarily included in the legged mobile robot. Generally, legged mobile robots including human-shaped robots have a plurality of joints, that is, a plurality of degrees of freedom. Accordingly, by utilizing these degrees of freedom, the necessity of providing an actuator exclusively used for fixing the foot can be eliminated. More specifically, when a mechanism for fixing the foot is operated autonomously by using the motion of the components corresponding to the arms and hands of human beings, it is not necessary to use an exclusive actuator.

Figure 71:
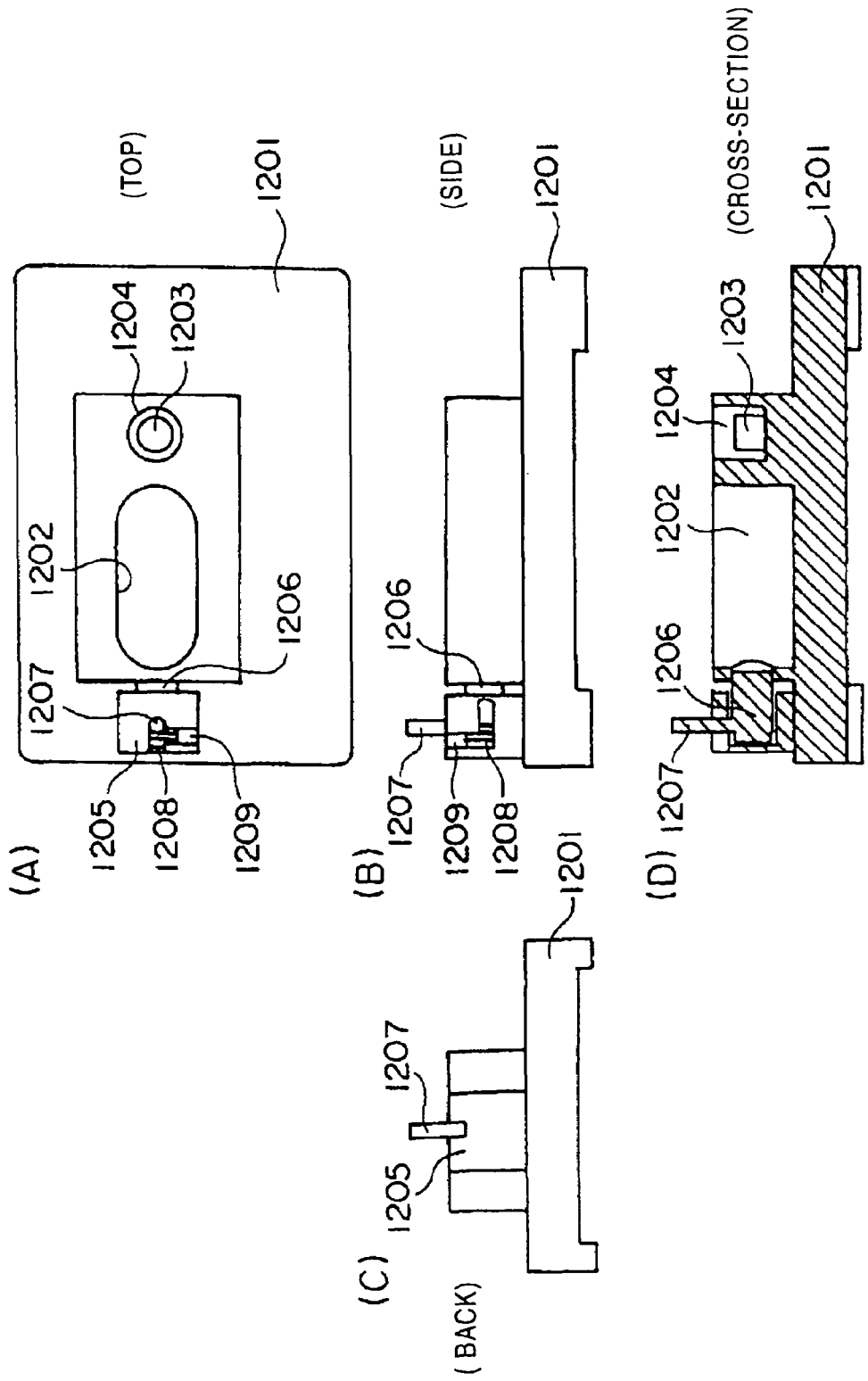
FIG. 71 is a diagram showing a connection/replacement structure of a leg and a foot at an ankle according to a second example, where (A) is a top view, (B) is a side view, (C) is a back view, and (D) is a sectional side view when the foot is removed from the ankle.

FIG. 71 includes a top view (A), a side view (B), a back view (C), and a sectional side view (D) showing a mechanism for fixing a foot which is free from an exclusive actuator in a state in which the foot is released from the ankle.

A main foot body 1201 includes a connection/positioning concavity 1202, a foot-mounted electrical connector 1203, and a container 1204 for accommodating the connector 1203 at the bottom of the container 1204.

In addition, a holder 1205, a fixing pin 1206, an operation lever 1207, and a compression spring 1208 are provided on the main foot body 1201 as shown in the figure.

In the state shown in FIG. 71, the fixing pin 1206 is urged by the compression spring 1208 to apply pressure toward the connection/positioning concavity 1202. Since the operation lever 1207, which is formed integrally with the fixing pin 1207, is pushed along a lever guide groove 1209, the fixing pin 1206 does not move from the position shown in the figure. When the main foot body 1201 is in this state, the robot can replace the main foot body 1201.

Figure 72:
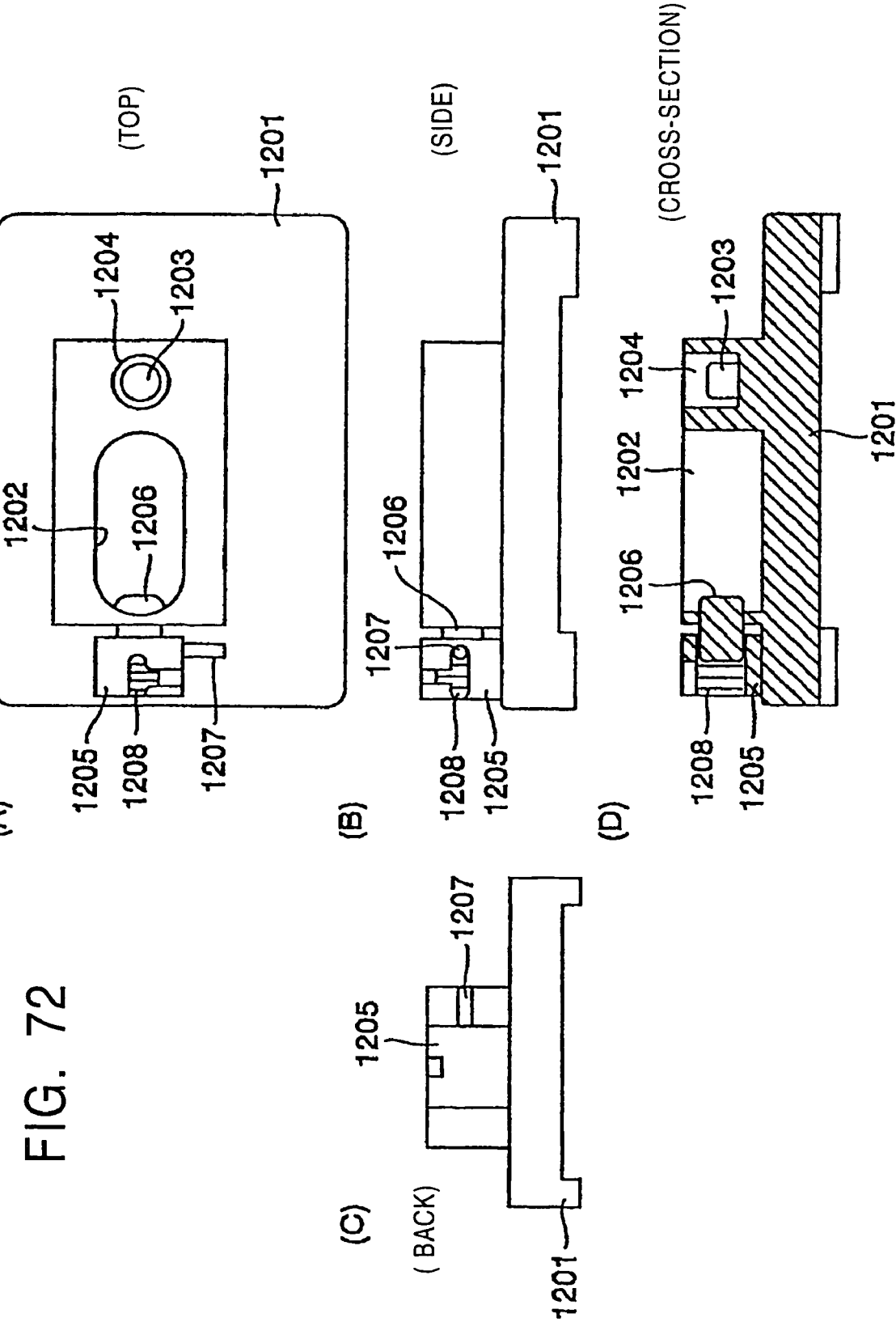
FIG. 72 is a diagram showing a state in which the structure of the foot according to the second example is changed, where (A) is a top view, (B) is a side view, (C) is a back view, and (D) is a sectional side view when the foot is connected to the ankle.

In addition, FIG. 72 shows the state in which the foot is fixed. In the state shown in the figure, the operation lever 1207 is moved along the lever guide groove 1209 in the direction to fix the foot, and the fixing pin 1206 is urged by the compression spring 1208 to project into the connection/positioning concavity 1202. In addition, an end portion of the fixing pin 1206 is fitted into a notch 1004 formed in a leg-mounted connecting part 1001. Accordingly, the main foot body 1201 is strongly connected to the leg-mounted connecting part 1001.

By performing the operation of moving the operation lever 1207 described above with reference to FIGS. 71 and 72 by using the arm and hand of the robot, the robot can autonomously fix and release the foot for replacing the foot.

In addition, in the case in which the robot is required to adapt itself to various kinds of road surfaces, it is effective if the robot performs legged motion while carrying one or more pairs of feet (spare). In addition, in the case in which the robot walks on an unknown road surface, there is a possibility that its feet must be replaced for adapting itself to the road surface. For example, when the robot is used in severe work environments for, for example, disaster relief or planetary exploration, it is rarely possible to specify the kind of the road surface. However, the use of robots is strongly expected in such an extreme and severe work environment.

In addition, although not shown in the figure, the main foot body 1201 includes an electrical circuit substrate similar to the electrical circuit substrate 1112 shown in FIGS. 69 and 70 which includes the ROM 305 shown in FIG. 3, and the above-described foot information is stored in the ROM 305.

Figure 73:
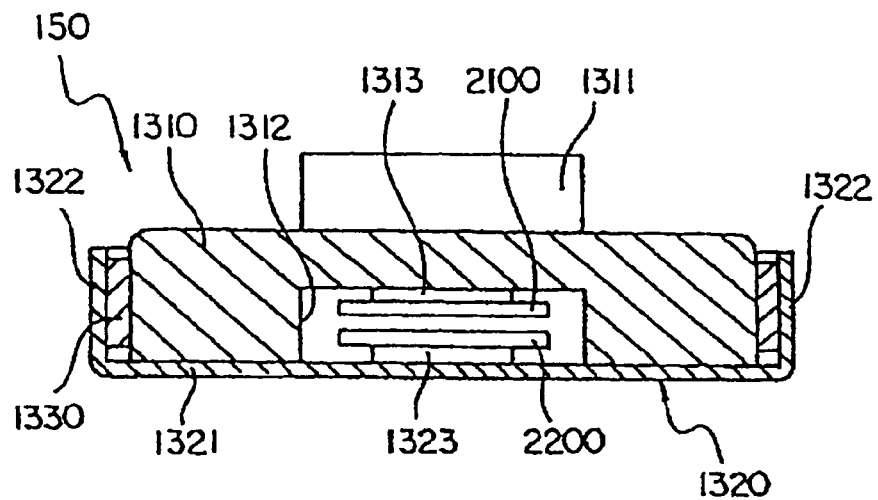
FIG. 73 is a sectional view showing the construction of a foot and a connecting part according to a third example in the state in which the foot is connected to an ankle.
Figure 74:
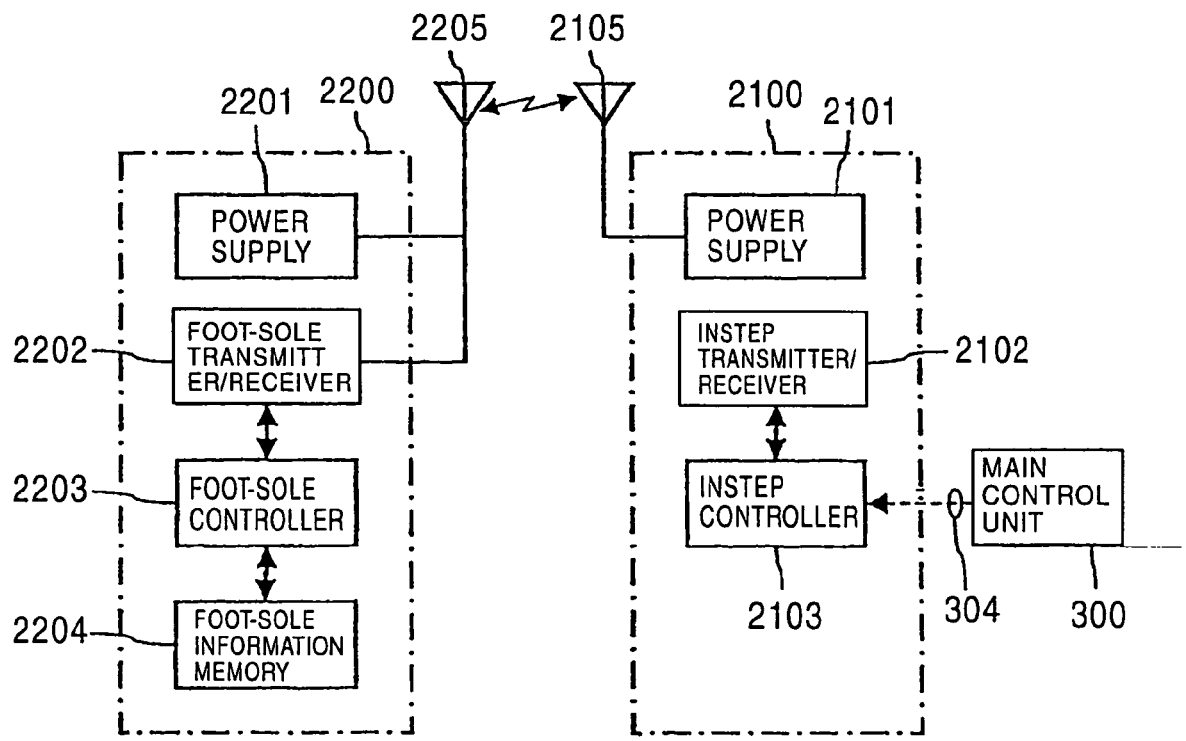
FIG. 74 is a block diagram showing the structure of an instep circuit unit and a foot-sole circuit unit included in the foot.

A third example of a connection structure of a leg and a foot and a replacement structure of the foot at an ankle of the legged mobile robot will be described below with reference to FIGS. 73 and 74. FIG. 73 is a sectional side view, and FIG. 74 is a block diagram showing a foot control unit.

The feet 150 according to the above-described first and second structures include the main foot bodies 1101 and 1201, respectively, and each of the main foot bodies 1101 and 1201 includes a foot sole which directly comes into contact with the road surface. In comparison, a foot 150 of this example includes an instep 1310 which is connected to the ankle 114 of the corresponding lower limb 110 and a foot sole 1320 which directly comes into contact with the road surface, and has a two-part structure in which the foot sole 1320 is movably attached to the instep 1310.

The instep 1310 is constructed of a rectangular plate-shaped member and a connector 1311 for providing connection to the ankle 114 is formed integrally with the instep 1310 on the top surface of the instep 1310. The instep 1310 is detachably attached to the ankle 114 by fixing the instep 1310 to the ankle 114 with screws or by other fixing means, or by using a connecting mechanism similar to the above-described connecting mechanisms for connecting the main foot bodies 1101 and 1201. A concavity 1312 is formed in the bottom surface of the instep 1310, and an instep circuit unit (instep circuit substrate) 2100 is attached to the concavity 1312 with a supporter 1313 therebetween.

Although not shown in the figure, a plurality of force sensors for detecting pressures in the Z-axis direction which are used for calculating the ZMP are provided on the bottom surface (surface around the concavity 1312) of the instep 1310. In the present example, four force sensors are disposed at four corners of the bottom surface of the instep

1310. Each of these force sensors includes a metal diaphragm and four strain gauges, and is constructed by forming a bridge circuit with the four strain gauges and laminating the stain gauges on the metal diaphragm. However, the force sensors are not limited to this, and those having other constructions may also be used.

In addition, an acceleration sensor for detecting accelerations in the X-axis direction and the Y-axis direction are mounted on the instep 1310. The output from the acceleration sensor is used for detecting the inclination of the road surface with respect to the direction of gravity or the stumbling motion caused by, for example, bumps and depressions on the road surface.

The foot sole 1320 is a rectangular box-shaped member with an open top which includes a bottom plate 1321 and upright side plates 1322 which are formed integrally with the bottom plate 1321 along the peripheral sides of the bottom plate 1321. The top surface of the bottom plate 1321 is in contact with the bottom surface of the instep 1310. In addition, the bottom surface of the bottom plate 1321 serves as the foot bottom surface of the foot 150. The bottom surface of the bottom plate 1321 and outer surfaces of the side plates 1322 are connected to each other with R surfaces (arc surfaces) or smooth curved surfaces.

The internal shape of the side plates 1322 of the foot sole 1320 is similar to the shape of side surfaces of the instep 1310, but is slightly larger. The side surfaces of the instep 1310 face the inner surfaces of the side plates 1322 of the foot sole 1320 with small gaps (allowances) therebetween. Accordingly, the foot sole 1320 can move relative to the instep 1310 along the bottom surface of the instep 1310, that is, in an arbitrary direction in the X-Y plane.

The foot sole 1320 is attached to the instep 1310 with a retaining mechanism (not shown) in such a manner that the foot sole 1320 does not fall from the instep 1310 when the corresponding leg is off the road surface and the movement of the foot sole 1320 in the X-Y plane is not restricted. The retaining mechanism has a mechanism for easily attaching/detaching the foot sole 1320 when the foot sole 1320 is to be replaced.

A buffer (buffer means or urging means) 1330 is disposed between the side plates 1322 of the foot sole 1320 and the side surfaces of the instep 1310. In this example, an endless rubber sheet is used as the buffer 1330, and is disposed such that gaps between the inner surfaces of the side plates 1322 of the foot sole 1320 and the side surfaces of the instep 1310 are filled with the rubber sheet. However, the buffer 1330 is not limited to this, and a leaf spring, a sponge, a solid or semi-solid viscous component may also be used.

In addition, the inner surfaces of the side plates 1322 of the foot sole 1320 and the side surfaces of the instep 1310 may be adhered to each other in the process of assembling the foot 150 by filling the gaps between them with an adhesive which shows elasticity and/or viscosity in a cured or solid state. In such a case, foreign matter can be prevented from entering the gaps, and effects of the retaining mechanism for movably attaching the foot sole 1320 on the foot sole 1310 can be obtained without using one.

The buffer 1330 is preferably formed such that the gaps between the inner surfaces of the side plates 1322 of the foot sole 1320 and the side surfaces of the instep 1310 are completely filled since foreign matter can be prevented from entering the gaps in such a case. However, the present invention is not limited to this, and a plurality of buffers may be arranged with gaps therebetween. In addition, it is not necessary that the buffer be provided, and the buffer may also be omitted.

A foot-sole circuit unit (foot-sole circuit substrate) 2200 is attached to the top surface of the foot sole 1320 with a supporter 1323 therebetween so that the foot-sole circuit unit 2200 faces the instep circuit unit 1313 disposed in the concavity 1312 of the instep 1310 with a gap therebetween.

As shown in FIG. 9, the instep circuit unit 2100 includes a power supply unit 2101, an instep transmitter/receiver 2102, an instep controller 2103, and an antenna 2105.

The power supply unit 2101 converts electric power supplied from the robot's main body into electromagnetic waves and supplies the electromagnetic waves to the foot-sole circuit unit 2200 via the antenna 2105. The instep transmitter/receiver 2102 transmits control signals and other signals to the foot-sole circuit unit 2200 from the antenna 2105, and receives control signals and other signals transmitted from the foot-sole circuit unit 2200 through the antenna 2105. The instep controller 2103 includes a CPU and a memory (a RAM, a ROM, etc.), and communicates with the main control unit 300 of the robot's main body via the bus 304. The ROM stores, for example, a ZMP calculation program, a road-surface inclination angle determination program, stumbling-motion detection program, etc. In this example, the instep circuit unit 2100 is used in place of the foot-mounted ROM 305 in FIG. 3.

In addition, as shown in FIG. 74, the foot-sole circuit unit 2200 includes a power supply unit 2201, a foot-sole transmitter/receiver 2202, a foot-sole controller 2203, a foot-sole information memory (memory), and an antenna 2205.

The power supply unit 2201 receives the electromagnetic waves transmitted from the power supply unit 2101 through the antennas 2105 and 2205, converts the electromagnetic waves into electric power, and supplies the electric power to each part of the foot-sole circuit unit 2100.

The foot-sole transmitter/receiver 2202 transmits control signals and other signals to the instep circuit unit 2100 from the antenna 2205, and receives control signals and other signals transmitted from the instep circuit unit 2200 through the antenna 2205. The foot-sole controller 2203 includes a CPU and a memory (a RAM, a ROM, etc.), and communicates with the instep controller 2102 via the foot-sole transmitter/receiver 2202, the antennas 2205 and 2105, and the instep transmitter/receiver 2102. The ROM stores, for example, a ZMP calculation program, a road-surface inclination angle determination program, stumbling-motion detection program, etc.

The foot-sole information memory 2204 is memory means which stores foot-sole information. The foot-sole information memory 2204 stores the foot-sole information described below as information related to the foot sole.

The foot-sole information includes information identical to the corresponding foot sole which is necessary for the main control unit 300 to perform the trajectory calculation and other calculations. More specifically, the foot-sole information includes foot-sole identification information, foot-sole structure information, foot-sole sensor information, etc.

The foot-sole identification information is identification information (ID) used for distinguishing the corresponding foot sole 1320 from other foot soles. The foot-sole structure information includes the dimensions (shape), the material, the weight, the coefficient of friction of a ground-contact surface, etc., of the foot sole 1320 and its structural members. In the foot-sole structure information, the shape of the bottom surface (sole shape) of the foot sole 1320 including the ground-contact portion which comes into contact with the road surface is particularly important for the control calculation. This shape is expressed in the form of a mathematical formula (two dimensional approximate formula) or by bitmap format.

The foot-sole sensor information is information related to various sensors provided on the main foot sole 1320, and includes identification information (ID for distinguishing the corresponding sensors from other sensors), the number, the arrangement, and the characteristics of the sensors. In the present example, the force sensors for detecting the ZMP and the acceleration sensor for detecting collision or the inclination of the road surface are provided on the instep 1310. However, these sensors may also be provided on the foot sole 1320. In such a case, information related to these sensors is stored. In addition, other sensors, for example, contact sensors for determining whether or not the foot bottom surface is placed on the road surface, sensors for detecting the displacement (slipping) of the bottom surface placed on the road surface with respect to the road surface, etc., may also be provided on the foot sole 1320. In this case, sensor information for each of the sensors is stored.

The foot-sole information memory 2204 may be a ROM in which data cannot be overwritten or an EPROM, a SRAM, a DRAM with a backup power source, etc., in which data can be overwritten. When memory means in which data can be overwritten is used, dynamically changing information may also be stored as the foot-sole information, and be updated as necessary. For example, log information showing the variation in the characteristics of the sensors over time may also be stored as the foot information.

In addition to the above-described information, other various information related to the foot sole 1320 may also be stored as the foot-sole information. In addition, information which is not directly related to the foot sole 1320 may also be stored.

The foot-sole information stored in the foot-sole information memory 2204 is read out by the main control unit 300 of the robot's main body when the foot sole 1320 is connected to the instep 1310 in the process of replacing the instep 1310, etc., when the legged mobile robot is initialized (when the power is turned on or when the robot is reset), or at other suitable time. More specifically, the main control unit 300 commands the instep controller 2103 to read out the foot-sole information, and the instep controller 2103 commands the foot-sole controller 2203 to read out the foot-sole information via the instep transmitter/receiver 2102, the antennas 2105 and 2205, and the foot-sole transmitter/receiver 2202. The foot-sole controller 2203 reads out necessary foot-sole information from the foot-sole information memory 2204 and transmits the foot-sole information to the instep controller 2103, and the instep controller 2103 transmits the foot-sole information to the main control unit 300. The foot-sole information is used by the main control unit 300 for various control calculations including calculations for obtaining command values supplied to each of the actuators 306.

Since the foot sole 1320 includes the memory means (foot-sole information memory 2204) which stores the foot-sole information related to the foot sole 1320, it is not necessary that the memory means (the ROM 303, the RAM 302, and other external memories) included in the main control unit 300 store the information related to the foot sole 1320. Accordingly, the number of memories or the capacity of the memory used as the memory means can be reduced. Alternatively, the memory area which has been used for storing this information can be used for storing other information.

In addition, when various kinds of foot soles which have different sole shapes and numbers and kinds of sensors suitable for various states of road surfaces, and which store their foot-sole information, are prepared and are replaced as necessary, it is not necessary to input the foot-sole information manually, or by other means, each time the foot soles are replaced.

The foot-sole information stored in the foot-sole information memory 2204 may include only the foot-sole identification information, or only the foot-sole identification information and other main information (for example, the shape of the foot sole). In such a case, the remaining information such as the foot-sole structure information and the foot-sole sensor information are stored in a memory included in the instep controller 2103 in correspondence with the foot-sole identification information. When the foot sole 1320 is connected to the instep 1310, the foot-sole identification information is read out and is used for obtaining the corresponding foot structure information, the foot sensor information, etc., from the memory in the instep controller 2103. Then, the thus obtained information is transmitted to the main control unit 300.

In this example, data communication and power supply between the instep circuit unit 2100 and the foot-sole circuit unit 2200 are performed without contact (by wireless communication) using electromagnetic waves. However, the instep circuit unit 2100 and the foot-sole circuit unit 2200 may also be directly connected to each other with a flexible cable. In such a case, the kind and the attachment structure of the cable are preferably selected such that the movement of the foot sole 1320 relative to the instep 1310 is not impeded.

Figure 75:
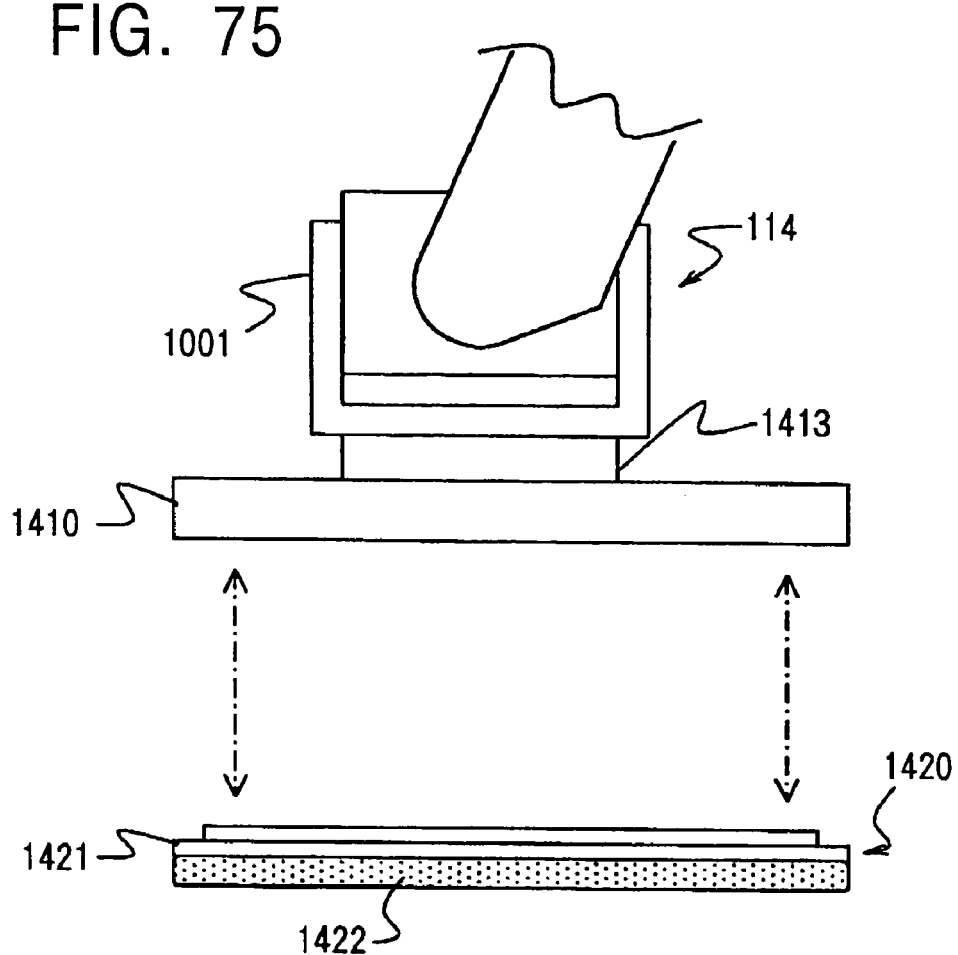
FIG. 75 is an exploded side view showing a part of a connection/replacement structure of a leg and a foot according to a fourth example.
Figure 76:
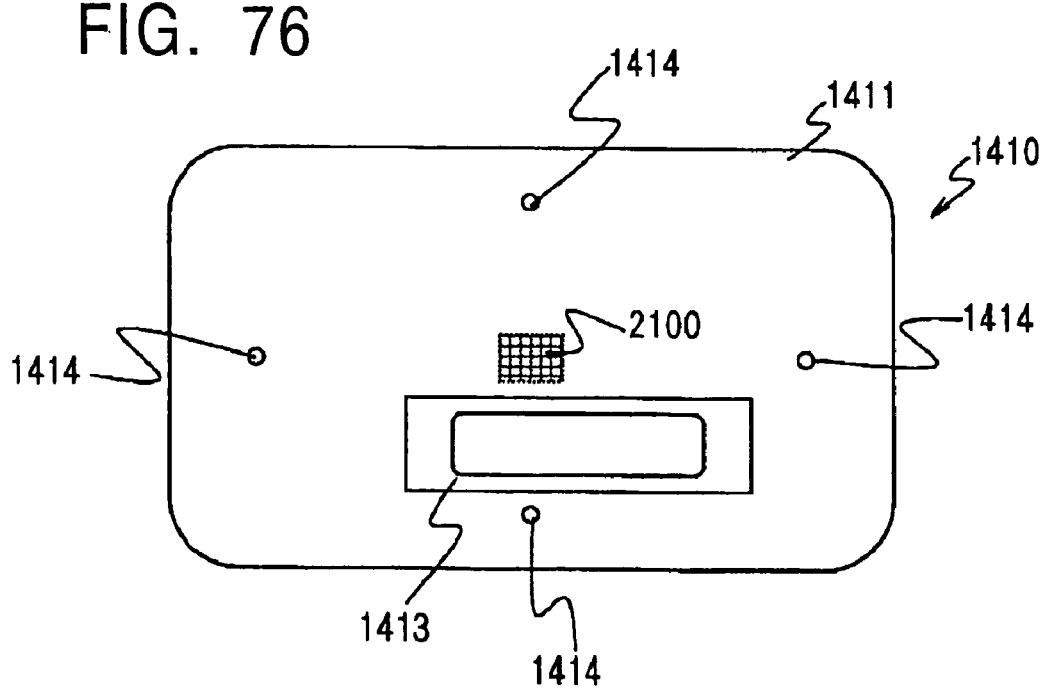
FIG. 76 is a plan view of the foot included in the connection/replacement structure of the leg and the foot according to the fourth example.
Figure 77:
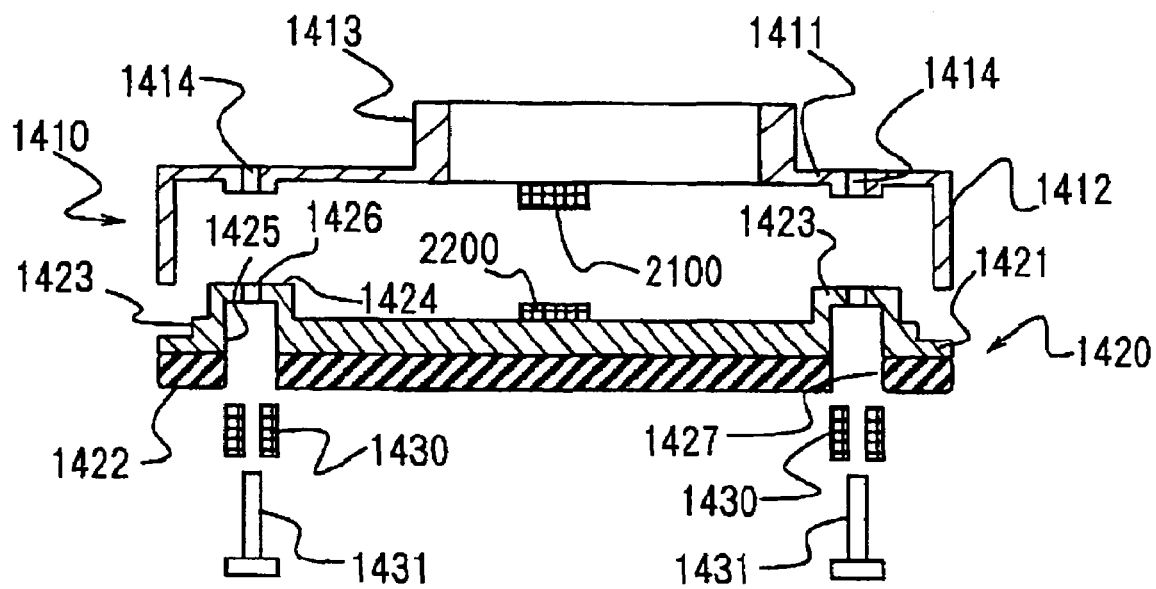
FIG. 77 is an exploded side view showing a part of the foot included in the connection/replacement structure of the leg and the foot according to the fourth example.
Figure 78:
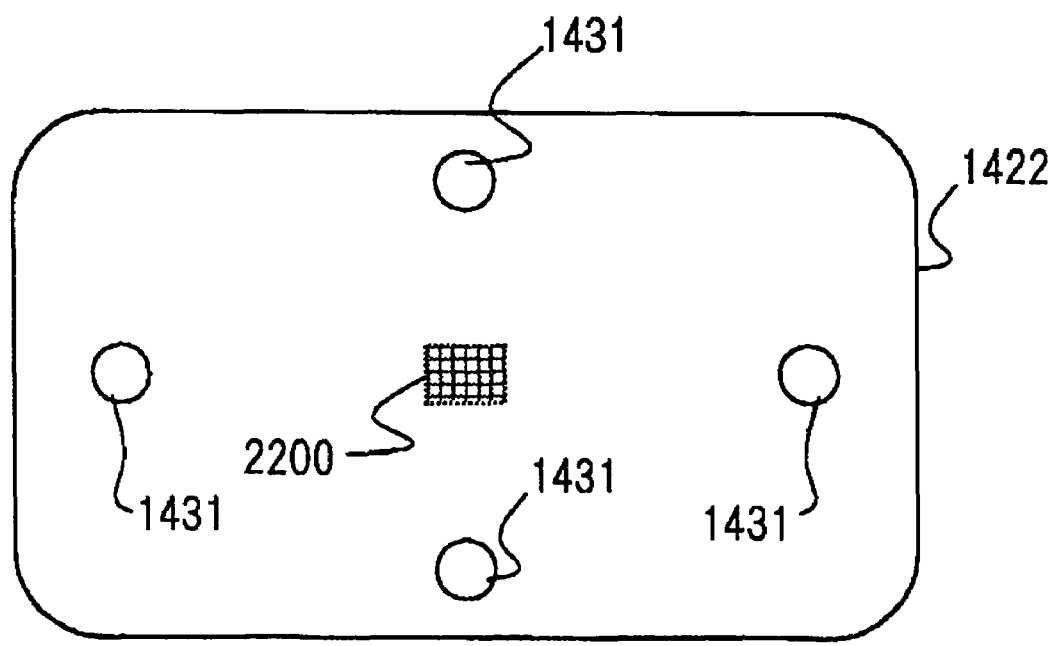
FIG. 78 is a bottom view of the foot included in the connection/replacement structure of the leg and the foot according to the fourth example.

A fourth example of a connection structure of a leg and a foot and a replacement structure of the foot at an ankle of the legged mobile robot will be described below with reference to FIGS. 75 to 78. FIG. 75 is a partially exploded side view, FIG. 76 is a plan view, FIG. 77 is a partially exploded sectional view, and FIG. 78 is a bottom view.

Similarly to the above-described third structure, a foot 150 of this example includes an instep 1410 which is connected to the ankle 114 of the corresponding lower limb 110 and a foot sole 1420 which directly comes into contact with the road surface, and has a two-part structure in which the foot sole 1420 is movably attached to the instep 1410.

The instep 1410 is a rectangular box-shaped member with an open bottom which includes a top plate 1411 and upright side plates 1412 which are integrally formed with the top plate 1411 along the peripheral sides of the top plate 1411. A connector 1413 for providing connection to the ankle 114 is formed integrally with the top plate 1411 on the top surface of the top plate 1411. The top plate 1411 is provided with screw holes (four screw holes are provided in this example) 1414 for attaching the foot sole 1420. The outer side surfaces of the side plates 1412 are connected to each other with R surfaces (arc surfaces) or smooth surfaces. The instep 1410 is attached to the ankle 114 with screws or by other fixing means. Alternatively, the instep 1410 may also be detachably attached to the ankle 114 by a connecting mechanism similar to the above-described connecting mechanisms for connecting the main foot bodies 1101 and 1201. In addition, an instep circuit unit (instep circuit substrate) 2100 is attached to the bottom surface of the top plate 1411 of the instep 1410 at the central area thereof.

Although not shown in the figure, four projective sensor bases are formed integrally with the top plate 1411 of the instep 1410 on the bottom surface of the top plate 1411 at four corners thereof. A plurality of force sensors for detecting pressures in the Z-axis direction which are used for calculating the ZMP are provided on the sensor bases. Each of these force sensors includes a metal diaphragm and four strain gauges, and is constructed by forming a bridge circuit with the four strain gauges and laminating the stain gauges on the metal diaphragm. However, the force sensors are not limited to this, and those having other constructions may also be used.

In addition, an acceleration sensor (not shown) for detecting accelerations in the X-axis direction and the Y-axis direction is provided on the bottom surface of the top plate 1411 of the instep 1410. The output from the acceleration sensor is used for detecting the inclination of the road surface with respect to the direction of gravity or the stumbling motion caused by, for example, bumps and depressions on the road surface.

The foot sole 1420 has a two-part structure in which a contact member 1422 composed of a rectangular-plate shaped member is attached to the bottom surface of a foot-sole main body 1421 by adhesion or by means of screws.

The external shape of the foot-sole main body 1421 is approximately the same as the external shape of the side plates 1412 at the open side of the instep 1410. In addition, a rectangular step portion 1423 is formed integrally with the foot-sole main body 1421. The external shape of the step portion 1423 is similar to the internal shape of the side plates 1412 at the open side of the instep 1410, but is slightly smaller.

In order to attach the foot-sole main body 1421 to the instep 1410, fixing projections 1424 which project upward are formed on the top surface of the foot-sole main body 1421 at positions corresponding to the screw holes 1414 formed in the top plate 1411. The fixing projections 1424 have columnar concavities 1425 for receiving buffers 1430 at the lower sides thereof. In addition, the fixing projections 1424 are provided with through holes 1426 which extend through the fixing projections 1424 in the vertical direction at projecting ends thereof. In addition, although not shown in the figure, sensor-pressing bases are formed integrally with the foot-sole main body 1421 at positions corresponding to the ZMP sensors provided on the sensor bases formed on the top surface of the instep 1410 in such a manner that the sensor-pressing bases are pressed against or in contact with the ZMP sensors.

The external shape of the contact member 1422 is approximately the same shape as that of the foot-sole main body 1421, and through holes 1427 are formed in the contact member 1422 at positions corresponding to the concavities 1425 of the foot-sole main body 1421. In order to reduce the impact which occurs when the foot 150 is placed on the road surface, the contact member 1422 is composed of, for example, a rubber sheet. From the viewpoint of adaptability to the state of the road surface, the material of the contact member 1422 may be metal, plastic, or other materials instead of the rubber sheet. In addition, from the viewpoint of adaptability to the state of the road surface, the bottom surface (ground-contact surface) of the contact member 1422 may have grooves, a plantar arch, etc. By suitably changing or selecting the material of the contact member 1422 and the shape of the ground-contact surface, various kinds of foot soles 1420 suitable for various states of road surfaces can be obtained.

The foot sole 1420 can be attached to the instep 1410 by inserting the step portion 1423 of the foot-sole main body 1421 into the opening of the instep 1410 while the cylindrical buffers 1430 are fitted in the concavities 1425 and the through holes 1427 in the foot sole 1420, inserting screws 1431 through the through holes formed in the buffers 1430 and the through holes 1426 formed in the fixing projections 1424, and screwing end portions of the screws 1431 into the screw holes 1414 formed in the top plate 1411.

At this time, the ZMP sensors (not shown) attached to the sensor bases (not shown) provided on the bottom surface of the top plate 1411 is pressed against by the end surfaces of the sensor-pressing bases (not shown) provided on the foot sole 1420, so that suitable preload is applied to the ZMP sensors. Cylindrical elastic rubber members, coil springs, etc., may be used as the buffers 1430. The buffers 1430 serve to reduce the impact transmitted to the instep 1410 from the foot sole 1420 during the walking motion, as well as to suppress the vibration of the foot sole 1420 so that noise can be reduced and controllability can be improved. In addition, the buffers 1430 also serve to maintain the state that the foot sole 1420 can move relative to the instep 1410 along the Z-axis direction and in the X-Y plane. The buffer 1430 may also have viscosity in addition to elasticity.

Another buffer may be disposed between the step portion 1423 of the foot-sole main body 1421 and the inner surfaces of the side plates 1412 of the instep 1410. In such a case, an endless rubber sheet may be used as the buffer, and be disposed such that gaps between the inner surfaces of the side plates 1412 of the instep 1410 and the step portion 1423 of the foot-sole main body 1421 are filled with the rubber sheet. However, the buffer is not limited to this, and a leaf spring, a sponge, a solid or semi-solid viscous means may also be used.

In addition, the step portion 1423 of the foot sole 1420 and the side plates 1412 of the instep 1410 which face the step portion 1423 may be adhered to each other in the process of assembling the foot 150 by filling the gaps between them with an adhesive which shows elasticity and/or viscosity in a cured or solid state. In such a case, foreign matter can be prevented from entering the gaps.

The another buffer is preferably formed such that the gaps between the inner surfaces of the side plates 1412 of the instep 1410 and the step portion 1423 of the foot-sole main body 1421 are completely filled since foreign matter can be prevented from entering the gaps in such a case. However, the present invention is not limited to this, and a plurality of buffers may be arranged with gaps therebetween.

The constructions of the foot-sole circuit unit 2200 including memory means which stores the foot-sole information and the instep circuit unit 2100 including means for reading out the foot-sole information stored in the memory means are similar to those explained in the above-described third construction, and explanations thereof are thus omitted.

As described above, the foot sole 1420 is elastically attached to the instep 1410 with the buffers 1430 therebetween, so that the foot sole 1420 can move slightly along the Z-axis direction and in the X-Y plane within a range corresponding to the gaps between the step portion 1423 of the foot-sole main body 1421 and the inner surfaces of the side plates 1412 at the open side of the instep 1410. Accordingly, the impact transmitted to the instep 1410 from the foot sole 1420 during the walking motion can be reduced. In addition, even when the foot sole interferes with bumps and depressions on the road surface, they can be easily avoided.

The screws 1431 and the buffers 1430 correspond to fastening means with variable fastening conditions according to the present invention, and an amount of movement (relative movement) of the foot sole 1420 relative to the instep 1410 and the preload applied to the ZMP sensors can be arbitrarily adjusted by changing the depth to which the screws 1431 are inserted. In addition, the movable range of the foot sole 1420 relative to the instep 1410 in the X-Y plane can be arbitrarily adjusted by adjusting the external shape of the step portion 1423 of the foot-sole main body 1421. Accordingly, the foot can be flexibly adapted to various states of road surfaces by adjusting the depth to which the screws 1431 are inserted and the external shape of the step portion 1423.

In the above-described examples, an electronic memory (a RAM, a ROM, etc.) is used as the memory means included in the foot (in the main foot bodies 1101 and 1201 or the foot soles 1320 and 1420). However, the present invention is not limited to this, and various kinds of memory means which can store information can be used. For example, visibly recognizable marks such as barcodes, matrix codes, characters, symbols, etc., may be displayed on the main foot body or the foot sole and be read by a detection device such as a CCD or the like provided on the ankle or the instep. In addition, the memory means may also be such that information is stored in correspondence with the arrangement of projections (pins) and is read out by a photo interpreter or a mechanical switch. In addition, the memory means may also be such that information is stored magnetically and is read out by a magnetic head or a reed relay.

Figure 80:
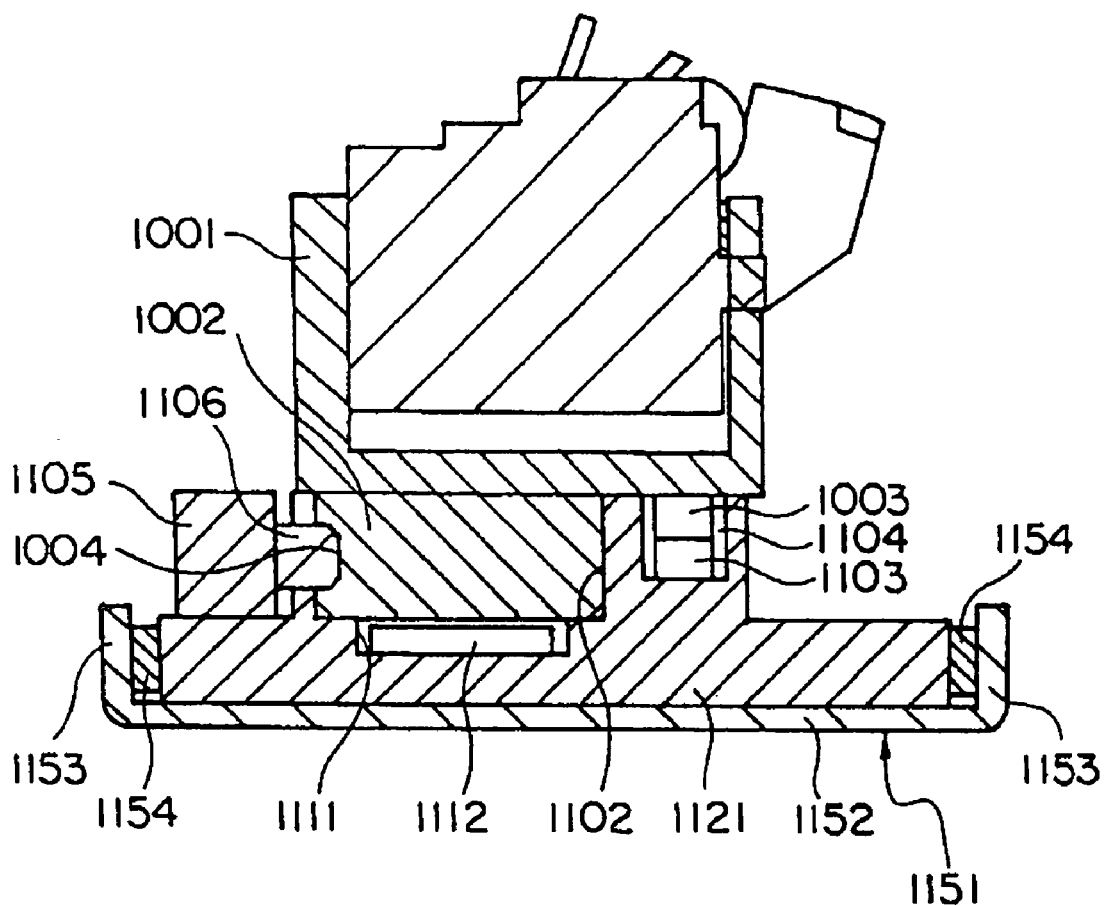
FIG. 80 is a diagram showing the connection/replacement structure of the leg and the foot according to the fifth example, and is a sectional view showing the construction of the foot and the connecting part in the state in which the foot is connected to the ankle.

A fifth example of a connection structure of a leg and a foot and a replacement structure of the foot at an ankle of the legged mobile robot will be described below with reference to FIGS. 79 and 80. FIGS. 79 and 80 are diagrams showing the sectional construction of a foot 150 according to a sixth structure and connecting parts between a lower limb (movable leg) 110 and the foot 150, where FIG. 79 shows a state in which the foot is removed from an ankle 114 of the lower limb 110 and FIG. 80 shows a state in which the foot 150 is attached to a leg-mounted connecting part 1001.

In the foot 150 according to the above-described first structure, the bottom surface of the main foot body 1101 serves as the ground-contact surface which comes into contact with the road surface. In comparison, the foot 150 according to the fifth structure includes an instep 1121 which is connected to the ankle 114 of the corresponding lower limb 110 and a foot sole 1151 which directly comes into contact with the road surface, and has a two-part structure in which the foot sole 1121 is movably attached to the instep 1151.

In addition, a connecting part provided on the instep 1121 of the foot 150 at the upper side of the instep 1121 includes a connection/positioning concavity 1102, a connector 1103 for providing electrical connection, a container 1104 for accommodating the connector 1003, and a connection actuator 1105.

The foot sole 1151 is a rectangular box-shaped member with an open top which includes a bottom plate 1152 and upright side plates 1153 which are formed integrally with the bottom plate 1152 along the peripheral sides of the bottom plate 1152. The top surface of the bottom plate 1152 is in contact with the bottom surface of the instep 1121. In addition, the bottom surface of the bottom plate 1152 serves as the foot bottom surface of the foot 150. The bottom surface of the bottom plate 1152 and outer surfaces of the side plates 1153 are connected to each other with R surfaces (curved surfaces) or smooth curved surfaces.

The internal shape of the side plates 1153 of the foot sole 1151 is similar to the shape of side surfaces of the instep 1121, but is slightly larger. The side surfaces of the instep 1121 face the inner surfaces of the side plates 1153 of the foot sole 1151 with small gaps (allowances) therebetween.

Accordingly, the foot sole 1151 can move relative to the instep 1121 along the bottom surface of the instep 1121, that is, in an arbitrary direction in the X-Y plane.

The foot sole 1151 is attached to the instep 1121 with a retaining mechanism (not shown) in such a manner that the foot sole 1151 does not fall from the instep 1121 when the corresponding leg is off the road surface and the movement of the foot sole 1151 in the X-Y plane is not restricted. The retaining mechanism preferably has a mechanism for easily attaching/detaching the foot sole 1151 when the foot sole 1151 is to be replaced.

A buffer (buffer means) 1154 is disposed between the side plates 1153 of the foot sole 1151 and the side surfaces of the instep 1121. An endless rubber sheet, for example is used as the buffer 1154, and is disposed such that gaps between the inner surfaces of the side plates 1153 of the foot sole 1151 and the side surfaces of the instep 1121 are completely filled with the rubber sheet. However, the buffer 1154 is not limited to this, and a leaf spring, a sponge, a solid or semi-solid viscous means may also be used.

In addition, the inner surfaces of the side plates 1153 of the foot sole 1151 and the side surfaces of the instep 1121 may be adhered to each other in the process of assembling the foot by filling the gaps between them with an adhesive which shows elasticity and/or viscosity in a cured or solid state. In such a case, foreign matter can be prevented from entering the gaps, and effects of the retaining mechanism for movably attaching the foot sole 1151 on the instep 1121 can be obtained without using one.

In the above-described construction, the foot sole 1151 can move with respect to the instep 1121 in an arbitrary direction along the bottom surface of the instep 1121. However, the construction may also be such that the foot sole 1151 can only move in a specific direction, such as the X-axis direction or the Y-axis direction. In addition, the buffer 1154 is preferably formed such that the gaps between the inner surfaces of the side plates 1153 of the foot sole 1151 and the side surfaces of the instep 1121 are completely filled since foreign matter can be prevented from entering the gaps in such a case. However, the present invention is not limited to this, and a plurality of buffers may be arranged with gaps therebetween. In addition, the buffer may also be omitted.

A concavity 1111 is formed in the bottom surface of the connection/positioning concavity 1102 of the instep 1121, and an electrical circuit substrate 1112 is disposed in the concavity 1111. The electrical circuit substrate 1112 may also be disposed at other positions on the instep 1121. The electrical circuit substrate 1112 includes a foot-sensor processing unit and a power supply unit.

The foot-sensor processing unit is constructed similarly to that shown in FIG. 74, and foot information related to the foot 150 having the two-part structure is stored in a ROM included in the foot-sensor processing unit.

Figure 81:
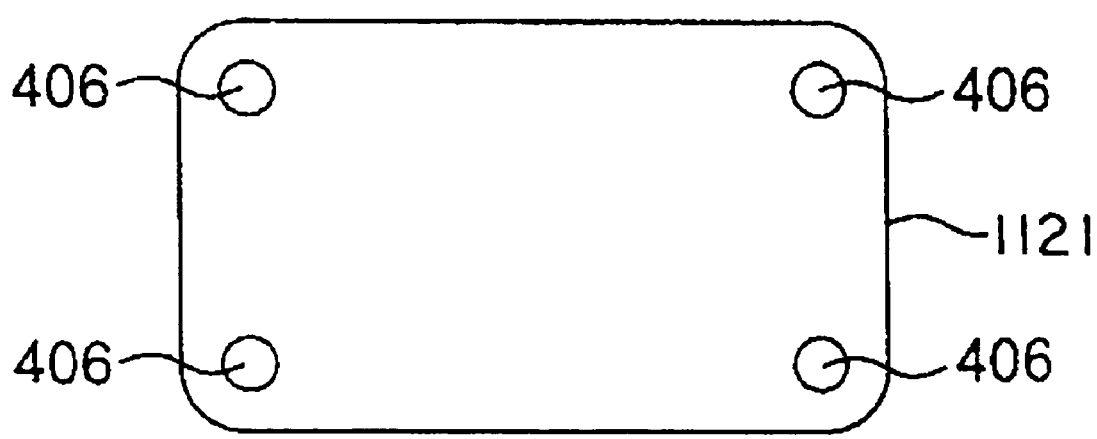
FIG. 81 is a bottom view of an instep included in the connection/replacement structure of the leg and the foot according to the fifth example.
Figure 82:
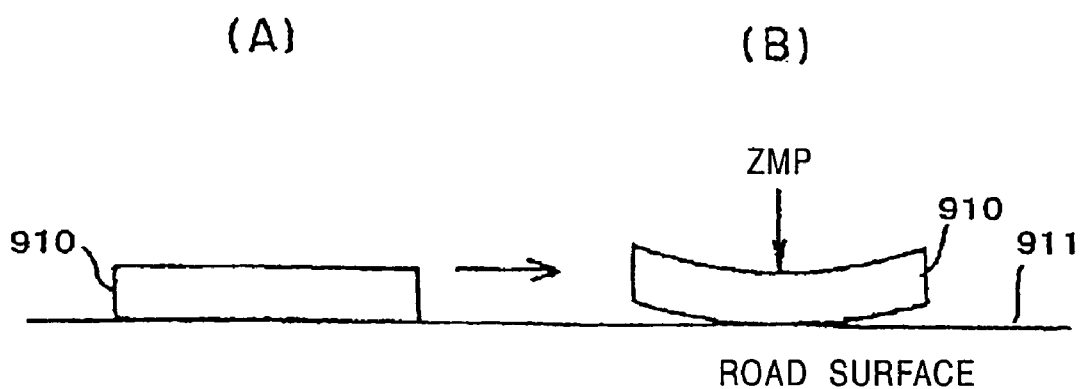
FIG. 82 is a diagram showing the state in which a known foot of a legged mobile robot deforms due to the weight.
Figure 83:
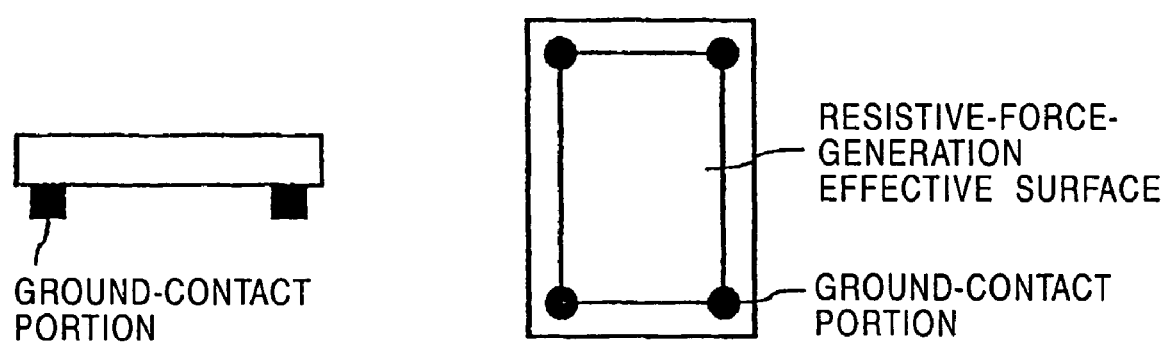
FIG. 83 is a diagram for,explaining a resistive-force-generation effective surface in the case in which the foot is in point contact with a road surface.
Figure 84:
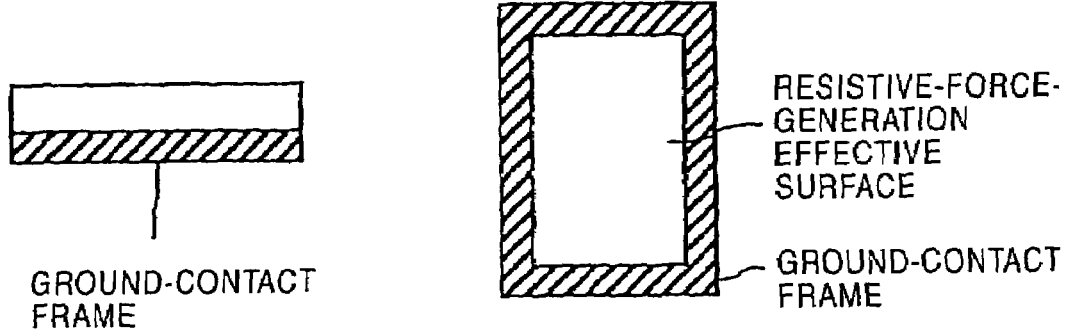
FIG. 84 is a diagram for explaining the resistive-force-generation effective surface in the case in which the foot is in contact with the road surface such that the contact area is frame-shaped.
Figure 85:
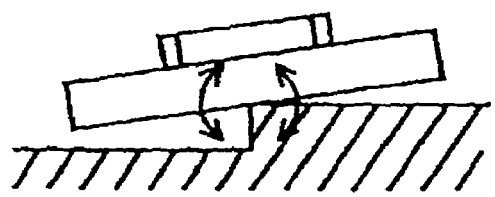
FIG. 85 is a diagram showing the state in which the known foot of the legged mobile robot is placed on a step.
Figure 86:
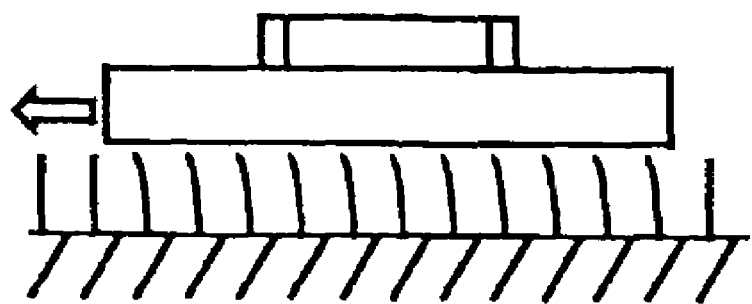
FIG. 86 is a diagram showing the state in which the known foot of the legged mobile robot walks on a carpet.
Figure 87:
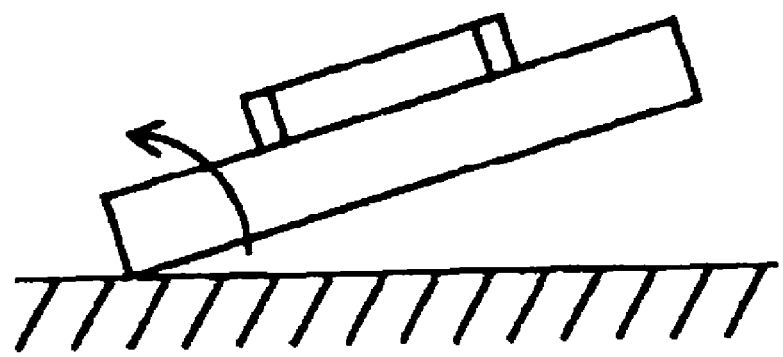
FIG. 87 is a diagram for explaining the motion of the known foot of the legged mobile robot when a corner of the bottom surface of the foot is caught by the road surface.
Figure 88:
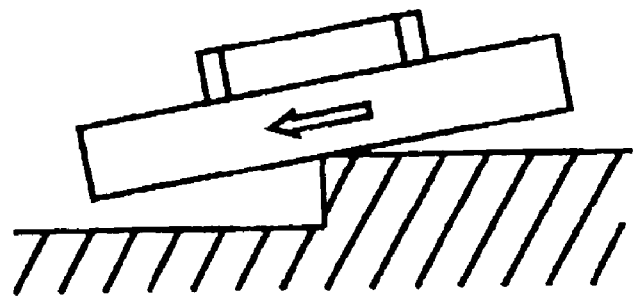
FIG. 88 is a diagram showing the state in which the known foot of the legged mobile robot is placed a step.
Figure 89:
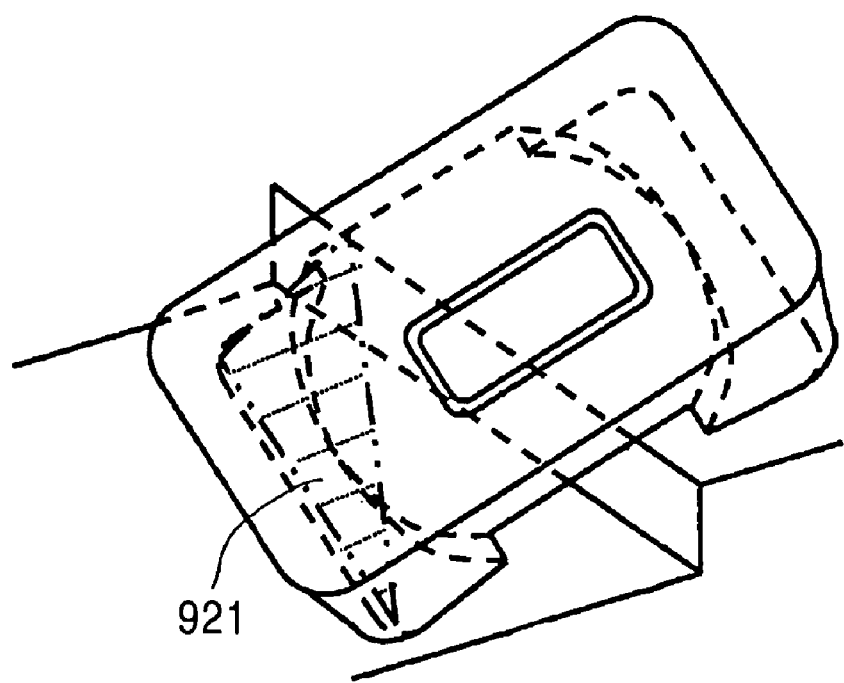
FIG. 89 is a diagram showing the state in which a known foot of the legged mobile robot having a plantar arch is placed on a step.
Figure 90:
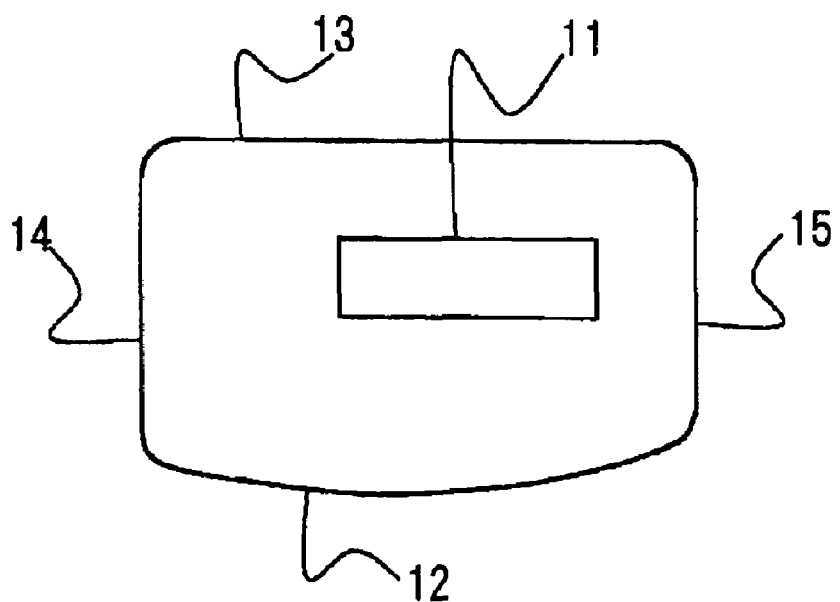
FIG. 90 is a plan view showing an example of the construction of a foot.
Figure 91:
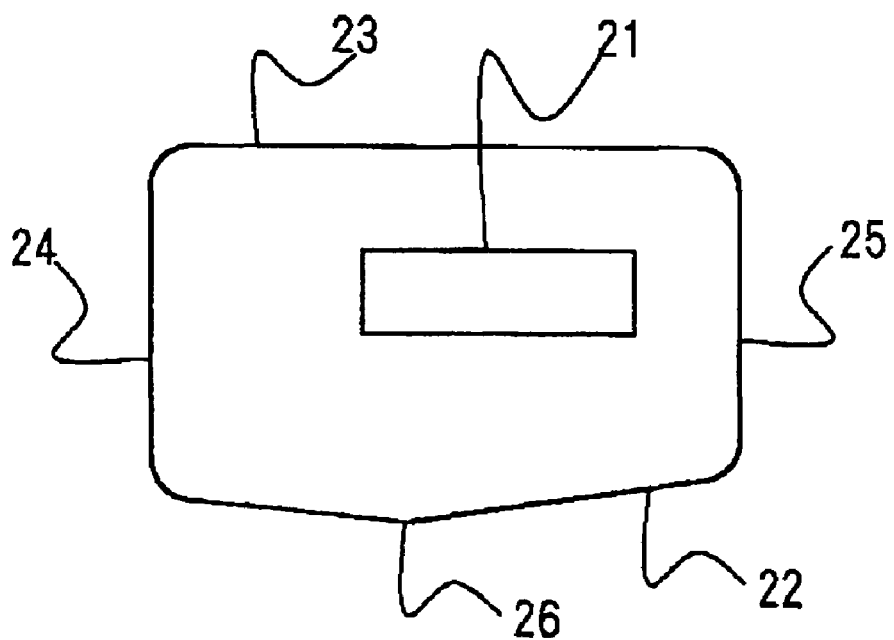
FIG. 91 is a plan view showing another example of the construction of a foot.
Figure 92:
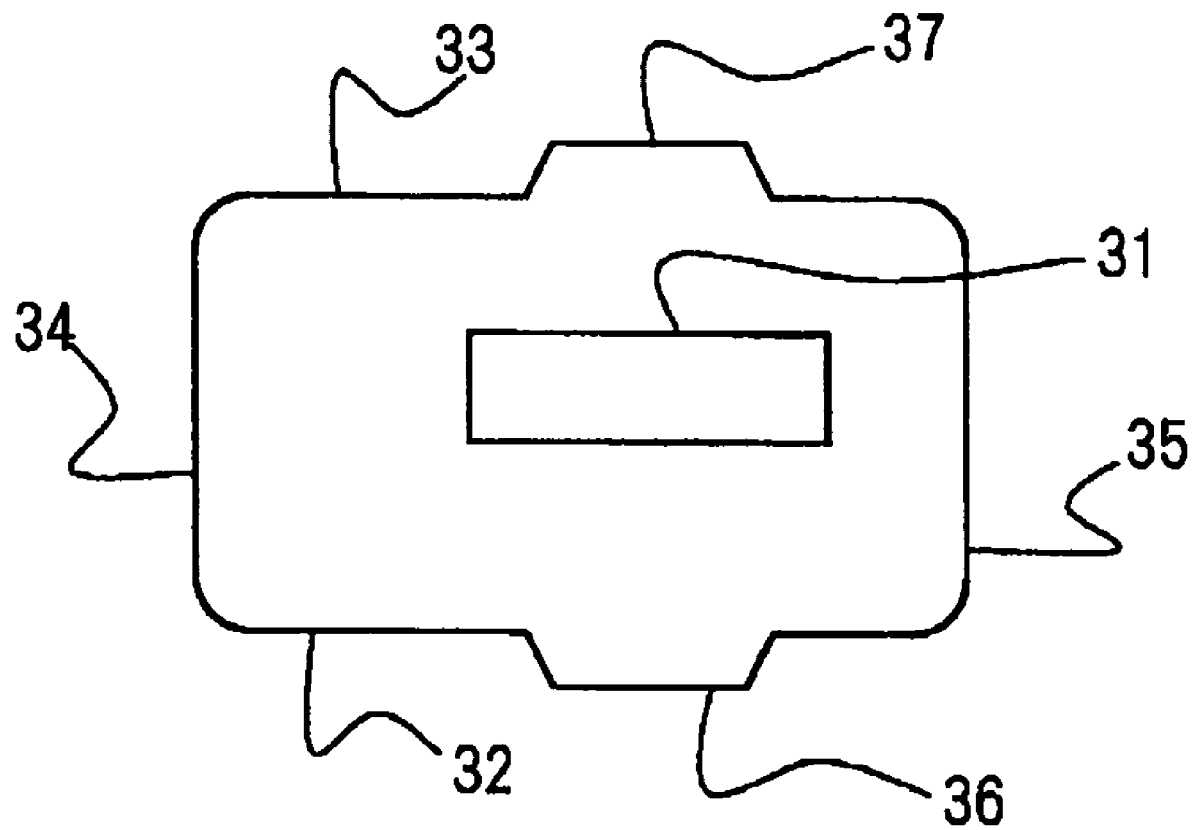
FIG. 92 is a plan view showing another example of the construction of a foot.

In addition, sensors including force sensors 406 and an acceleration sensor 407 are also provided on the instep 1121. The force sensors 406 are used for detecting pressures in the Z-axis direction, and are provided on the bottom surface (surface which comes into contact with the top surface of the foot sole 1151) of the instep 1121, as shown in FIG. 81. The force sensors 406 are used for calculating the ZMP, and are disposed at four corners on the bottom surface of the instep 1121 in the present example.

Each of these force sensors 406 includes a metal diaphragm and four strain gauges, and is constructed by forming a bridge circuit with the four strain gauges and laminating the stain gauges on the metal diaphragm. When the bottom surface of the instep 1121 is in contact with the top surface of the foot sole 1151, the amount of deformation (amount of strain) of the above-described metal diaphragm is output as an electrical signal so that a force applied by the foot sole 1151 in the Z-axis direction at a position where the sensor 406 is disposed can be calculated on the basis of this output. The force sensors 406 are not limited to this, and those having other constructions may also be used. In addition, the number of force sensors 406 for detecting the ZMP and the arrangement thereof are also not limited to the descriptions above.

In addition, although not shown in the figure, an acceleration sensor for detecting accelerations in the X-axis direction and the Y-axis direction are also mounted on the instep 1121. Although the positions at which the acceleration sensor is arranged are not particularly limited, it is disposed in the concavity 1111 in the present example. The output from the acceleration sensor is used for detecting the inclination of the road surface with respect to the direction of gravity or the stumbling motion caused by, for example, bumps and depressions on the road surface.

The sensors 406 and 407 are electrically connected to an A/D converter 405 of the foot-sensor processing unit 400 via an operational amplifier (not shown). The gains of the outputs from the sensors 406 and 407 are of course adjusted in advance in accordance with the dynamic range of the A/D converter 405.

Although the instep 1121 is connected to the ankle 114 using the actuator 1105 in this example, it may also be connected using a manual lever shown in FIGS. 71 and 72.

Lastly, the process for calculating the ZMP which is performed by the foot-sensor processing unit 400 will be described below. The ZMP described herein means a point on a floor surface where the moment due to a reaction force from the floor surface applied to a walking robot is zero.

When the biped walking robot is in a period of single-foot support, a CPU 401 included in the foot-sensor processing unit 400 calculates the ZMP of the corresponding foot on the basis of detection values (pressures) obtained from the four sensors 406 provided on the main foot body 1101 or the instep 1121 (hereinafter represented by the main foot body 1101) and information related to the arrangement positions of the sensors 406 (in this case, this information is assumed to be stored in the ROM 403 as one of the foot sensor information) as follows:

$$ZMP = \frac{\sum_{i=1}^{4} \vec{f}_i \cdot \vec{P}_i}{\sum_{i=1}^{4} \vec{f}_i} \tag{9}$$

where, $\vec{f}_i$: arrangement position of each force sensor, and $\vec{P}_i$: force detected.

When the biped walking robot is in a period of two-foot support, two ZMPs are calculated by the foot-sensor processing units 400 of the left and right feet 150, and the actual ZMP is calculated by the CPU 301 included in the main control unit 300 on the basis of the two ZMPs.

The ZMP can be calculated if detection values are obtained from at least three force sensors. However, since the ZMP is calculated by detection values obtained by four force sensors, the reliability of the ZMP calculation is increased. When four force sensors are provided, the ZMP may be calculated from the outputs of three of the four force sensors, and the output from the remaining force sensor may be used for checking the calculated ZMP. Also in this case, the reliability of the ZMP calculation can be increased.

The number of force sensors provided on the foot is not limited to four as long as three or more force sensors are provided. When n force sensors are provided, the ZMP can be calculated as follows:

$$ZMP = \frac{\sum_{i=1}^{n} \vec{f}_i \cdot \vec{P}_i}{\sum_{i=1}^{n} \vec{f}_i} \tag{10}$$

where, $\vec{f}_i$: arrangement position of each force sensor, and $\vec{P}_i$: force detected.

The ZMP, which is calculated as described above by the foot-sensor processing unit 400, is transmitted to the main control unit 300 via an input/output controller of the foot-sensor processing unit 400, a communication cable, and an input/output controller of the main control unit 300 (none of them is shown in the figure). Then, the CPU 301 of the main control unit 300 calculates command values which are to be supplied to the actuators 306 on the basis of the ZMP of each foot and other information. Accordingly, the walking motion and other motions of the robot are controlled on the basis of the command values.

The acceleration sensor 407 detects the accelerations of the foot in the X-axis direction and the Y-axis direction. When the foot is placed on the floor surface, the CPU 401 of the foot-sensor processing unit 400 calculates the inclination angle of the foot (the foot bottom surface or the X-Y plane) relative to the horizontal plane on the basis of the output from the acceleration sensor 407. In addition, when the robot is in the period of single-foot support, the amount of impact applied to the idling leg is calculated or the stumbling motion which occurs while the robot walks is detected on the basis of the variation in the detection value obtained by the acceleration sensor 407.

The above-described information obtained by the foot-sensor processing unit 400 is transmitted to the main control unit 300 along with the ZMP and is used as basic information for controlling each part.

The sensor outputs from the force sensors 406 and acceleration sensor 407 are obtained at a constant period, or as necessary, by the foot-sensor processing unit 400, and the ZMP, the inclination angle of the foot, etc., are also calculated at a constant period, or as necessary.

The main control unit 300 requests the foot-sensor processing unit 400 of each foot to transmit the information (calculation results) by polling at a predetermined period, or as necessary, and then the foot-sensor processing unit 400 transmits the information to the main control unit 300. Alternatively, the foot-sensor processing unit 400 of each foot may also transmit the information to the CPU 301 of the main control unit 300 by interruption. In addition, the information may also be transmitted using both of the above-described methods.

In the above-described example, the CPU 401 of the foot-sensor processing unit 400 performs predetermined calculations on the basis of the outputs obtained by the force sensors 406 for detecting the ZMP and the acceleration sensor 407, and the calculation results are transmitted to the main control unit 300. Alternatively, however, two CPUs may be provided, and the calculation of the ZMP and the calculation of the inclination of the foot, etc., may be performed by different CPUs.

In addition, although the foot-sensor processing unit 400 and the main control unit 300 are connected to each other via the input/output controllers and the communication cable, a bus 404 of the foot-sensor processing unit 400 and the bus 304 of the main control unit 300 may also be directly connected to each other. In addition, when a data transmitter/receiver for wireless data communication between the foot-sensor processing unit 400 and the main control unit 300 and/or an electric power transmitter/receiver for supplying electric power by wireless communication are provided, the cable for connecting the foot-sensor processing unit 400 and the main control unit 300 can be omitted. Accordingly, the construction can be made simpler and the task of replacing the foot can be facilitated.

In the above-described example of the present invention, the outputs from the sensors 406 and 407 provided on the foot 150 (the main foot body 1101 or the instep 1121) are used by the foot-sensor processing unit 400, which are also provided on the foot 150, for performing predetermined calculations such as the ZMP calculation regarding the foot 150, and then the calculation results are transmitted to the main control unit 300 of the robot's main body. Accordingly, the processing load on the main control unit 300 can be reduced and the main control unit 300 can be dedicated to other calculation processes. As a result, processes with high urgency can be performed with a quick response time.

In addition, since the sensors 406 and 407 provided on the foot 150 are connected to the foot-sensor processing unit 400 and the foot-sensor processing unit 400 is connected to the main control unit 300 with the communication cable, wiring in the robot and the construction of connectors can be made simpler compared to the case in which the sensors 406 and 407 are directly connected to the main control unit 300. In addition, when the data is communicated by wireless communication as described above, there is an advantage in that the number of communication channels can be reduced.

In addition, since the distances from the sensors 406 and 407 on the foot 150 to the foot-sensor processing unit 400 which performs the calculation processes based on the detection values obtained by the sensors 406 and 407 are extremely small, noise included in the sensor outputs can be reduced and the accuracy of the processing results can be increased.

In the fifth structure of the foot 150, since the foot sole 1151 is movably attached to the instep 1121, a time delay is generated between the motion of the foot sole 1151 and that of the instep 1121 when the robot walks. In addition, since the buffer 1154 is placed between the foot sole 1151 and the instep 1121, when the idling leg is placed on the road surface, the reaction force from the road surface is slowly applied to the lower limb 110. Accordingly, the impact on the joints of the lower limb 110 can be reduced and load on the actuators can also be reduced. In addition, the attitude stability of the robot with respect to fast operations of the actuators which occurs when the robot is moved fast can be improved. In addition, even when there are mechanical errors (displacements) in the driving system or when control errors occur, they may be absorbed within the movable range of the foot sole 1151 and their influence can be reduced.

In addition, in the fifth structure, when elastic means is used as the buffer means between the instep 1121 and the foot sole 1151, there is a risk in that the foot sole 1151 will continuously vibrate with respect to the instep 1121 for a long time and the vibration will adversely affect the controllability of the walking motion. In such a case, viscous means (for example, a damper) is preferably provided along with the elastic means in order to improve the damping characteristics. In this case, the elasticity coefficient of the elastic member and the viscosity coefficient of the viscous member are preferably set such that the vibration of the foot sole 1151 which occurs when the foot sole 1151 leaves the road surface in the walking motion of the leg is reduced to a predetermined extent before the foot sole 1151 is placed on the road surface again. Since the vibration of the foot sole 1151 is reduced to a predetermined extent at the time when the idling leg is placed on the ground, it is not necessary for the robot's control system (the foot-sensor processing unit 400 or the main control unit 300) to re-perform the trajectory calculation and other calculations for control. Accordingly, the controllability can be improved. The above-described predetermined extent refers to a minimum necessary vibration which can be tolerated while the control system of the robot achieves stable walking motion.

In addition, in the fifth structure, the force sensors 406 for detecting the ZMP and the acceleration sensor 407 are provided on the instep 1121, and not on the movable foot sole 1151. Accordingly, different from the case in which the sensors 406 and 407 are provided on the foot sole 1151, wires for connecting the sensors 406 and 407 to the foot-sensor processing unit 400 do not include moving portions. Therefore, the movement of the foot sole 1151 can be prevented from being impeded by the wires and the wires can be prevented from being damaged by the movement of the foot sole 1151. In particular, since the sensors 406 for detecting the ZMP are provided on the bottom surface of the instep 1121 (surface which comes into contact with the top surface of the foot sole 1151), the sensors 406 for detecting the ZMP receive pressures from the top surface of the foot sole 1151, which is equivalent to the road surface from the point of ZMP detection, and errors in the detection values due to the variation in the state of the road surface can be reduced. Therefore, the ZMP can be detected more accurately.

Appendix

Although the present invention has been described above in detail in conjunction with a particular example, various amendments and modifications can of course be made by those skilled in the art within the scope of the present invention.

The present invention is not limited to products called "robots", and may be applied to any kinds of mechanical apparatuses which move similarly to human beings by making use of electric or magnetic actions. For example, the present invention may also be applied to toys, etc., which belong to other industrial fields.

More specifically, the foregoing descriptions merely illustrate the present invention, and are not intended to limit the scope of the present invention. The substance of the present invention should be determined by claims stated at the top.

INDUSTRIAL APPLICABILITY

The present invention provides a foot of a legged mobile robot in which the variation in a resistive-force-generation effective surface caused by the variation in the shape of the foot due to the movement of the ZMP is reduced, which is adaptable to various walking surfaces such as continuous and discontinuous surfaces, rigid surfaces, viscoelastic surfaces, etc., and which ensures sufficient attitude stability of the robot.

In addition, the present invention provides a legged mobile robot in which the variation in the resistive-force-generation effective surface caused by the variation in the shape of the foot due to the movement of the ZMP is reduced, which has a foot adaptable to various walking surfaces such as continuous and discontinuous surfaces, rigid surfaces, viscoelastic surfaces, etc., and which thereby ensures sufficient attitude stability.

In addition, according to the present invention, variation in the resistive force against the moment about the yaw axis can be reduced irrespective of the position of the ZMP, and the possibility that so-called spinning motion will occur can be reduced. In addition, motion of the robot controlled by the control system can be predicted and the attitude stability can be improved. In addition, since the plantar-arch portion is provided, even when there are bumps and depressions on the road surface, the possibility that the foot will step on the bumps and fall into a so-called seesaw state can be reduced. In addition, since the foot sole as no angular corners (the corners and the side edges are formed by smooth curved surfaces), interference with the road surface can be reduced and the stumbling motion can be prevented. Accordingly, the attitude stability of the legged mobile robot can be sufficiently ensured.

In addition, according to the present invention, the attitude and behavior of the robot when it falls over can be predicted, so that controls related to the falling motion, for example, control to avoid falling over, control to reduce the impact of falling over, control to recover from falling over, etc., can be easily implemented, and the breakage of each part due to falling can be prevented.

In addition, according to the present invention, since the foot sole can move along a plane which is approximately parallel to the foot bottom surface, even when there are bumps and depressions on the road surface and a part of the foot sole interferes with them when the idling leg is placed on the road surface, the foot sole can move within its movable range so as to eliminate such interference or absorb the force applied by the road surface. Accordingly, high-speed motion can be achieved with high stability.

In addition, according to the present invention, since memory means which stores the information related to the main foot body or the foot sole is provided on the main foot body or the foot sole, the control system of the robot's main body can easily acquire the information corresponding to a new foot when an old one is replaced therewith. Accordingly, a workload required when the foot or the foot sole is replaced can be reduced.

In addition, according to the present invention, since the outputs from the sensors provided on each foot (the main foot body or the foot instep) are processed by the foot-mounted processing means provided on the corresponding foot, it is not necessary for the control means of the robot's main body to perform the calculation processes. Accordingly, processing load placed on the control means can be reduced.

In addition, according to the present invention, the calculation results obtained by the foot-mounted processing means provided on each foot are transmitted to the control means of the robot's main body. Accordingly, compared to the case in which the outputs from the sensors are directly transmitted to the control means of the robot's main body, complication of wiring for connecting them can be prevented.

For example, since the ZMP calculation for each foot is performed by the foot-mounted processing means provided on the corresponding foot (the main foot body or the foot instep), it is not necessary for the control means of the robot's main body to perform these calculations, and the processing load placed on the control means can be reduced. In addition, since the calculation results (ZMP) are transmitted from each foot, compared to the case in which the outputs from the sensors are directly transmitted to the control means of the robot's main body, complication of the wiring for connecting them can be prevented.

Furthermore, when the foot-mounted processing means can be optimized in accordance with the relationship with the sensors, and it is not necessary to change the processes performed by the control means of the robot's main body when the foot is replaced, so that the foot can be easily replaced.

The invention claimed is:

1. A leg device of a legged mobile robot having a plurality of movable legs, said leg device comprising:
   a foot sole having a foot bottom surface and side surfaces which extend continuously from the periphery of the foot bottom surface;
   a first concavity having a slope which slopes toward the inside of the foot bottom surface; and
   a flexible portion disposed only in said first concavity, said flexible portion (i) being composed of one layer of a material having a predetermined elasticity, (ii) being a uniform or non-uniform shape, and (iii) partially filling said first concavity.

2. The leg device of a legged mobile robot according to claim 1, wherein a ground-contact portion is disposed at each of four corners of the foot bottom surface.

3. The leg device of a legged mobile robot according to claim 1, further comprising a second concavity in the first concavity, the second concavity being deeper than the slope of the first concavity.

4. The leg device of a legged mobile robot according to claim 3, wherein the flexible portion is disposed in the second concavity.

5. The leg device of a legged mobile robot according to claim 1, further comprising one or more grooves, each groove being formed in a ground-contact surface of the foot such that the groove extends from the first concavity across a peripheral portion of the foot and communicates with the outside through one of the side surfaces of the foot.

6. The leg device of a legged mobile robot according to claim 1, further comprising:
   an instep attached to the corresponding movable leg; and
   a foot sole attached to the instep such that the foot sole can move along a plane parallel to the foot bottom surface.

7. The leg device of a legged mobile robot according to claim 1, further comprising:
   a main foot body which is detachably attached to an end portion of the corresponding movable leg; and
   memory means which is provided on the main foot body and which stores information related to the main foot body.

8. The leg device of a legged mobile robot according to claim 1, further comprising:
   an instep which is retained by the corresponding movable leg at an ankle of the corresponding movable leg;
   a foot sole detachably attached to the instep; and memory means which is provided on the foot sole and which stores information related to the foot and/or control means which controls motion of the corresponding movable leg on the basis of the information stored in the memory means.

9. The leg device of a legged mobile robot according to claim 1, further comprising:

a main foot body which is retained by the corresponding movable leg at an ankle of the corresponding movable leg;

memory means which is provided on the main foot body and which stores information related to the main foot body and/or control means which controls motion of the corresponding movable leg on the basis of the information stored in the memory means; and an opening through which the memory means and/or the control means face outside so that the memory means and/or the control means can be replaced.

10. The leg device of a legged mobile robot according to claim 8, wherein the control means reads out the information stored in the memory means at the time of initialization.

11. The leg device of a legged mobile robot according to claim 9, wherein the control means reads out the information stored in the memory means at the time of initialization.

12. A method for controlling a legged mobile robot having a foot which is detachably attached to an end portion of a movable leg, the method comprising the steps of:

storing information related to the foot in a memory means provided on the foot;

reading out the stored information from the memory means at a time of initialization;

controlling motion of the movable leg on the basis of the read-out information; and providing said foot with a flexible portion disposed only in a first concavity, said flexible portion (i) being composed of one layer of a material having a predetermined elasticity, (ii) being a uniform or non-uniform shape, and (iii) partially filling said first concavity.

* * * * *